(12) United States Patent
Kawashima et al.

(10) Patent No.: US 7,580,980 B2
(45) Date of Patent: Aug. 25, 2009

(54) EMAIL SYSTEM RESTORING RECIPIENT IDENTIFIER BASED ON IDENTIFIER-FOR-DISCLOSURE FOR ESTABLISHING COMMUNICATION BETWEEN SENDER AND RECIPIENT

(75) Inventors: Masahisa Kawashima, Tokyo (JP); Fumitaka Hoshino, Tokyo (JP); Akiko Fujimura, Tokyo (JP); Shingo Kinoshita, Tokyo (JP); Masayoshi Nakao, Tokyo (JP); Noriaki Saito, Tokyo (JP); Yukio Tsuruoka, Tokyo (JP); Katsumi Takahashi, Tokyo (JP); Tsuyoshi Abe, Tokyo (JP); Jun Miyake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 795 days.

(21) Appl. No.: 10/538,855

(22) PCT Filed: Dec. 19, 2003

(86) PCT No.: PCT/JP03/16396

§ 371 (c)(1),
(2), (4) Date: Dec. 12, 2005

(87) PCT Pub. No.: WO2004/057480

PCT Pub. Date: Jul. 8, 2004

(65) Prior Publication Data

US 2006/0129629 A1 Jun. 15, 2006

(30) Foreign Application Priority Data

Dec. 20, 2002 (JP) ............... 2002-369799
Feb. 3, 2003 (JP) ............... 2003-25976
Oct. 10, 2003 (JP) ............... 2003-352130
Oct. 10, 2003 (JP) ............... 2003-352131

(51) Int. Cl.
*G06F 15/16* (2006.01)
(52) U.S. Cl. .......... 709/206; 709/207; 713/189; 713/150
(58) Field of Classification Search ........... 709/206, 709/207, 246; 713/189, 190, 193, 150, 201, 713/202; 726/3, 4, 5, 6; 380/277
See application file for complete search history.

(56) References Cited

U.S. PATENT DOCUMENTS 6,591,291 B1  7/2003  Gabber et al.

(Continued)

FOREIGN PATENT DOCUMENTS

EP  1 223 527 A2  7/2002

(Continued)

OTHER PUBLICATIONS

Ian Goldberg, et al., "Privacy-enhancing Technologies for the Internet", IEEEXP010219518, Feb. 23, 1997, pp. 103-109.

(Continued)

*Primary Examiner*—Le Luu
(74) *Attorney, Agent, or Firm*—Oblon, Spivak, McClelland, Maier & Neustadt, P.C.

(57) ABSTRACT

A recipient identifier and communication condition information stored in a recipient-identifier storing unit are encrypted by an identifier-for-disclosure creating unit of a recipient terminal to create an identifier-for-disclosure. An identifier-for-disclosure notifying unit notifies a sender terminal of the identifier-for-disclosure. When a communication request using the identifier-for-disclosure is sent from the recipient terminal, a restoring unit of a relay system extracts the communication condition information from the identifier-for-disclosure. Only when communication conditions included in the communication condition information are satisfied, communication between the recipient terminal and the sender terminal is established.

56 Claims, 41 Drawing Sheets

U.S. PATENT DOCUMENTS

| | | |
|---|---|---|
| 7,058,684 B1 | 6/2006 | Ueda |
| 2001/0051990 A1 | 12/2001 | Shirakawa |
| 2003/0182559 A1* | 9/2003 | Curry et al. ................. 713/189 |
| 2003/0188201 A1* | 10/2003 | Venkataramappa ......... 713/202 |
| 2003/0208543 A1* | 11/2003 | Enete et al. ................. 709/206 |
| 2004/0015610 A1* | 1/2004 | Treadwell ................... 709/246 |
| 2004/0022390 A1* | 2/2004 | McDonald et al. .......... 380/277 |
| 2004/0024823 A1* | 2/2004 | Del Monte ................. 709/206 |
| 2004/0049696 A1* | 3/2004 | Baker et al. ................. 713/201 |
| 2006/0112165 A9* | 5/2006 | Tomkow et al. ............. 709/206 |

FOREIGN PATENT DOCUMENTS

| | | |
|---|---|---|
| JP | 8-251231 | 9/1996 |
| JP | 10-198613 | 7/1998 |
| JP | 11-161574 | 6/1999 |
| JP | 2000-201169 | 7/2000 |
| JP | 2000-339236 | 12/2000 |
| JP | 2001-268230 | 9/2001 |
| JP | 2002-147470 | 5/2002 |
| JP | 2004-23154 | 1/2004 |
| JP | 2004-260792 | 9/2004 |
| WO | WO 98/18249 | 4/1998 |

OTHER PUBLICATIONS

Tsuyoshi Abe, et al. "Proceedings of the 2004 IEICE Communications Society Conference". Communications Society, The Institute of Electronics, Information and Communications Engineers, Sep. 21-24, 2004, 3 pages.

Tsuyoshi Abe, et al., "Cryptographic Alias E-mail Addresses for Preventing Address Leakage Incidents", IEICE Technical Report NS2005-167, The Institute of Electronics, Information and Communication Engineers, 2006, 6 pages.

* cited by examiner

FIG.5

ADDRESS-FOR-DISCLOSURE CREATION PAGE — 120

RECIPIENT ADDRESS : abc@user.com — 121

SENDER ADDRESS : def@user.com — 122

EXPIRATION DATE : H15.07.01 — 123

124
OK   CANSEL

ADDRESS-FOR-DISCLOSURE : SW63HM8vb@pcode.com — 125

FIG.21

ADDRESS-FOR-DISCLOSURE CREATION PAGE — 170

- INCOMING-CALL TELEPHONE NUMBER : `03-1234-5678` — 171
- OUTGOING-CALL TELEPHONE NUMBER : `0422-11-2222` — 172
- EXPIRATION DATE : `H15.07.01` — 173

[ OK ] [ CANSEL ] — 174

TELEPHONE-NUMBER-FOR-DISCLOSURE — 175

ENCRYPTION KEY TABLE
B112

| KEY ID(ID_K) | KEY(K) |
|---|---|
| 17 | 0x34d2a36b |
| 18 | 0xe48ab21f |
| 19 | 0xab46fc9a |
| 20 | 0xe6a3b13b |
| ... | |

FIG.30

USER TABLE
B123

| USER NAME | PASSWORD |
|---|---|
| ... | |
| suzuki | ef34szq5s |
| tanaka | ew4902sa |
| ... | |
| yamada | wf4wsfa3s |

FIG.33

USER AUTHENTICATION PAGE (B500)

USER NAME: tanaka

PASSWORD: ******

[TRANSMIT] [CANCEL]

FIG.34

AD-HOC ADDRESS ISSUE PAGE (B600)

USER NAME  tanaka

RECIPIENT ADDRESS  tanaka@mail.isp-A.ne.jp

DELIVERY CONDITION

SENDER DESIGNATION   NO ☐   YES (DESIGNATE ADDRESS) ☒   YES (DESIGNATE DOMAIN) ☐

DESIGNATED ADDRESS OR DOMAIN NAME IN CASE OF YES  suzuki@mail.isp-B.ne.jp

EXPIRATION DATE  NO ☐   YES ☒

EXPIRATION DATE IN CASE OF YES  2003 YEAR  8 MONTH  31 DAY

DESIGNATION OF STARTING DATE OF RECEPTION   NO ☒   YES ☐

EXPIRATION DATE IN CASE OF YES  ☐ YEAR  ☐ MONTH  ☐ DAY

[TRANSMIT] [CANCEL]

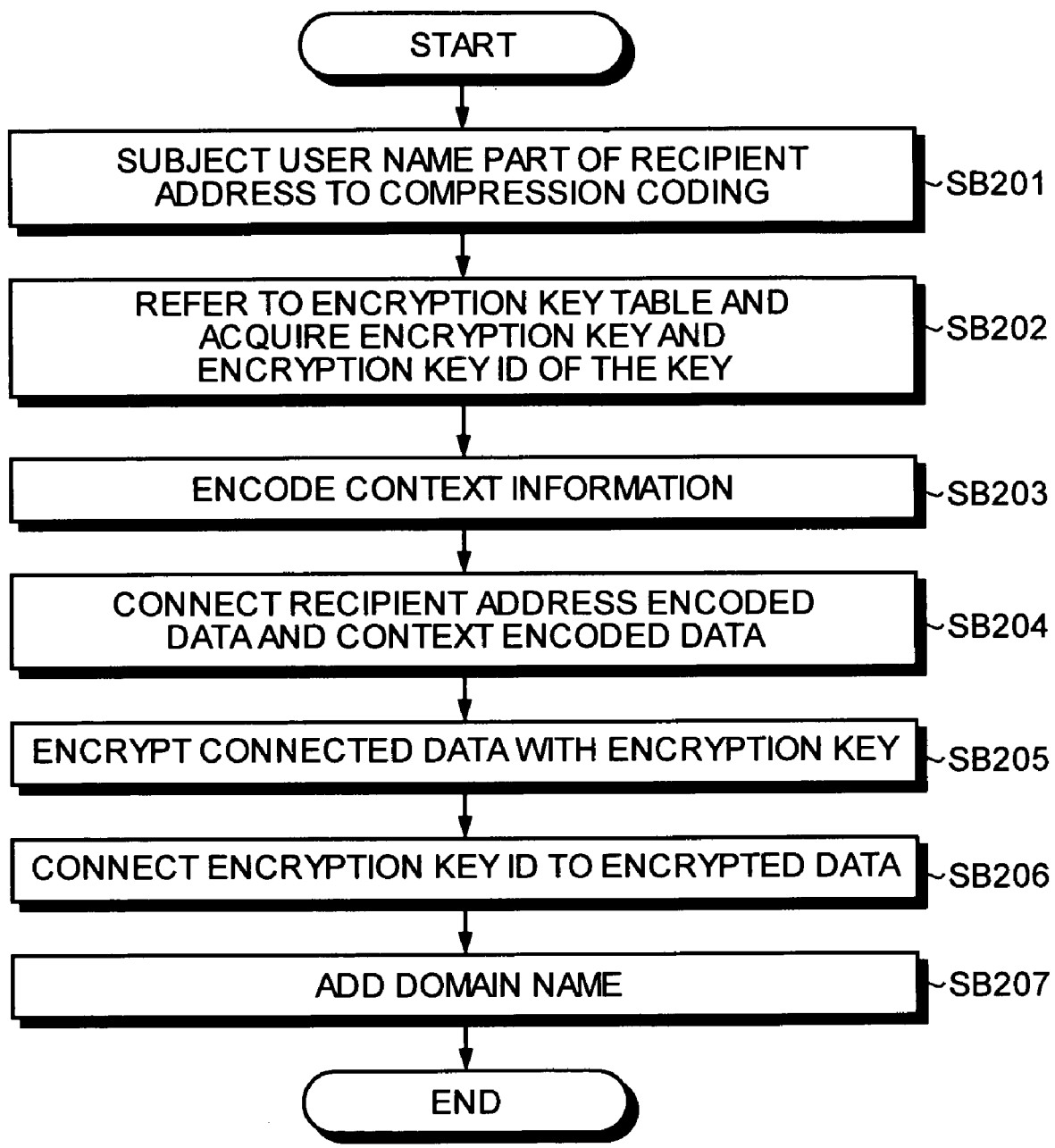

FIG.43

ADDRESS TABLE
B126

| AD-HOC MAIL USER ID | RECIPIENT ADDRESS |
|---|---|
| ... | ... |
| TN | tanap@oce.com |
| SZ | suzup@pla.com |
| ... | ... |

EMAIL SYSTEM RESTORING RECIPIENT IDENTIFIER BASED ON IDENTIFIER-FOR-DISCLOSURE FOR ESTABLISHING COMMUNICATION BETWEEN SENDER AND RECIPIENT

TECHNICAL FIELD

The present invention relates to a communication method, a communication system, a relay system, a communication program, a program for the relay system, a mail delivery system, a mail delivery method, and a mail delivery program that, in response to a communication request from a sender terminal using a recipient identifier for uniquely specifying a recipient, perform communication between the sender terminal and a recipient terminal.

BACKGROUND ART

Conventionally, in relay systems of public telephone networks operated by telecommunication carriers, server operated by Internet service providers, and the like, according to a recipient identifier capable of uniquely identifying a recipient, communication between a communication terminal of the recipient (a recipient terminal) and a communication terminal of an arbitrary sender (a sender terminal) is established.

When an arbitrary sender designates a recipient identifier, which is capable of uniquely identifying a recipient like a telephone number or a mail address, in a sender terminal and informs a relay system of the recipient identifier, the relay system specifies a recipient based on this recipient identifier and establishes communication between the sender terminal and the recipient terminal (note that "establishment of communication" in this context includes every meaning like setting of a real time communication path between communication terminals and transmission of a mail or data from one communication terminal to the other communication terminal).

Usually, as the recipient identifier, one recipient identifier is basically given for one line or one recipient from the relay system. The recipient directly informs people who desire to send mails to the recipient (senders) like relatives, acquaintances, and customers of this recipient identifier in advance or notifies the senders of recipient identifier with various means like telephone, facsimile, letter, and electronic mail (see, for example, Japanese Patent Application Laid-Open No. H10-198613).

Incidentally, when the recipient enters a prize contest or applies for mail order, the recipient may notify the recipient identifier as a contact address. Such an act of the recipient himself/herself is likely to reveal the recipient identifier to a third party with whom the recipient does not wish to communicate.

When the recipient identifier is revealed to such a third party once, unsolicited telephone calls and unsolicited bulk emails for the purpose of sales and solicitation are frequently sent to the recipient. The recipient identifier is often used for purposes that are not expected by the recipient. Practically, this makes it impossible to use the line and the mail address.

In such a case, the recipient abandons this recipient identifier and acquires a new recipient identifier from the relay system. However, the recipient has to inform plural senders, who desire to send mails to the recipient, of a change of the contact address to the new recipient identifier. This requires a lot of time and labor of the recipient.

It is an object of the present invention to solve such conventional problems and provide a communication method, a communication system, a relay system, a communication program, a program for the relay system, a mail delivery system, a mail delivery method, and a mail delivery program that can prevent a recipient identifier from being used for purposes that are not expected by a recipient.

DISCLOSURE OF THE INVENTION

In a communication method according to the present invention, an identifier-for-disclosure is created based on communication condition information, which informs a recipient of communication conditions in performing communication, and a recipient identifier. When a communication request from a sender terminal based on the created identifier-for-disclosure is received, the recipient identifier and the communication condition information are restored from the identifier-for-disclosure. When the communication conditions included in the restored communication condition information are satisfied, communication between the sender terminal and the recipient terminal is established according to the communication request.

In the communication method according to the present invention, an address-for-disclosure is created based on delivery condition information, which indicates delivery conditions for a mail delivered to a recipient terminal, and a recipient address uniformly specifying a recipient. When a mail having the created address-for-disclosure as a destination address is received, the recipient address and the delivery condition information are restored from the address-for-disclosure serving as the destination address of the mail. When the delivery conditions included in the restored delivery condition information are satisfied, the mail is delivered to the recipient terminal.

In the communication method according to the present invention, a telephone-number-for-disclosure is created based on call condition information in connecting a call to a recipient telephone and a recipient telephone number. When a call connection request based on the created telephone-number-for-disclosure is received, the recipient telephone number and the call condition information are restored from the telephone-number-for-disclosure included in the call connection request. When call conditions included in the restored call condition information are satisfied, a sender telephone and the recipient telephone are connected for a call.

In the communication method according to the present invention, the identifier-for-disclosure is created in the recipient terminal based on the communication condition information and the recipient identifier.

In the communication method according to the present invention, the identifier-for-disclosure is created in a predetermined intermediary apparatus, which is capable of communicating with the recipient terminal, based on the communication condition information and the recipient identifier.

In the communication method according to the present invention, a relay system provided between the recipient terminal and the sender terminal notifies the recipient terminal of any one of the restored recipient identifier and the restored communication condition information or both.

In the communication method according to the present invention, a relay system provided between the recipient terminal and the sender terminal determines processing contents at the time when the communication conditions included in the restored communication condition information are not satisfied.

In the communication method according to the present invention, the recipient terminal determines processing contents at the time when the communication conditions included in the restored communication condition information are not satisfied.

In the communication method according to the present invention, the communication condition information includes sender limiting information for limiting a sender to whom the identifier-for-disclosure is disclosed. When it is judged that at least a sender, who makes a communication request, coincides with limitation conditions included in the sender limiting information, communication between the sender terminal and the recipient terminal is established according to this communication request.

In the communication method according to the present invention, disclosure-destination specifying information for specifying a disclosure destination, to which the identifier-for-disclosure is disclosed, is included in the communication condition information.

In the communication method according to the present invention, when the communication conditions included in the restored communication condition information are not satisfied, the communication request is rejected.

In the communication method according to the present invention, when the communication conditions included in the restored communication condition information are not satisfied, communication between a predetermined communication terminal, which is different from the recipient terminal, and a sender terminal is established regardless of the communication request.

In the communication method according to the present invention, a recipient identifier of each recipient and communication condition information indicating communication conditions in communicating with a recipient terminal of the recipient are registered in the intermediary apparatus. When a disclosure request for an identifier-for-disclosure is received from a sender terminal, the identifier-for-disclosure is created based on the recipient identifier and the communication condition information registered in the intermediary apparatus.

In the communication method according to the present invention, it is judged whether a sender who makes a disclosure request for the identifier-for-disclosure has a qualification for making a disclosure request. When it is judged that the sender does not have the qualification, the communication request is rejected.

In the communication method according to the present invention, a preliminary identifier-for-disclosure is created based on preliminary communication condition information, which indicates preliminary communication conditions in communicating with the recipient terminal, and the recipient identifier. The created preliminary identifier-for-disclosure is registered in the intermediary apparatus. When a disclosure request for an identifier-for-disclosure is received from a sender terminal, the preliminary identifier-for-disclosure and the communication condition information registered in the intermediary apparatus are transmitted to an identifier-for-disclosure rewriting apparatus to request rewriting of the identifier-for-disclosure. The identifier-for-disclosure is created from the preliminary identifier-for-disclosure and the communication condition information in response to the request.

In the communication method according to the present invention, it is judged based on the preliminary identifier-for-disclosure whether the intermediary apparatus has a qualification for making a rewriting request. When it is judged that the intermediary apparatus does not have the qualification, the rewriting request is rejected.

In the communication method according to the present invention, the recipient identifier and the communication condition information are encrypted by a predetermined public key to create the identifier-for-disclosure. When communication based on the created identifier-for-disclosure is received, the identifier-for-disclosure is decrypted by a secret key corresponding to the public key to restore the recipient identifier and the communication condition information.

In the communication method according to the present invention, the recipient identifier and the communication condition information are encrypted using a predetermined common key to create the identifier-for-disclosure. When communication based on the created identifier-for-disclosure is received, the identifier-for-disclosure is decrypted by the common key to restore the recipient identifier and the communication condition information.

In the communication method according to the present invention, the recipient identifier and the communication condition information are encrypted by a predetermined common key to create the identifier-for-disclosure. When communication based on the created identifier-for-disclosure is received, the identifier-for-disclosure is decrypted by the common key to restore the recipient identifier and the communication condition information.

In the communication method according to the present invention, when an identifier-for-disclosure is created based on the communication condition information and the recipient identifier, the communication condition information is included in the identifier-for-disclosure in a form in which the communication condition information cannot be manipulated by a third party.

In the communication method according to the present invention, the communication condition information includes types or combinations of the communication conditions. In restoring the recipient identifier and the communication condition information, a type or a combination of communication conditions are extracted from the identifier-for-disclosure. The recipient identifier and the communication condition information are restored from the identifier-for-disclosure according to the extracted type and combination of the communication conditions.

In a communication system according to the present invention, an identifier-for-disclosure granting unit creates an identifier-for-disclosure based on communication condition information, which indicates communication conditions in communicating with a recipient terminal, and a recipient identifier and notifies a sender terminal of the created identifier-for-disclosure. When a communication request from the sender terminal based on the identifier-for-disclosure granted by the identifier-for-disclosure granting unit is received, a relay system restores the recipient identifier and the communication condition information. When the communication conditions included in the restored communication condition information are satisfied, the relay system establishes communication between the sender terminal and the recipient terminal according to the communication request.

In the communication system according to the present invention, the identifier-for-disclosure granting unit forms a part of the recipient terminal.

In the communication system according to the present invention, the identifier-for-disclosure granting unit is an intermediary apparatus different from both the recipient terminal and the relay system.

In the relay system according to the present invention, when a communication request from a sender terminal based on communication condition information, which indicates communication conditions in communicating with a recipient terminal, and a recipient identifier are received, the relay system restores the recipient identifier and the communication condition information from the identifier-for-disclosure. When the communication conditions included in the restored communication condition information are satisfied, the relay system establishes communication between the sender terminal and the recipient terminal according to the communication request.

In a communication program according to the present invention, an identifier-for-disclosure is created based on communication condition information, which informs a recipient of communication conditions in performing communication, and a recipient identifier. When a communication request from a sender terminal based on the created identifier-for-disclosure is received, the recipient identifier and the communication condition information are restored from the identifier-for-disclosure. When the communication conditions included in the restored communication condition information are satisfied, communication between the sender terminal and the recipient terminal is established according to the communication request.

In a program for a relay system according to the present invention, when a communication request from a sender terminal based on communication condition information, which indicates communication conditions in communicating with a recipient terminal, and an identifier-for-disclosure, which is created based on a recipient identifier, is received, the recipient identifier and the communication condition information are restored from the identifier-for-disclosure. When the communication conditions included in the restored communication condition information are satisfied, communication between the sender terminal and the recipient terminal is established according to the communication request.

In a mail delivery system according to the present invention, an address-for-disclosure issuing unit issues an address-for-disclosure based on delivery condition information, which indicates delivery conditions for a mail delivered to a recipient, and a recipient address. When a mail having the address-for-disclosure as a destination is received, a mail transfer unit decrypts the recipient address and extracts the delivery condition information from the address-for-disclosure. When the mail satisfies the delivery conditions included in the extracted delivery condition information, a destination of the mail is changed from the address-for-disclosure to the restored recipient address and the mail is transferred.

In the mail delivery system according to the present invention, the address-for-disclosure issuing unit receives delivery condition information, which indicates delivery conditions for a mail delivered to the recipient, and the recipient address and encrypts the received delivery condition information and the received recipient address to create an address-for-disclosure, and returns the created address-for-disclosure to the recipient terminal. When a mail having the address-for-disclosure as a destination is received, the mail transfer unit decrypts the address-for-disclosure to restore the recipient address and extract the delivery condition information, extracts a mail satisfying the delivery conditions included in the extracted delivery condition information, changes a destination of the extracted mail from the address-for-disclosure to the restored recipient address to transfer the mail.

In the mail delivery system according to the present invention, the delivery condition information and the recipient address are encrypted using a predetermined encryption key registered in an encryption-key table to create an address-for-disclosure, a decryption key is extracted from a decryption-key table in which decryption keys corresponding to respective encryption keys registered in the encryption-key table, the address-for-disclosure is decrypted using the extracted decryption key to restore the recipient address and extract the delivery condition information.

In the mail delivery system according to the present invention, when a data length of encryption object data, which is encrypted using a predetermined encryption key registered in the encryption-key table, is less than a predetermined length, a random number is added to satisfy the predetermined length.

In the mail delivery system according to the present invention, key identifiers are registered in the encryption-key table in association with plural encryption keys, respectively. A key identifier of an encryption key used in encrypting the delivery condition information and the recipient address is included in the address-for-disclosure. A decryption key having a key identifier extracted from the address-for-disclosure is extracted from the decryption-key table. The address-for-disclosure is decrypted using the extracted decryption key to restore the recipient address and extract the delivery condition information.

In the mail delivery system according to the present invention, the encryption-key table and the decryption-key table are identical tables in which key identifiers are registered in association with plural common keys, respectively.

In the mail delivery system according to the present invention, plural public keys are registered in the encryption-key table in association with key identifiers, respectively. Secret keys corresponding to the respective public keys registered in the encryption-key table are registered in the decryption-key table in association with same key identifiers, respectively.

In the mail delivery system according to the present invention, a sender address for using communication to the address-for-disclosure, a sender domain for using communication to the address-for-disclosure, an expiration date of the address-for-disclosure or a starting date of validity of the address-for-disclosure, or a combination of the conditions is set as the delivery condition information.

In the mail delivery system according to the present invention, types and combinations of designated delivery conditions are included in the address-for-disclosure.

In the mail delivery system according to the present invention, when the sender address or the sender domain is set as the delivery condition information, all or a part of hash values of the sender address or the sender domain are included in the address-for-disclosure.

In the mail delivery system according to the present invention, a part of information to be an object of encryption is subjected to reversible conversion processing using a random-number sequence extracted from a random-number sequence table that stores plural random-number sequences.

In the mail delivery system according to the present invention, a random number to be extracted from the random-number sequence table is determined based on a part of information used for creation of the address-for-disclosure.

In the mail delivery system according to the present invention, a random-number sequence is selected from the random-number sequence table based on the delivery condition information. The recipient address is subjected to the reversible conversion processing using the selected random-number sequence.

In the mail delivery system according to the present invention, address tables, which store respective recipient addresses in association with predetermined address identifiers, respectively, are provided in the address-for-disclosure issuing unit and the mail transfer unit. An address identifier stored in the address table corresponding to the recipient address and the delivery condition information are encrypted to create an address-for-disclosure. When a mail having the address-for-disclosure as a destination is received, the address-for-disclosure is decrypted to restore the address identifier and extract the delivery condition information. A mail satisfying the delivery conditions included in the extracted delivery condition information is extracted. A destination of the mail is replaced with the recipient address stored in the address table corresponding to the address identifier restored from the address-for-disclosure to transfer the mail.

In a mail delivery method according to the present invention, an address-for-disclosure is issued based on deliver condition information, which indicates delivery conditions for a mail delivered to a recipient, and a recipient address. When a mail having the address-for-disclosure as a destination is received, the recipient address is restored and the delivery condition information is extracted from the address-for-disclosure. When the mail satisfies the delivery conditions included in the extracted delivery condition information, the destination of the mail is changed from the address-for-disclosure to the restored recipient address to transfer the mail.

In the mail delivery method according to the present invention, the delivery condition information, which indicates delivery conditions for a mail delivered to a recipient, and the recipient address are received. The received delivery condition information and recipient address are encrypted to create an address-for-disclosure. The created address-for-disclosure is returned to a recipient terminal. When a mail having the address-for-disclosure as a destination is received, the address-for-disclosure is decrypted to restore the recipient address and extract the delivery condition information. A mail satisfying the delivery conditions included in the extracted delivery condition information is extracted. The address of the extracted mail is changed from the address-for-disclosure to the restored recipient address to transfer the mail.

In the mail delivery method according to the present invention, the received delivery condition information and recipient address are encrypted using an encryption key having a predetermined key identifier registered in an encryption-key table to create an address-for-disclosure. A decryption key having a predetermined key identifier is extracted from a decryption-key table. The address-for-disclosure is decrypted using the extracted decryption key to restore the recipient address and extract the delivery condition information.

In the mail delivery method according to the present invention, a sender address for using the address-for-disclosure, a sender domain for using the address-for-disclosure, an expiration date of the address-for-disclosure or a starting date of validity of the address-for-disclosure, or a combination of the conditions is set as the delivery condition information.

In the mail delivery method according to the present invention, types and combinations of designated delivery conditions are included in the address-for-disclosure.

In the mail delivery method according to the present invention, respective recipient addresses are stored in an address table in association with predetermined address identifiers. An address identifier stored in the address table corresponding to the recipient address and the delivery condition information are encrypted to create an address-for-disclosure. When a mail having the address-for-disclosure as a destination is received, the address-for-disclosure is decrypted to restore the address identifier and extract the delivery condition information. A mail satisfying the delivery conditions included in the extracted delivery condition information is extracted. The destination of the mail is changed from the address-for-disclosure to the recipient address stored in the address table corresponding to the restored address identifier to transfer the mail.

In a mail delivery program according to the present invention, an address-for-disclosure is issued based on delivery condition information, which indicates delivery conditions for a mail delivered to a recipient, and a recipient address. When a mail having the address-for-disclosure as a destination is received, the recipient address is restored and the delivery condition information is extracted from the address-for-disclosure. When the mail satisfies the delivery conditions included in the extracted delivery condition information, the destination of the mail is changed from the address-for-disclosure to the restored recipient address to transfer the mail.

In the mail delivery program according to the present invention, the delivery condition information, which indicates delivery conditions for a mail delivered to a recipient, and the recipient address are received. The received delivery condition information and recipient address are encrypted to create an address-for-disclosure. The created address-for-disclosure is returned to the recipient terminal. When a mail having the address-for-disclosure as a destination is received, the address-for-disclosure is decrypted to restore the recipient address and extract the delivery condition information. A mail satisfying the delivery conditions included in the extracted delivery condition information is extracted. The destination of the extracted mail is changed from the address-for-disclosure to the restored recipient address to transfer the mail.

In the mail delivery program according to the present invention, the delivery condition information and the recipient address are encrypted using an encryption key having a predetermined key identifier registered in an encryption-key table to create an address-for-disclosure. A decryption key having the predetermined key identifier is extracted from a decryption-key table. The address-for-disclosure is decrypted using the extracted decryption key to restore the recipient address and extract the delivery condition information.

In the mail delivery program according to the present invention, a sender address for using the address-for-disclosure, a sender domain for using the address-for-disclosure, an expiration date of the address-for-disclosure or a starting date of validity of the address-for-disclosure, or a combination of the conditions is set as the delivery condition information.

In the mail delivery program according to the present invention, types and combinations of designated delivery conditions are included in the address-for-disclosure.

In the mail delivery program according to the present invention, respective recipient addresses are stored in an address table in association with predetermined address identifiers. An address identifier stored in the address table corresponding to the recipient address and the delivery condition information are encrypted to create an address-for-disclosure. When a mail having the address-for-disclosure as a destination is received, the address-for-disclosure is decrypted to restore the address identifier and extract the delivery condition information. A mail satisfying the delivery conditions included in the extracted delivery condition information is extracted. The destination of the mail is changed from the address-for-disclosure to the recipient address stored in the address table corresponding to the restored address identifier to transfer the mail.

BRIEF DESCRIPTION OF THE DRAWINGS

FIG. 5 is a schematic of an example of an address-for-disclosure creation page;

FIG. 21 is a schematic of an example of a telephone-number-for-disclosure creation page;

FIG. 29 is a schematic of an example of an encryption-key table shown in FIG. 28;

FIG. 30 is a schematic of an example of a user table shown in FIG. 28;

FIG. 33 is a schematic of an example of a user authentication page;

FIG. 34 is a schematic of an example of an ad-hoc address issuance page;

FIG. 35 is a flowchart of a processing procedure for the ad-hoc address creation described at step S170 in FIG. 32;

FIG. 43 is a schematic of an example of an address table shown in FIG. 42.

BEST MODE FOR CARRYING OUT THE INVENTION

Figure 1:
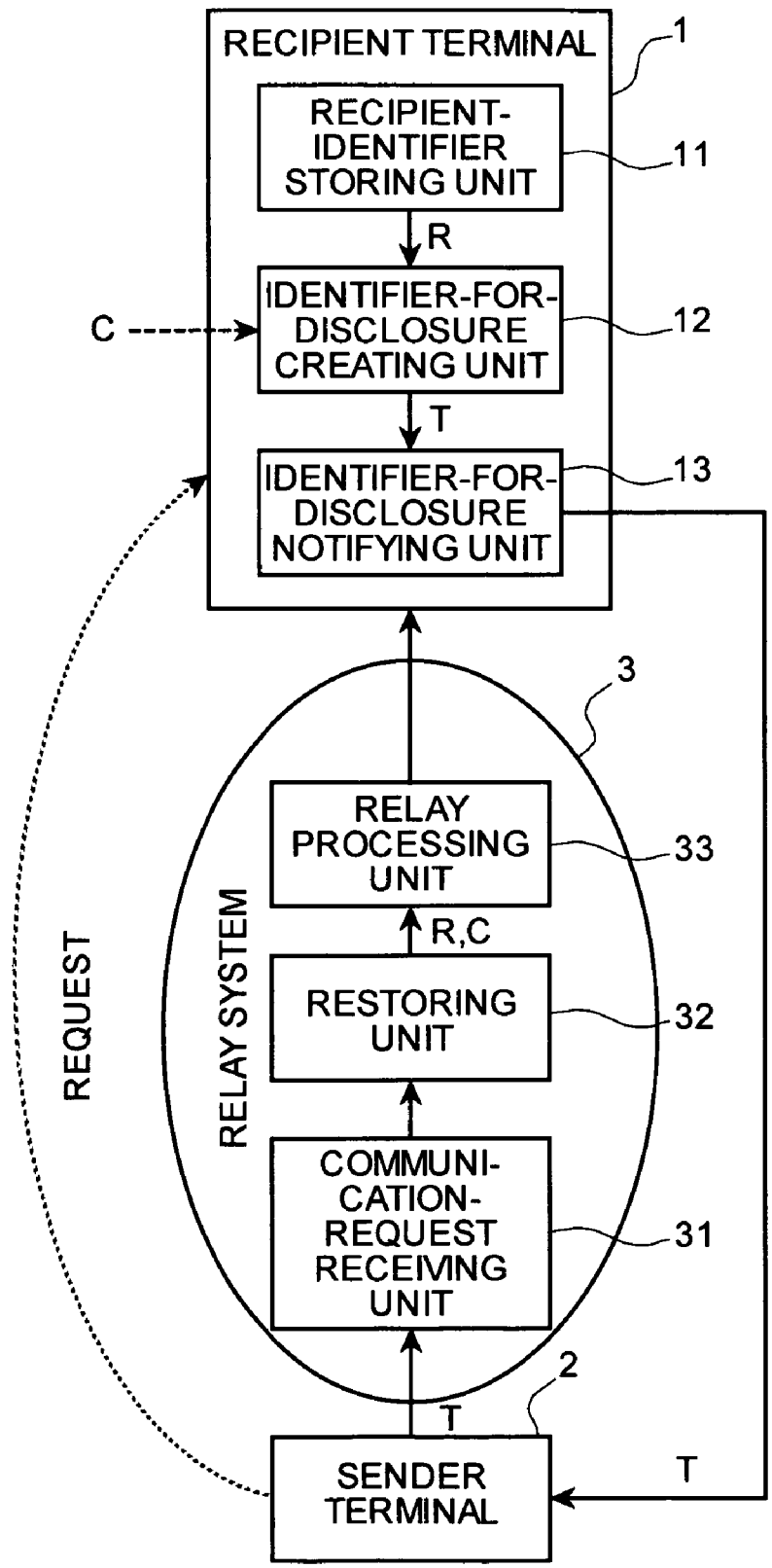
FIG. 1 is a schematic of a communication system according to a first embodiment of the present invention.

Exemplary embodiments of a communication method, a communication system, a relay system, a communication program, and a program for the relay system according to the present invention are explained below in detail with reference to the accompanying drawings. The present invention is applied to a mail address according to a first to a third embodiments and to a telephone number according to a fourth embodiment.

First, an outline of the present invention and a technology as a premise of the present invention are described.

Incidentally, assuming that an enormous number of identifiers-for-disclosure are given, when the identifiers-for-disclosure are continuous integers, it is likely that, even if one identifier-for-disclosure is abandoned, a sender in bad faith uses the other identifiers-for-disclosure, which can be easily inferred, to use a recipient identifier for unintended purposes. According to the present invention, since communication condition information is embedded in an identifier-for-disclosure, it is necessary to prevent this communication condition information from being manipulated illegally. Therefore, an encryption technology is used according to the present invention.

Public key encryption is an encryption system in which a key for encryption (an encryption key) and a key for decryption (a decryption key) are different. First, a person receiving a cryptogram in the public key encryption creates a pair of an encryption key and a decryption key, makes the encryption key public, and keeps the decryption key secret. Since the encryption key is made public, anybody can send a cryptogram to the person receiving the cryptogram.

In general, since the public key encryption requires a large amount of arithmetic operations for encryption or decryption, the public key encryption is not suitable for encryption and decryption of a long message. To encrypt a long message, a random number (a session key) is created, the random number is encrypted by the public key encryption, and the message is encrypted by common key encryption using the session key. In this way, it is possible to send a cryptogram efficiently even if a message is long. A method of using the public key encryption and the common key encryption is generally referred to as hybrid encryption. According to the present invention, the public key encryption includes the hybrid encryption unless specifically noted otherwise.

It is possible to add a manipulation prevention code to a plain text or a cryptogram for the purpose of preventing an attack by an attacker through creation of an illegal identifier-for-disclosure described above. The manipulation can be prevented if a message authenticator (MAC) or a digital signature is used. In addition, some common key encryptions or some public key encryptions in a broad sense described above have a manipulation preventing function depending on a method of use. When such encryption systems are used, the manipulation preventing function provided in the encryption systems may be used (see, for example, Tatsuaki Okamoto, Hiroshi Yamamoto "Modern Encryption" Sangyo Tosho Kabushiki Kaisha, ISBN4-7828-5353-X, Jun. 30, 1997, p 163 to 187).

According to the present invention, a public key encryption system is used to create a set of an enormous number of identifiers-for-disclosure that cannot be inferred. Specifically, communication is performed as described below.

0: A relay system operated by a telecommunication carrier or the like prepares a public key and makes the public key public.

1: An apparatus including a storage unit for storing a recipient identifier of a recipient uses the public key to add predetermined communication condition information, for example, an identifier specifying a communication partner, data for determining whether reception (or relay) should be permitted or rejected (a reception condition), a random number, or a combination of the identifier, the data, and the random number to the recipient identifier and encrypt the recipient identifier. The apparatus notifies a communication terminal of a sender of the encrypted data as an identifier-for-disclosure.

2: The communication terminal of the sender designates the identifier-for-disclosure to send a mail to a relay system.

3: The relay system decrypts the identifier-for-disclosure using a secret key corresponding to the public key and acquires the recipient identifier to specify the recipient.

Next, a basic configuration of the communication system according to the first embodiment is explained. In FIG. 1, reference numeral 1 denotes a communication terminal of a recipient (a recipient terminal); 2, a communication terminal of a sender (a sender terminal); and 3, a relay system. The recipient terminal 1 includes a recipient-identifier storing unit 11, an identifier-for-disclosure creating unit 12, and an identifier-for-disclosure notifying unit 13. The relay system 3 includes a communication request receiving unit 31, a restoring unit 32, and a relay processing unit 33. Processing of the identifier-for-disclosure creating unit 12 corresponds to an identifier-for-disclosure creating step in claim 1, processing of the restoring unit 32 corresponds to a restoring step in claim 1, and processing of the relay processing unit 33 corresponds to a communication establishing step in claim 1.

The recipient terminal 1 corresponds to an identifier-for-disclosure granting unit in claim 22 and the relay system 3 corresponds to a relay system in claim 22. In this case, the identifier-for-disclosure creating unit 12, the restoring unit 32, and the relay processing unit 33 correspond to an identifier-for-disclosure creating unit, a restoring unit, and a communication establishing unit in claim 22, respectively.

The identifier-for-disclosure creating unit 12 of the recipient terminal 1 creates an identifier-for-disclosure T with a method executable by operators other than an operator of the relay system 3 from a recipient identifier R stored in the recipient-identifier storing unit 11 and predetermined communication condition information C that is stored separately or inputted. The identifier-for-disclosure creating unit 12 notifies the sender terminal 2 of the identifier-for-disclosure T (discloses the identifier-for-disclosure T to the sender terminal 2) using the identifier-for-disclosure notifying unit 13.

The sender terminal 2 designates the identifier-for-disclosure T to request the relay system 3 to perform communication. In the relay system 3, when the communication request receiving unit 31 receives the communication request with the identifier-for-disclosure T designated, the restoring unit 32 decrypts the identifier-for-disclosure T with a method executable only by the operator of the relay system 3 and acquires the recipient identifier R and the communication condition information C. When communication conditions included in the communication condition information are satisfied, the relay processing unit 33 processes the communication request with the recipient identifier R as an incoming call destination.

It is possible to create the identifier-for-disclosure T by encrypting an information sequence, which is obtained by connecting the recipient identifier R and the predetermined communication condition information C, with a public key of the operator of the relay system 3. In this case, the relay system 3 decrypts the identifier-for-disclosure with a secret key corresponding to the public key and acquires the recipient identifier R and the communication condition information C.

Here, if an identifier of a disclosure destination of the identifier-for-disclosure T is included in such communication condition information C, when an unsolicited bulk email or an unsolicited telephone call with the identifier-for-disclosure T as a destination is received, it is possible to recognize through whom this identifier-for-disclosure T is leaked. Thus, it is possible to prevent the leakage of the recipient identifier.

It is also possible to limit conditions for use of the identifier-for-disclosure T by including information for limiting a sender or a sender terminal or information for limiting a usable period in the communication condition information C.

As examples of the information for limiting a sender or a sender terminal, there are an identifier of the sender or the sender terminal and a hash value that is calculated from this identifier. In addition, as examples of the information for limiting a usable period, there are an expiration date of the identifier-for-disclosure T, a valid time frame (prohibited at night, etc.), and the like.

In this case, the relay processing unit 33 of the relay system 3 determines whether a communication request should be permitted or rejected based on any one of an acquired recipient identifier and predetermined communication condition information or both.

It is also possible that the relay system 3 notifies the recipient terminal 1 of the communication request including the acquired recipient identifier or the recipient identifier and the predetermined communication condition information directly and the recipient terminal 1 determines whether the communication request should be permitted or rejected based on any one of the recipient identifier and the predetermined communication condition information or both. Note that it is necessary to grant a different identifier-for-disclosure to each sender. In addition, when a period of use is limited, it is necessary to grant an identifier-for-disclosure every time the period elapses.

Next, details of the first embodiment premised on the system configuration of the communication system are explained. An electronic mail system, to which the present invention is applied, is explained here. Specifically, it is assumed that a certain internet service provider (ISP) provides users with an electronic mail communication service using the present invention. It is assumed that a recipient terminal is a terminal of a user of the ISP. A recipient identifier is an electronic mail address of the user of the ISP and has a domain name of a form "user name@user.com".

It is assumed that a relay system includes an electronic mail relay server 3a having an address processing function based on the present invention and a standard electronic mail relay server 3b that relays a mail having a recipient identifier as a destination.

The electronic mail relay server 3a is realized by causing a commercially available general-purpose server machine to operate a program for executing address processing based on the present invention. It is assumed that a host name of the electronic mail relay server 3a is pcode.com.

Note that the recipient terminal is realized by causing a computer having an Internet communication function to operate a program for executing processing based on the present invention. Note that a user of the sender terminal does not have to be a user of the ISP.

Figure 2:
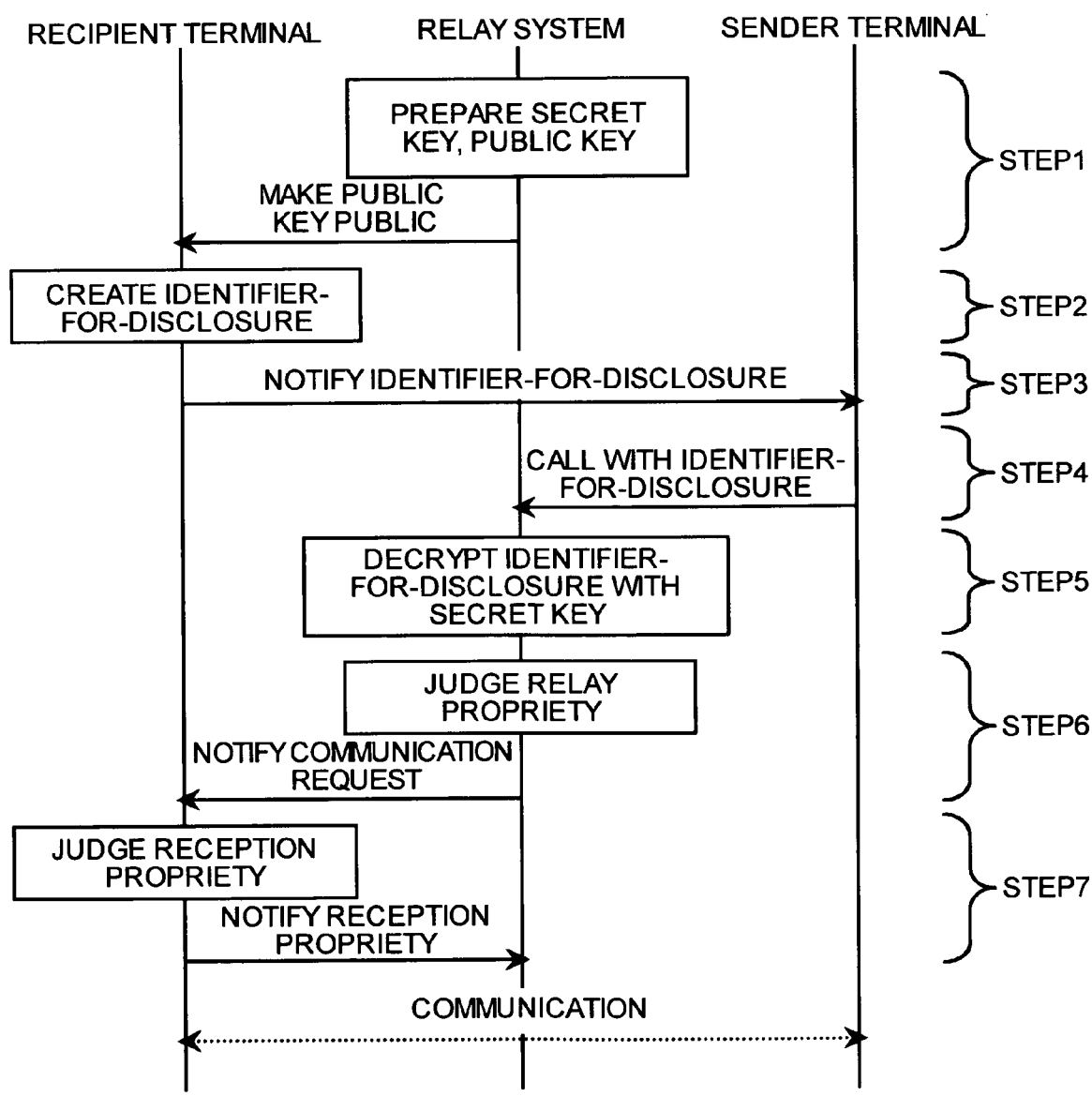
FIG. 2 is a sequence chart of a processing procedure according to the first embodiment shown in FIG. 1.

FIG. 2 is a sequence chart of a processing procedure for the communication system according to the present invention. First, the relay system 3 prepares a pair of a secret key and a public key and makes the public key public (step 1). The recipient terminal 1 uses the public key made public by the relay system 3 to encrypt a recipient identifier and predetermined communication condition information and create an identifier-for-disclosure (step 2).

Specifically, a character string (a user name part) N before @ of an electronic mail address of a recipient using the recipient terminal 1 and communication condition information C are connected by an appropriate connector ("+", etc.). The connected character string is encrypted using the public key of the ISP. Then, the encrypted data is converted into text data and changed to a character string. A mail address, which is obtained by adding a domain name "@pcode.com" to the character string, is created as an identifier-for-disclosure T.

The communication condition information C is formed by a character c1 indicating a type and type dependent control information c2. It is possible to include a condition of whether communication should be permitted or rejected (a reception condition) in such communication condition information C. For example, when a sender is limited, c1 is set as "S" and c2 is set as a hash value of a sender address. When an expiration date of an identifier is limited, c1 is set as "T" and c2 is set as an expiration date. When a domain name of a sender address is designated, c1 is set as "O" and c2 is set as a hash value of the designated domain name. When a sender address and an expiration date are designated, c1 is set as "P", a first six characters of c2 are set as a has value of the sender address, and a seventh character and the subsequent characters are set as an expiration date.

It is also possible to define a type not defining a reception condition. An identifier-for-disclosure created in this case is an identifier-for-disclosure without a reception condition. For example, to prevent a person to whom an identifier-for-disclosure from leaking the identifier-for-disclosure to a third party without obtaining approval of the recipient, it is possible to write information for specifying a partner, to whom the identifier-for-disclosure is disclosed, in the part of the communication condition information C. When such an identifier-for-disclosure is created, c1 is set as "D" and information for specifying a partner, to whom the identifier-for-disclosure is disclosed, more specifically, a name, an initial, or the like of the partner is written in the part of c2. In the following explanation, the identifier-for-disclosure of this form is referred to as a disclosure destination specifying type identifier.

To make it possible to dynamically set, after the address disclosure, whether a communication request should be permitted or rejected, it is also possible to write information for uniquely identifying an identifier-for-disclosure as the communication condition information C. Specifically, an order number, which increases by 1 every time an identifier-for-disclosure is created in the recipient terminal 1, is stored and managed. When identification information of the identifier-for-disclosure is included in the communication condition information C, c1 is set as "I" and the order number is written in the part of c2. The recipient terminal 1 provides a recipient using the terminal with an interface for timely setting whether a communication request should be permitted or rejected (limit a sender, limit a period, or reject the communication request entirely) using an identifier-for-disclosure already disclosed.

In the above series of explanations, the public key encryption system is used in creating an identifier-for-disclosure. However, it is also possible to use a common key encryption system. A specific example of the common key encryption system is explained assuming that there is a large customer like a company as a user of an ISP. Note that it is possible to apply a series of processing explained below not only to the so-called common key encryption system but also to any encryption systems using a common key.

Here, a relay system defines a customer name for uniquely identifying a customer. For example, a customer name "xxx-trading" is allocated to a company customer called "XXX Shoji". At step 1, the relay system creates a common key for each customer and notifies a recipient terminal of the customer of the created common key. In addition, the relay system stores a correspondence relation between customer names of respective customers and the common key. At step 2, the recipient terminal encrypts a character string obtained by connecting N and C with the common key encryption system using the common key and adds a domain name .xxx-trading@pcode.com to a character string obtained as a result of the encryption to create an identifier-for-disclosure. The part of xxx-trading (a user name part) immediately before of this mail address is a character string indicating a customer name.

Returning to the explanation of FIG. 2, the recipient terminal 1 notifies the sender terminal 2 of the created identifier-for-disclosure (step 3). Note that the recipient terminal 1 may inform the sender terminal 2 of the identifier-for-disclosure directly or using any means such as telephone, facsimile, and letter other than using an electronic mail.

Thereafter, the sender terminal 2 designates the identifier-for-disclosure to request the relay system 3 to perform communication (step 4). Specifically, the sender terminal 2 transmits an electronic mail to an electronic mail relay server 3b, to which the sender terminal 2 is subordinate, based on an electronic mail originating procedure of the Internet standard. The electronic mail relay server 3b relays the electronic mail based on the Internet standard. Since a domain name after @ of a destination of the electronic mail is "pcode.com", the electronic mail is relayed to an electronic mail relay server (pcode.com) 3a through several electronic mail relay servers.

Then, the relay system 3 decrypts the identifier-for-disclosure using the secret key and acquires a recipient identifier and predetermined communication condition information (step 5). Specifically, the electronic mail server 3a decrypts the part before @ (the user name part) of the destination of the received electronic mail address using the secret key and separates a result of the decryption by the connector described at step 2 to thereby acquire N (the part before @ of the recipient identifier) and the communication condition information C. Then, the electronic mail server 3a adds a domain name "@user.com" to the acquired N to thereby acquire the recipient identifier.

Note that, when the common key encryption system is used, the electronic mail relay server 3a acquires a character string between "." immediately before @ and @ of the destination of the received electronic mail address as a customer name. The electronic mail relay server 3a uses a common key corresponding to the customer name to decrypt a character string from a top of the electronic mail address to "." immediately before @. Then, processing after the decryption is the same as the method using the public key encryption system.

Next, the relay system 3 determines a processing method for a communication request based on any one of the recipient identifier and the predetermined communication condition information or both (step 6). For example, when communication condition information is a reception condition, the relay system 3 scans the reception condition. If the reception condition is satisfied, the relay system 3 relays the recipient terminal 1 and the sender terminal 2, that is, establishes communication. If the reception condition is not satisfied, the relay system 3 rejects the relay. Note that the scanning in this context means collection of information related to the reception condition.

Specifically, the electronic mail relay server 3a determines processing method for the electronic mail based on contents of the communication condition information C. When a first character of the communication condition information C is "S", a reception condition is that a hash value of a sender address of the electronic mail coincides with a second character and subsequent characters of the communication condition information C. When the first character of the communication condition information C is "T", a reception condition is that reception time of the electronic mail is before the second character and subsequent characters of the communication condition information C. When the first character of the communication Condition information C is "O", a reception condition is that a hash value of a domain name part of the sender address of the electronic mail coincides with the second character and subsequent characters of the communication condition information C. When the first character of the communication condition information C is "P", a hash value of the sender address of the electronic mail coincides with the second character to the seventh character of the communication condition information C and reception time of the electronic mail is before an expiration date indicated by the eighth character and subsequent characters of the communication condition information C.

When the reception condition is satisfied, the electronic mail relay server 3a transfers the electronic mail with the recipient identifier acquired at step 5 as a destination. When the reception condition is not satisfied, the electronic mail relay server 3a rejects the communication request, that is, abandons the electronic mail.

As another processing method, it is conceivable to transfer the electronic mail to another address designated in advance when a reception condition is not satisfied. As still another processing method, it is conceivable to select other communication forms such as a communication form of returning an electronic mail including a URL of an Internet bulletin board server to a sender when a reception condition is not satisfied.

When the first character of the communication condition information DC is "D" or "I", the electronic mail relay server 3a inserts a character string, which is obtained by sandwiching the character string of the communication condition information C with "[SafetyTag="and"]", in a leading part of a Subject field of the electronic mail and relays the electronic mail with the recipient identifier as a destination. The relayed electronic mail is relayed to the recipient terminal through several electronic mail relay servers 3b.

Next, the recipient terminal 1 receives a notice of the communication request (step 7). When the communication condition information C is included in the communication request, the recipient terminal 1 notifies the relay system 3 whether the communication request should be received. Specifically, the recipient terminal 1 receives a list of arrived mails from the electronic mail relay server 3b, to which the terminal is subordinate, in a form including a Subject field of a mail based on a standard protocol like an IMAP. When a leading part of the Subject field starts with "[SafetyTag=", the recipient terminal 1 acquires a character up to "]" as the communication condition information C. When the first character of the communication condition information C is "I", the recipient terminal 1 acquires a character string indicated by the second character of the communication condition information C as an order number of an identifier-for-disclosure and performs processing based on a processing method set by the recipient in advance concerning the order number.

When the designated processing is "rejection of a request", the recipient terminal 1 transmits an instruction to delete the mail to the electronic mail relay server 3b. In addition, like the operation of the relay system at step 6, as another processing method, it is also conceivable to transfer the mail to another address or select another communication form (use an Internet bulletin board).

It is also conceivable that the types of the communication condition information C are only the identification number display "I" and the disclosure destination display "D" and the relay system 3 does not determine a processing method for the communication request at step 6. In addition, it is also conceivable that the types of the communication condition information C are only the sender limitation "S" or the time limitation "T" and the recipient terminal 1 does not determine a processing method for the communication request at step 7. Further, it is also conceivable that the type of the communication condition information C is only the disclosure destination display "D" and neither the relay system 3 nor the recipient terminal 1 determines a processing method for the communication request at step 6 or step 7.

It is also conceivable that an identifier-for-disclosure is created such that the part of the communication condition information C can be read by any person. In this case, at step 2, the recipient terminal obtains a manipulation prevention code for the communication condition information C, sets a result of encrypting a character string, which is obtained by connecting this manipulation prevention code and N (a character string before @ of the recipient identifier), with the public key as t, and adds a domain name "@pcode.com" to a character string, which is obtained by connecting this t and the communication condition information C with an appropriate connector, to create an identifier-for-disclosure. At step 5, the electronic mail relay server 3a separates a character string before @ (a user name) of the destination of the received electronic mail at the connector and acquires the communication condition information C and t. The electronic mail relay server 3a decrypts t with the secret key and acquires the manipulation prevention code and N. The electronic mail relay server 3a checks whether a result of calculating the manipulation prevention code from the acquired communication condition information C and the manipulation prevention code acquired from t coincide with each other. As a specific method of creating a simple manipulation prevention code, a method of calculating a hash value of the communication condition information C is conceivable.

Figure 3:
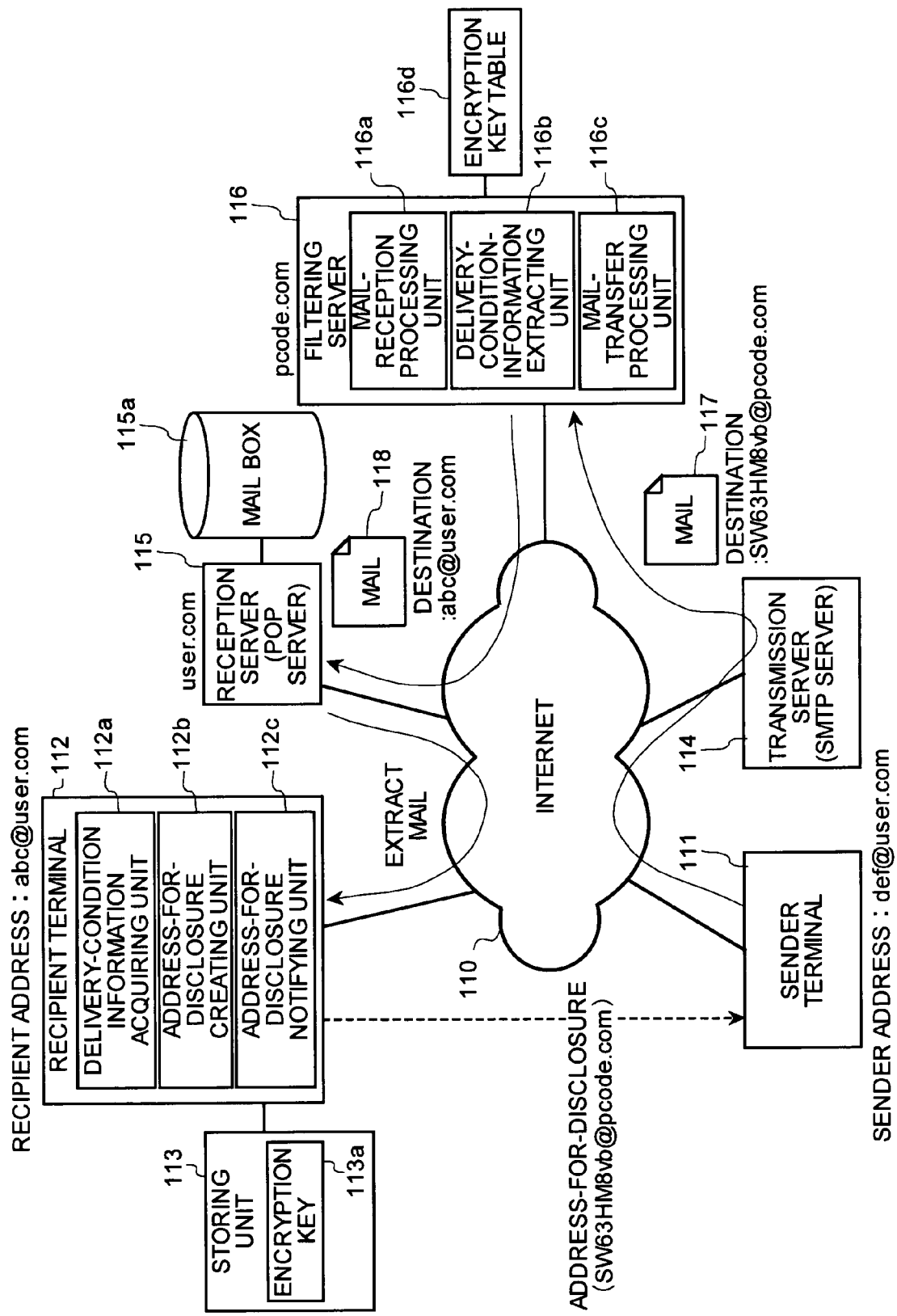
FIG. 3 is a block diagram of a system configuration of a mail system according to the first embodiment.

Next, a mail system, to which the first embodiment is applied, is explained more specifically. FIG. 3 is a block diagram of a system configuration of the mail system according to the first embodiment. Note that, for convenience of explanation, it is assumed that a mail address granted to a recipient receiving a mail (hereinafter referred to as "recipient mail address") is "abc@user.com" and a mail address granted to a sender transmitting a mail (hereinafter referred to as "sender mail address") is "def@user.com". In addition, for convenience of explanation, it is assumed that delivery condition information including a sender address and an expiration date is used instead of the communication condition information including c1 and c2. Further, a common key encryption system is used and a recipient address and the like are inputted on a dedicated page every time an address-for-disclosure is created.

In the mail system shown in the figure, when a sender at the sender terminal 111 transmits a mail to a recipient at the recipient terminal 112, instead of setting the recipient address "abc@user.com", which is an original mail address of the recipient, as a destination of the mail, an address-for-disclosure SW63HM8vb@pcode.com, which is obtained by embedding delivery condition information in this recipient address, is set as a destination of the mail.

Consequently, such a mail is delivered to a filtering server 116 having a domain name "pcode.com" via the Internet 110 and a transmission server 114. The filtering server 116 judges whether the mail should be delivered to the recipient based on the delivery condition information embedded in the address-for-disclosure. The filtering server 116 redelivers only a mail, which is judged to be delivered to the recipient, with a destination of the mail set as the recipient address "abc@user.com".

Then, a redelivered mail 118 is delivered to a reception server 115 having a domain name "user.com" via the Internet 110 and stored in a mail box 115a corresponding to the recipient address "abc@user.com". Thus, the recipient can take out the mail from this mail box 115a.

In this way, in such a mail system, a mail having the address-for-disclosure embedded with the delivery condition information as the destination address is transmitted and only a proper mail is delivered to a user based on the delivery condition information in the address-for-disclosure in the filtering server. This makes it possible to deliver only a mail satisfying the delivery condition to the user.

Next, a configuration of the mail system shown in FIG. 3 is explained. As shown in the figure, this mail system has a system configuration in which the sender terminal 111, the recipient terminal 112, the transmission server (an SMTP server) 114, the reception server (a POP server) 115, and the filtering server 116 are connected to the Internet 110.

The sender terminal 111 is a terminal apparatus that is used by a user (a sender) who transmits a mail to a user (a recipient) who uses the recipient terminal 112. Specifically, in transmitting a mail to the recipient terminal 112, the sender terminal 111 creates a mail, which has an address-for-disclosure the "SW63HM8vb@pcode.com" notified from the recipient terminal 112 as a destination and an own address "def@user.com" as a sender, and transmits the mail to the Internet 110.

The recipient terminal 112 is a terminal apparatus that takes out the mail from the own mail box 115a in the reception server 115 and also performs processing for creating an own address-for-disclosure and notifying the sender terminal 111 of the address-for-disclosure. The recipient terminal 112 has a delivery-condition-information acquiring unit 112a, an address-for-disclosure creating unit 112b, an address-for-disclosure notifying unit 112c, and a storing unit 113 that stores an encryption key serving as a common key.

The delivery-condition-information acquiring unit 112a is a processing unit that acquires any one of a sender address and an expiration date (a term of mail delivery permission) or both as delivery condition information. For example, the delivery-condition-information acquiring unit 112a causes a user to input these items in the address-for-disclosure creation page to thereby acquire corresponding data.

The address-for-disclosure creating unit 112b is a processing unit that creates an address-for-disclosure based on a recipient address and delivery condition information (any one of a sender address and an expiration date or both). Specifically, the address-for-disclosure creating unit 112b encrypts character strings, which include user names before @ (account names) and terms of validity of the recipient address and the sender address, using the common key and grants a domain name to this encrypted data to create an address-for-disclosure. Note that processing of the address-for-disclosure creating unit 112b corresponds to an identifier-for-disclosure creating step in claim 1, the recipient terminal 112 corresponds to an identifier-for-disclosure granting unit in claim 22, and the address-for-disclosure creating unit 112b corresponds to an identifier-for-disclosure creating unit in claim 22.

The address-for-disclosure notifying unit 112c is a processing unit that notifies the user (the sender) using the sender terminal 111 of the address-for-disclosure created by the address-for-disclosure creating unit 112b. Specifically, the address-for-disclosure notifying unit 112c can notify the address-for-disclosure using a communication mail having the sender address "def@user.com" of the sender as a destination and the address-for-disclosure "SW63HM8vb@pcode.com" as a sender. When such a communication mail is used, since the sender is not required to input the address-for-disclosure, it is possible to prevent input mistakes and realize smooth use of an address.

The storing unit 113 is a storing device that stores an encryption key 113a serving as a common key granted to the recipient terminal 112 in advance in association with identification information for an encryption key. An encryption key same as the encryption key 113a is also held in the filtering server 116 because the encryption key is required for delivery condition information extracting processing of the filtering server 116.

The transmission server 114 is an SMTP server that is used when the user (the sender) using the sender terminal 111 transmits a mail. The reception server 115 is a POP server that is used when the user (the recipient) using the recipient terminal 112 receives a mail. The reception server 115 has a mail box 115a. When a mail reaches the mail box 115a, it is notified to the recipient terminal 112 to that effect. Then, automatic reception of the mail from the mail box 115a by the recipient terminal 112 is performed.

The filtering server 116 is a server apparatus that performs filtering for a mail based on the delivery condition information included in the address-for-disclosure. Specifically, when the sender address included in the delivery condition information and a sender of the mail are identical and the expiration date included in the delivery condition information has not expired at the point of mail reception by the filtering server 116, the mail is redelivered (transferred) with a mail address of the mail replaced with the original recipient address "abc@user.com".

The filtering server 116 has a mail-reception processing unit 116*a*, a delivery-condition-information extracting unit 116*b*, a mail-transfer processing unit 116*c*, and an encryption-key table 116*d*. Note that processing of the deliver condition information extracting unit 116*b* corresponds to a restoring step in claim 1 and processing of the mail-transfer processing unit 116*c* corresponds to a communication establishing step in claim 1. The filtering server 116 corresponds to a relay system in claim 22 and the restoring unit 32 and the relay processing unit 33 correspond to a restoring unit and a communication establishing unit in claim 22, respectively.

The mail-reception processing unit 116*a* is a processing unit that receives a mail 117 having the address-for-disclosure "SW63HM8vb@pcode.com" as a destination. Since such a filtering server 116 is a server apparatus having a domain name of the address-for-disclosure, all addresses-for-disclosure are to be received by the filtering server 116.

The delivery-condition-information extracting unit 116*b* is a processing unit that extracts delivery condition information from the address-for-disclosure forming the address of the mail. Specifically, the delivery-condition-information extracting unit 116*b* decrypts the user name part "SW63HM8vb" before @ of the address-for-disclosure "SW63HM8vb@pcode.com" using a decryption key, extracts a character string including the user name "abc" of the recipient address, the user name "def" of the sender address, and an expiration date "H150701", and sets a sender address "def@user.com", which is obtained by adding a predetermined domain name "@user.com" to the user name "def" of the sender address, and the expiration date "H150701" as delivery condition information.

Here, the decryption key used for this decryption is extracted from the decryption-key table 116*d*. However, since various mails reach the filtering server 116, it is unclear which decryption key should be used to decrypt the address-for-disclosure. Therefore, an identification ID of a decryption key is added at a stage when the address-for-disclosure is created in the address-for-disclosure creating unit 112*b* of the recipient terminal 112 as already explained. Then, the delivery-condition-information extracting unit 116*b* uses the identification ID of the decryption key included in such an address-for-disclosure to specify a decryption key and, then, performs decryption using the decryption key.

The mail-transfer processing unit 116*c* judges whether a mail should be transferred to an original recipient based on the delivery condition information extracted by the delivery-condition-information extracting unit 116*b*. When the mail should be transferred to the original recipient, the mail-transfer processing unit 116*c* redelivers the mail with the recipient address "abc@user.com", which is obtained by adding the predetermined domain name "@user.com" to the user name "abc" of the recipient address obtained by decrypting the address-for-disclosure, as a destination.

Specifically, when the sender address "def@user.com" obtained by decrypting the address-for-disclosure coincides with an address of a sender of the mail, the mail is a mail from a user (a sender) who is allowed to transmit a mail by the recipient. Thus, it is judged that the mail should be redelivered. When a reception time of the mail is before expiration date "H150701" obtained by decrypting the address-for-disclosure, the mail is within a period set by the recipient in advance. Thus, it is judged that the mail should be redelivered.

Figure 4:
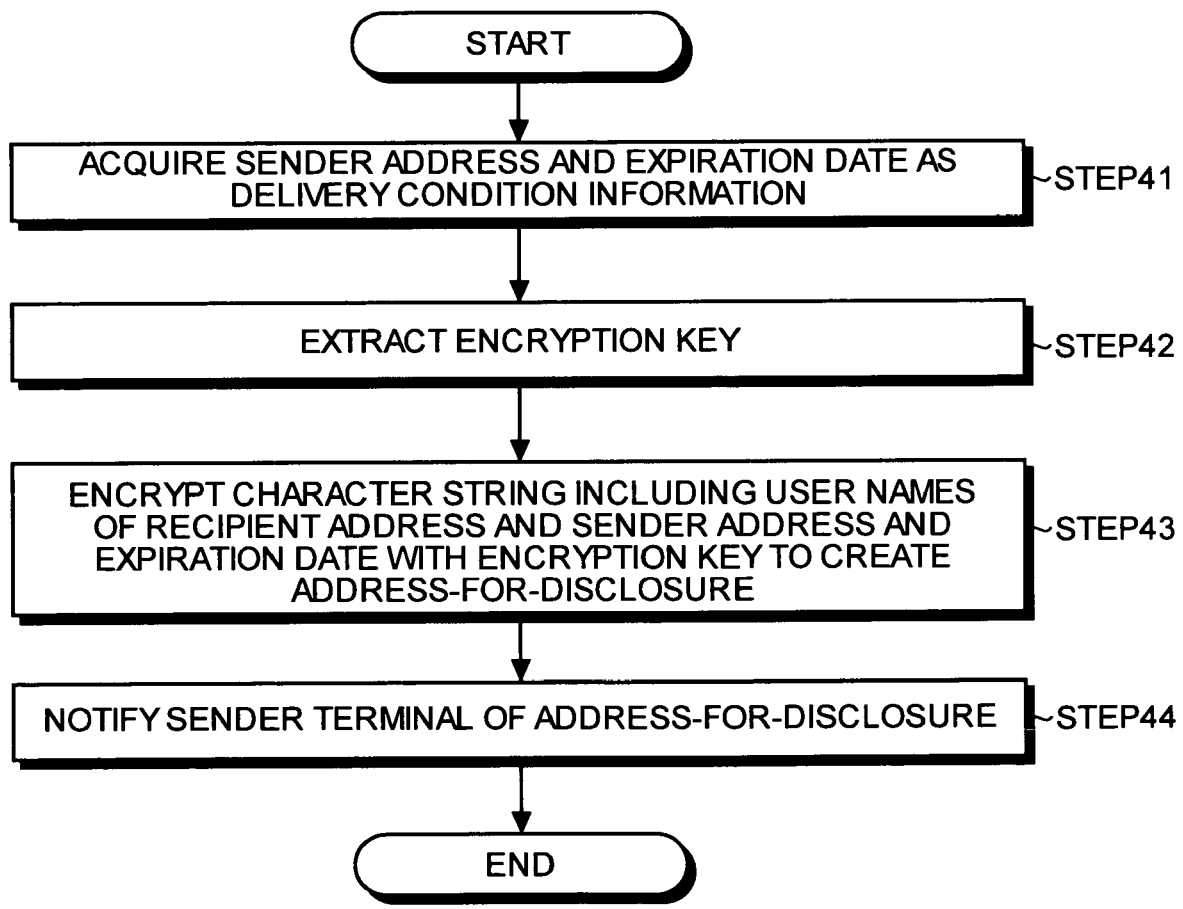
FIG. 4 is a flowchart of a processing procedure for a recipient terminal shown in FIG. 3.

Next, a processing procedure for the recipient terminal 112 shown in FIG. 3 is explained further in detail. FIG. 4 is a flowchart of the processing procedure for the recipient terminal 112 shown in FIG. 3. The recipient terminal 112 acquires a sender address and an expiration date as delivery condition information using an address-for-disclosure creation page 120 shown in FIG. 5 (step 41). Specifically, the address-for-disclosure creation page 120 includes a recipient address input frame 121, a sender address input frame 122, and an expiration-date input frame 123. Thus, when an OK input frame 124 is designated, a sender address and an expiration date among data inputted in these frames only have to be acquired as delivery condition information.

Thereafter, the recipient terminal 112 extracts the encryption key 113*a* stored in the storing unit 113 (step 42) and encrypts a character string, which includes user names of a recipient address and a sender address and an expiration date, using the encryption key 113*a* to create an address-for-disclosure (step 43). The recipient terminal 112 displays the created address-for-disclosure in a display frame 125 of the address-for-disclosure creation page 120 shown in FIG. 5 and notifies the sender terminal 111 of the address-for-disclosure (step 44). Note that, according to the first embodiment, since the encryption key 113*a* stored in the storing unit 113 is used as a common key, a publicly-known method for the common key encryption system only has to be used in creating an address-for-disclosure.

Figure 6:
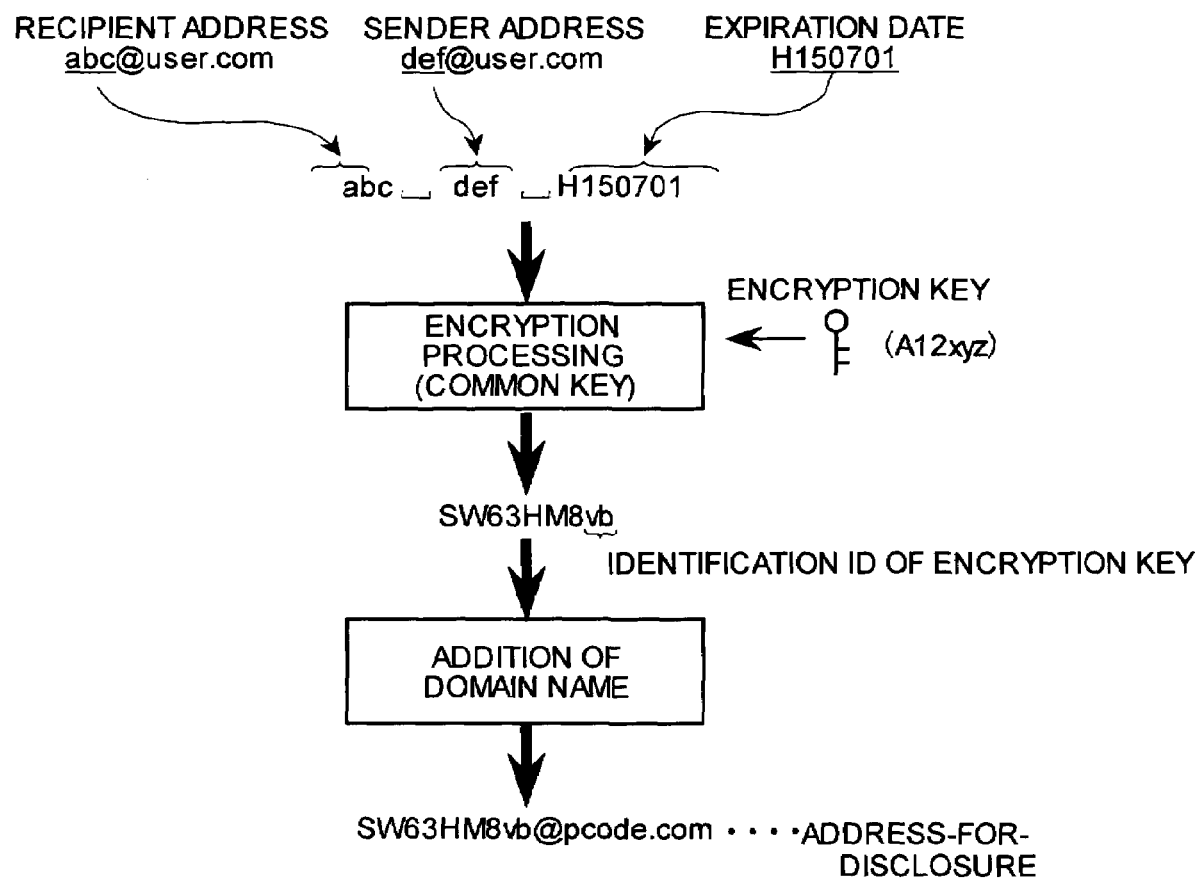
FIG. 6 is a schematic for explaining how to create an address-for-disclosure by an address-for-disclosure creating unit shown in FIG. 3.

Next, how to create an address-for-disclosure by the address-for-disclosure creating unit 112*b* shown in FIG. 3 is explained more specifically. FIG. 6 is a schematic for explaining how to create an address-for-disclosure by the address creating unit 112*b* shown in FIG. 3.

As shown in the figure, in creating an address-for-disclosure, first, a character string, which is obtained by connecting the user name part "abc" before @ of the recipient address "abc@user.com", the user name part "def" before @ of the sender address "def@user.com", and the expiration date "H150701" with blanks, is encrypted using the encryption key 113*a* to create encrypted data "SW63HM8v".

Thereafter, an identifier ID "b" of an encryption key is added to this encrypted data to change the encrypted data to "SW63HM8vb", which is set as a user name of the address-for-disclosure. Thereafter, the domain name "@pcode.com" is added to create the address-for-disclosure "SW63HM8vb@pcode.com".

Note that, for convenience of explanation, a blank is used as a connector. However, it is also possible to use a character such as "+" as a connector. In addition, since the domain name of each mail address is "@user.com" as a premise, the user name parts before @ of the sender address and the recipient address are used. However, the entire user name and domain name may be set as an object of encryption. For example, when mail addresses having various domain names like "@aaa.com", "@bbb.com", and "@ccc.ne.jp" are set as objects of processing, although a data length of an address-for-disclosure becomes long, it is necessary to set the entire user name and domain name as an object of encryption.

Moreover, for convenience of explanation, the sender address and the recipient address are directly used. However, the present invention can be applied in completely the same manner when a hash value of the sender address is used instead of the sender address and compressed data of the recipient address is used instead of the recipient address.

Figure 7:
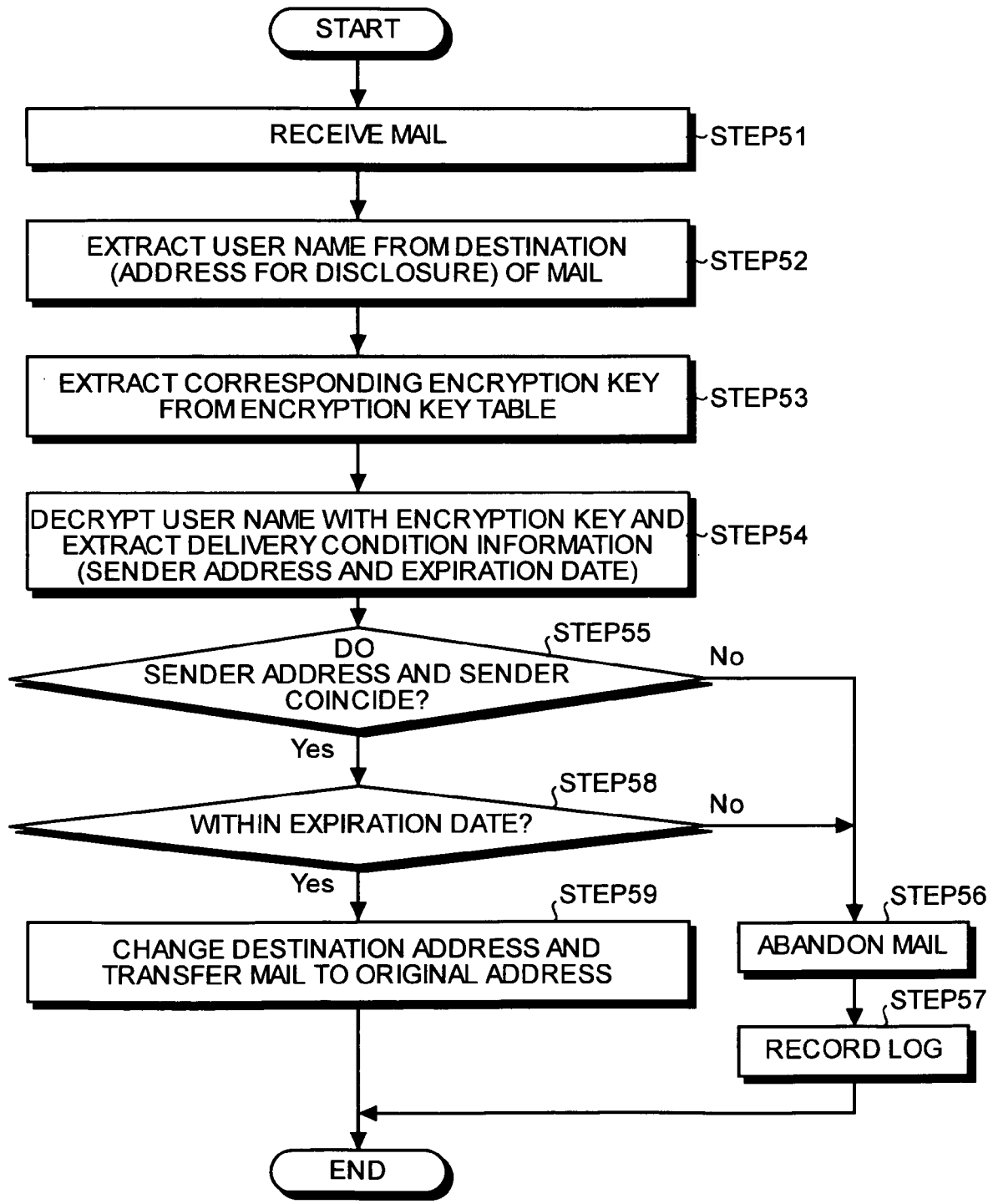
FIG. 7 is a flowchart of a processing procedure for a filtering server shown in FIG. 3.

Next, a processing procedure for the filtering server 116 shown in FIG. 3 is explained. FIG. 7 is a flowchart of the processing procedure for the filtering server 116 shown in FIG. 3. As shown in the figure, in the filtering server 116, when the mail-reception processing unit 116*a* receives the mail 117 having the address-for-disclosure as a destination (step 51), the mail-reception processing unit 116*a* extracts a user name of the address-for-disclosure from the mail 117 (step 52). At the same time, the delivery-condition-information extracting unit 116*b* extracts a corresponding encryption key from the encryption-key table 116*d* (step 53).

Thereafter, the delivery-condition-information extracting unit 116*b* decrypts the user name with the extracted encryption key to extract delivery condition information (a sender address and an expiration date) (step 54) and checks whether a sender address included in the delivery condition information coincides with the sender of the mail 117 (step 55). As a result, when the sender address and the sender do not coincide with each other ("No" at step 55), the mail-transfer processing unit 116*c* considers that the mail is not a mail from a user originally allowed to transmit a mail and abandons the mail 117 (step 56) and records a log of the processing (step 57).

On the other hand, when the sender address included in the delivery condition information and the sender of the mail 117 coincide with each other ("Yes" at step 51), the delivery-condition-information extracting unit 116*b* checks whether reception time of the mail 117 is before expiration date included in the delivery condition information (step 58). As a result, when the reception time is not before expiration date ("No" at step 58), the mail-transfer processing unit 116*c* abandons the mail 117 for reasons of expiration of the term (step 56) and records a log of the processing (step 57). When the reception time is before expiration date ("Yes" in step 58), the mail-transfer processing unit 116*c* regards that both the conditions are satisfied and changes the destination of the mail 117 to the original recipient address to transfer the mail 117 (step 59).

Figure 8:
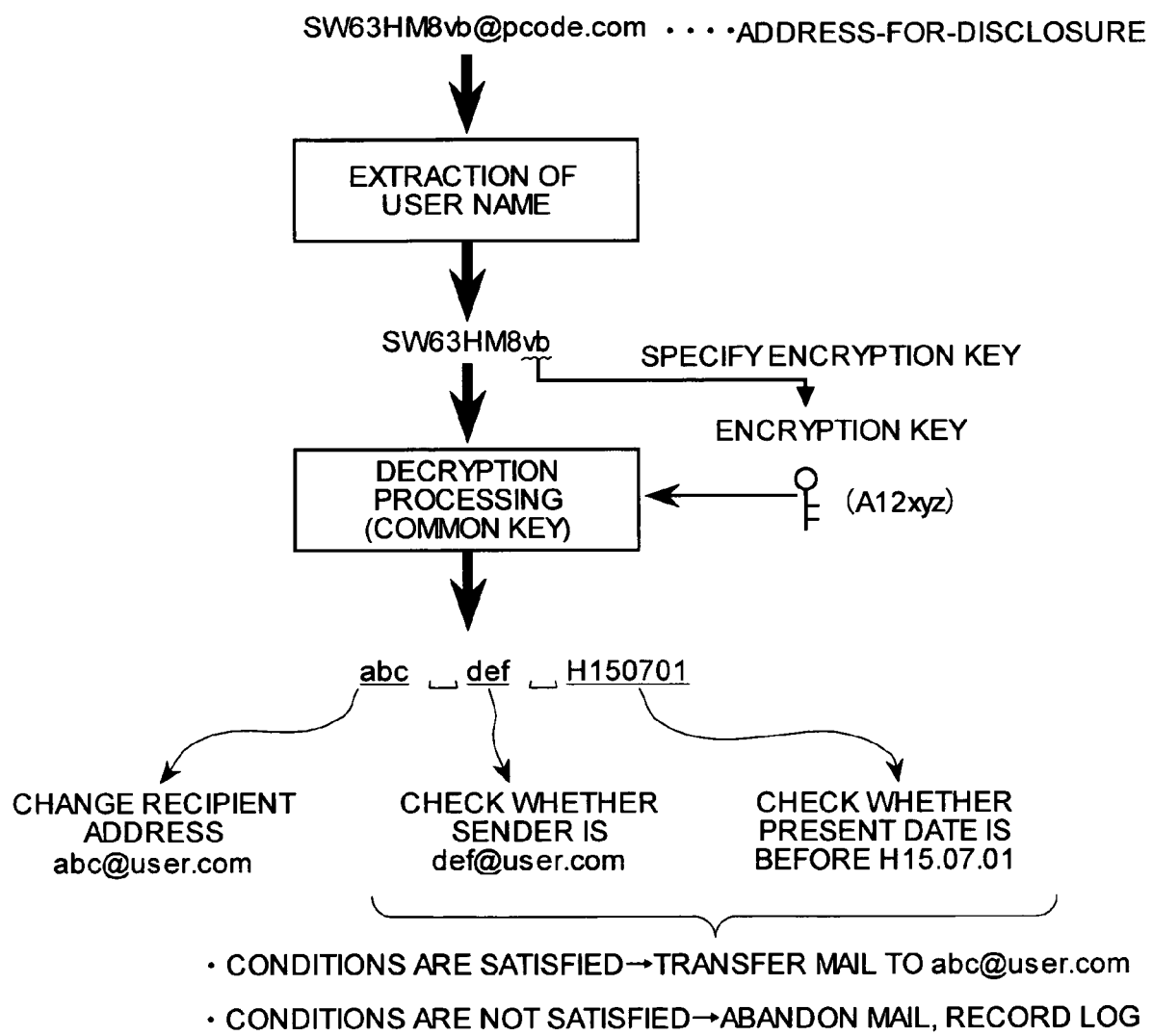
FIG. 8 is a schematic for explaining how to implement a filtering by a communication-condition-information extracting unit and a mail-transfer processing unit shown in FIG. 3.

Next, how to implement filtering by the delivery-condition-information extracting unit 116*b* and the mail-transfer processing unit 116*c* shown in FIG. 3 is explained more specifically. FIG. 8 is a schematic for explaining how to implement filtering by the delivery-condition-information extracting unit 116*b* and the mail-transfer processing unit 116*c* shown in FIG. 3.

As shown in the figure, the delivery-condition-information extracting unit 116*b* extracts the user name part "SW63HM8vb" from the address-for-disclosure "SW63HM8vb@pcode.com", which is the destination of the mail 117. Then, the delivery-condition-information extracting unit 116*b* extracts a corresponding encryption key from the encryption-key table 116*d* using the identification ID "b" of the encryption key located at the end of the user name part.

Thereafter, the delivery-condition-information extracting unit 116*b* decrypts "SW63HM8v" using the extracted encryption key and acquires a character string "abc def H150701". The delivery-condition-information extracting unit 116 sets the address "abc@user.com", which is obtained by adding the domain name "@user.com" to "abc", as a recipient address, sets the address "def@user.com", which is obtained by adding the domain name "@user.com" to "def", as a sender address, and sets "H150701" as an expiration date.

Thereafter, when the sender of the mail 117 is "def@user.com", the delivery-condition-information extracting unit 116*b* judges that a sender condition is satisfied. When the reception time of the mail 117 is before "H150701", the delivery-condition-information extracting unit 116 judges that a temporal condition is satisfied. Then, when both the conditions are satisfied, the mail-transfer processing unit 116*c* transfers the mail with "abc@user.com" extracted from the address-for-disclosure as a recipient address of the mail 117. When at least one of the conditions is not satisfied, the mail-transfer processing unit 116*c* abandons the mail and records a log of the processing.

Note that, for convenience of explanation, a mail is abandoned when the mail does not satisfy a condition. However it is also possible to transfer a mail with a mail address of an administrator or the like as a destination address when the mail does not satisfy a condition. Consequently, the administrator or the like can grasp a state of unsolicited bulk emails and the like properly.

As described above, the address-for-disclosure creating unit 112*b* of the recipient terminal 112 encrypts a recipient address and delivery condition information to create an address-for-disclosure and notifies the sender terminal 111 of the address-for-disclosure. When the filtering server 116 receives the mail having the address-for-disclosure transmitted from the sender terminal 111 as a destination, the delivery-condition-information extracting unit 116*d* extracts the delivery condition information from the address-for-disclosure and transfers the mail to the original recipient address only when the mail satisfies conditions of the delivery condition information. Consequently, it is possible to control use of the recipient address for purposes other than expected purposes following leakage and diffusion of the recipient address. Note that, for convenience of explanation, the common key encryption system is used. As already explained, it is also possible to apply the present invention when the public key encryption system is used. The recipient terminal referred to in this specification includes a computer, a router, a PBX, and the like used by the recipient.

In a series of the explanations, creation and notification of an identifier-for-disclosure are performed in the recipient terminal. However, when the recipient terminal is used as an identifier-for-disclosure granting unit, it is troublesome for a recipient himself/herself to create and notify an identifier-for-disclosure for each sender or every time the identifier-for-disclosure is required. Naturally, the sender does not know a recipient identifier. Thus, in requesting an identifier-for-disclosure, the sender needs to request the identifier-for-disclosure from the recipient using means other than the communication using the relay system described above. In notifying the sender of the identifier-for-disclosure, since it is likely that the recipient identifier of the recipient is revealed to the sender depending on a communication form. Thus, it may be necessary to notify the recipient identifier with another means.

Here, if an apparatus other than the recipient terminal, for example, an intermediary apparatus different from both the recipient terminal and the relay system is used as the identifier-for-disclosure granting unit, the recipient is released from troublesome creation and notification of the identifier-for-disclosure. In addition, the recipient can request and receive the identifier-for-disclosure through communication. Thus, in the following explanation, creation and notification of an identifier-for-disclosure are performed in the intermediary apparatus.

Figure 9:
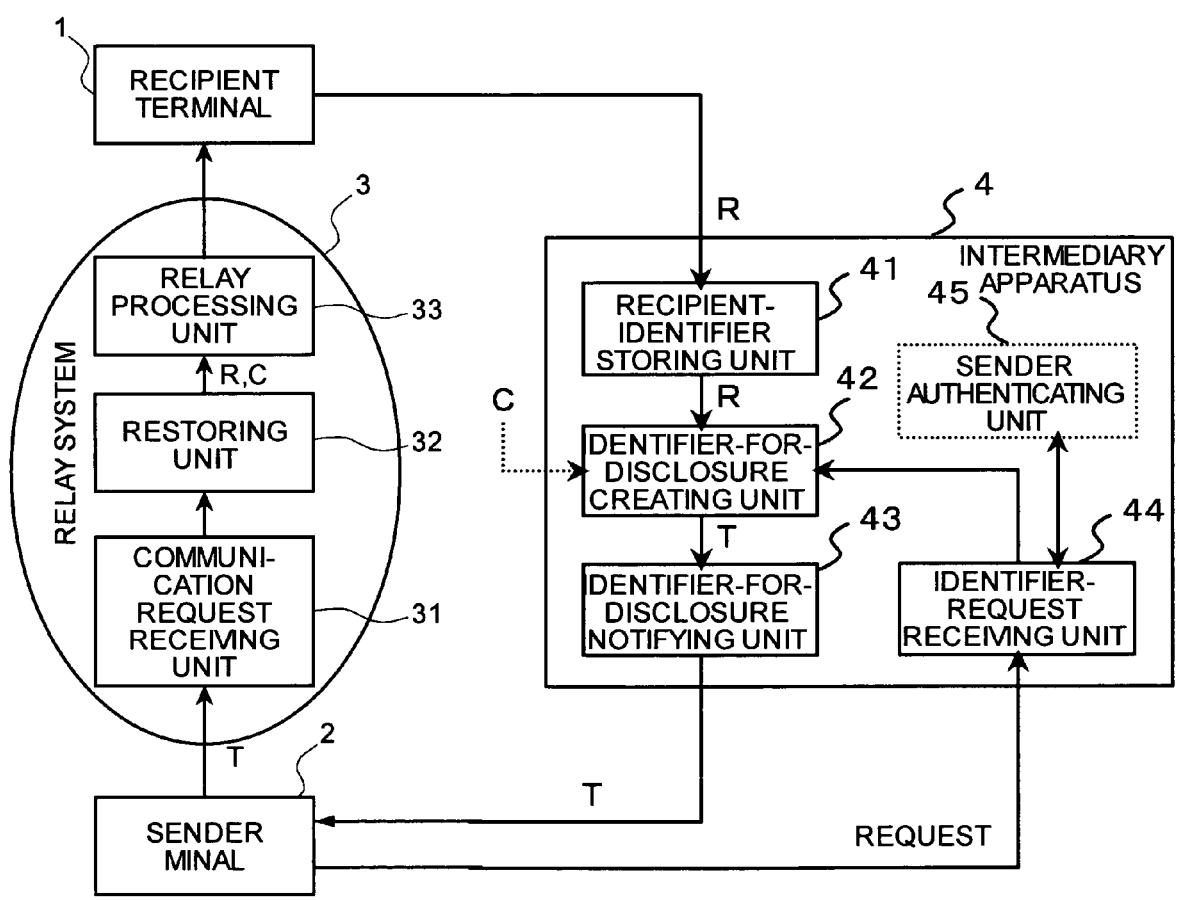
FIG. 9 is a schematic of a configuration of a communication system according to a second embodiment of the present invention.

FIG. 9 is a schematic of a basic configuration of a communication system of the present invention using an intermediary apparatus 4 as the identifier-for-disclosure granting unit. The intermediary apparatus 4 includes a recipient-identifier storing unit 41, an identifier-for-disclosure creating unit 42, and an identifier-for-disclosure notifying unit 43 that are basically the same as the recipient-identifier storing unit 11, the identifier-for-disclosure creating unit 12, and the identifierfor-disclosure notifying unit 13 shown in FIG. 1, respectively. In addition, the intermediary apparatus 4 includes an identifier-request receiving unit 44 that receives a request-for-disclosure of an identifier-for-disclosure of a recipient from a communication terminal of a sender.

In such a configuration, the sender terminal 2 requests the intermediary apparatus 4 to disclose an identifier-for-disclosure of the recipient terminal 1 through communication using a usual relay system (not shown). In the intermediary apparatus 4, when the identifier-request receiving unit 44 receives this request, the identifier-for-disclosure creating unit 42 creates an identifier-for-disclosure T with a method executable by operators other than an operator of the relay system 3 from a recipient identifier R stored in the recipient-identifier storing unit 41 and predetermined communication condition information C that is stored separately or inputted. The identifier-for-disclosure creating unit 42 notifies the sender terminal 2 of the identifier-for-disclosure T (discloses the identifier-for-disclosure T to the sender terminal 2 using the usual relay system identifier form the disclosure notifying unit 43.

In this case, if the intermediary apparatus 4 includes an authentication unit 45, which judges whether the sender requesting disclosure of the identifier-for-disclosure of the recipient has a qualification for the disclosure of the identifier-for-disclosure and, when the sender does not have the qualification, abandons the request, it is possible to prevent the intermediary apparatus 4 from disclosing the identifier-for-disclosure to a third party plotting to perform communication that is annoying for the recipient.

The sender terminal 2 designates the identifier-for-disclosure T to request the relay system 3 to perform communication. Operations after that are the same as those explained in FIG. 1. Note that it is assumed that the recipient identifier R, which is sent by communication using the ordinary relay system from the recipient terminal 1 or the relay system 3 in advance, is stored in the recipient-identifier storing unit 41.

Figure 10:
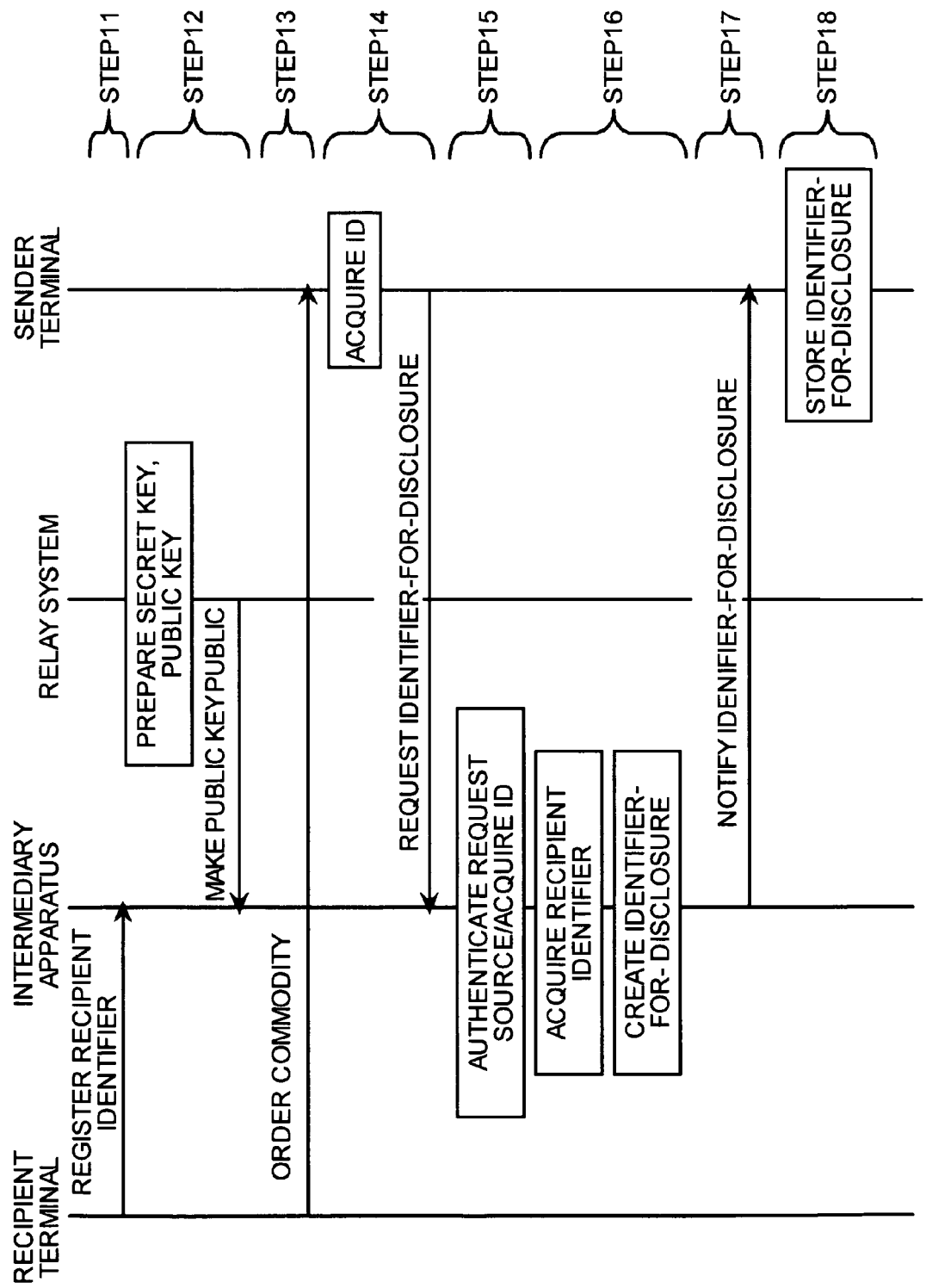
FIG. 10 is a sequence chart of a processing procedure according to the second embodiment shown in FIG. 9.

FIG. 10 is a sequence chart of a processing procedure in which an intermediary apparatus performs creation and notification of an identifier-for-disclosure. As already explained according to the first embodiment, on the premise that a certain ISP operates an electronic mail relay system based on the present invention, a certain company IDP registers a customer of the company in the ISP as a member and discloses an identifier-for-disclosure of the customer to an associated EC agent. The customer of the IDP has a customer ID allocated by the IDP, has an electronic mail account on the electronic mail relay server 3b operated by the ISP, and has an electronic mail address in a form of "customer name@user.com".

The associated EC agent operates an EC site that allows the customer of the company IDP to order a commodity on a WEB browser. The associated EC agent forms an order page of the EC site such that a WEB terminal of the customer transmits the customer ID of the customer to a server of the EC site simultaneously with order of a commodity. It is possible to describe such an order page in the standard HTML. In this case, order information is transmitted to the EC site according to the standard HTTP procedure.

The company IDP installs a WEB server as the intermediary apparatus 4. This WEB server includes an address database that stores for each customer of the company IDP, a customer ID and an electronic mail address of the customer. Such an address DB can be realized using commercially available relational database software.

First, the customer of the company IDP registers an own electronic mail address in the intermediary apparatus 4 of the company IDP using a form transmission procedure and the like based on the HTTP protocol (step 11). Then, the ISP prepares a secret key and a public key and makes the public key public (step 12). Note that, when a conditioned recipient identifier is created using a common key, the ISP regards the company IDP as a customer, creates a common key corresponding to the company IDP, and notifies the company IDP of the common key.

Thereafter, the customer of the company IDP uses the WEB terminal to inspect a web page of the EC site of the associated EC agent and order a commodity (step 13). Consequently, the WEB terminal transmits order information including the customer ID of the customer to a server of the EC site and the server of the EC site receives order information.

Thereafter, the server of the EC site acquires the customer ID from the received order information and transmits an address disclosure request including the customer ID to the intermediary apparatus 4 (step 14). Specifically, the server of the EC site transmits an HTTP request message, which includes the customer ID as a retrieval key, based on the HTTP protocol. In addition, the server of the EC site includes authentication information of the server itself in the HTTP request message.

Thereafter, the intermediary apparatus 4 receives the address disclosure request, authenticates a transmission source of the request to judge whether the transmission source is an apparatus of the associated agent, and acquires an ID included in the request (step 15). This authentication can be realized by basic authentication or digest authentication based on the HTTP protocol. When the transmission source of the request is not an apparatus of the associated agent, the intermediary apparatus 4 rejects the request. When the transmission source of the request is an apparatus of the associated agent, the intermediary apparatus 4 executes the following procedure.

The intermediary apparatus 4 acquires an electronic mail address of a customer corresponding to the customer ID acquired in at step 14 with reference to the address DB and creates an identifier-for-disclosure according to the procedure indicated by step 2 according to the first embodiment with this electronic mail address as a recipient identifier (step 16).

When the identifier-for-disclosure is created using a public key, the intermediary apparatus 4 uses the public key made public by the ISP. When the identifier-for-disclosure is created using a common key, the intermediary apparatus 4 uses the common key of the IDP.

It is possible to include information limiting a sender address or information designating an expiration date of the identifier-for-disclosure as a condition. When the sender address is limited, it is assumed that the intermediary apparatus 4 has a DB for storing an electronic mail address of the associated agent. The reference numeral c1 described at step 2 according to the first embodiment is set as "S" and the hash value of the electronic mail address of the request transmission source authenticated at step 15 is set as c2. On the other hand, when an expiration date is designated, a value, which is obtained by adding a fixed time (fourteen days, thirteen days, etc.) from the point with c1 set as "T", is set as c2.

Thereafter, the intermediary apparatus 4 transmits a response message responding to the address disclosure request to the server of the EC site with the created identifier-for-disclosure included in the response message (step 17). The server of the EC site stores the received conditioned recipient identifier together with the order information received at step 13 (step 18).

An employee of the associated EC agent makes contact with the customer using an electronic mail as required. In this case, the employee transmits the electronic mail with the conditioned recipient identifier stored at step 18 by the EC site as a destination of the electronic mail. Operations after that are the same as the processing of step 4 and the subsequent steps according to the first embodiment. If the electronic mail address is circulated in this way, it is possible to prevent the employee of the EC agent from leaking the electronic mail address of the customer for an illegal purpose.

Figure 11:
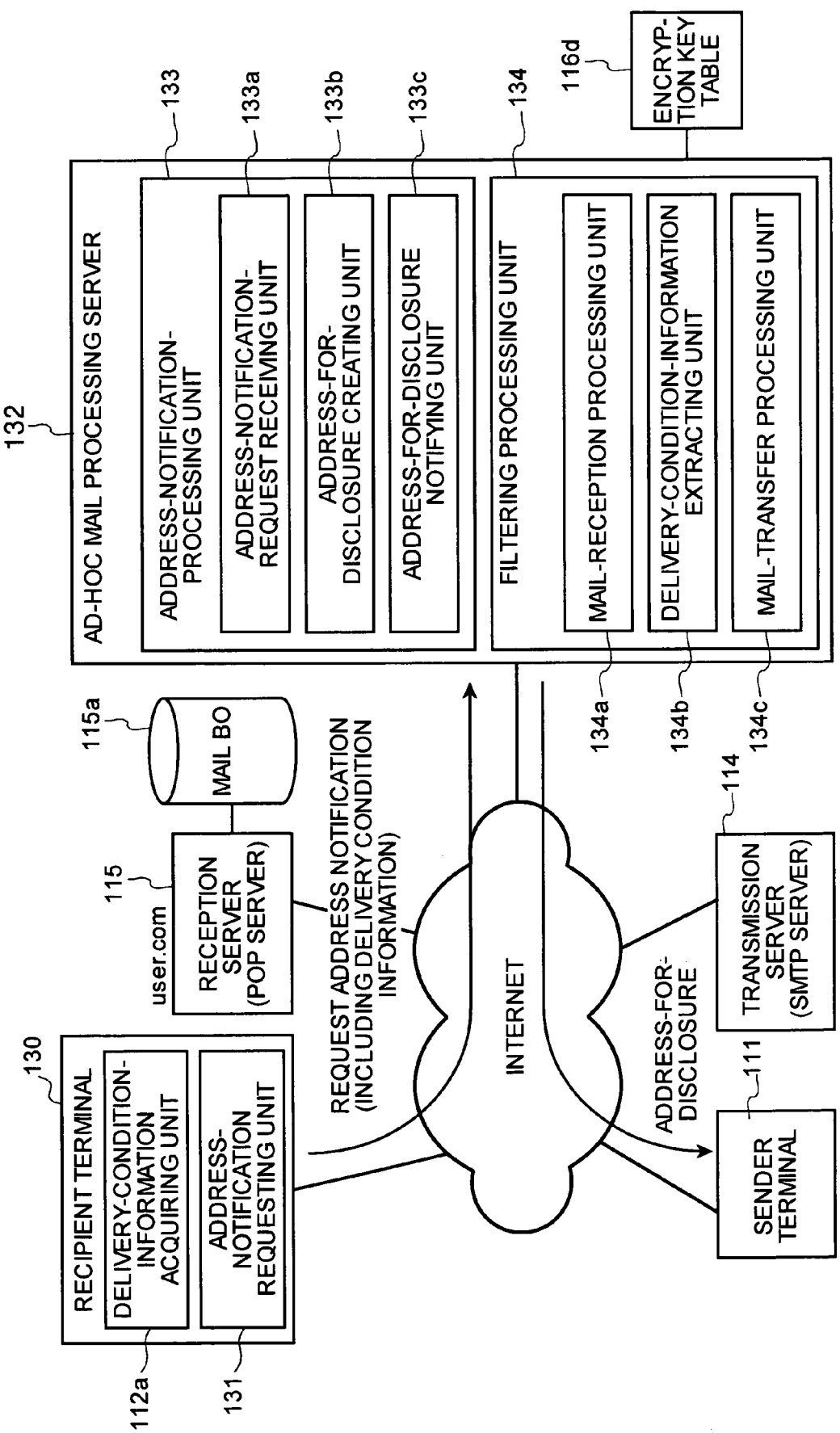
FIG. 11 is a schematic of a system configuration in which a mail-for-disclosure processing server that performs both creation of an address-for-disclosure and filtering is provided.

A mail system, to which the second embodiment is applied, is explained more specifically. FIG. 11 is a schematic of a system configuration in which a mail-for-disclosure processing server 132, which performs both creation of an address-for-disclosure and filtering, is provided.

As shown in the figure, in this case, in a recipient terminal 130, when the delivery-condition-information acquiring unit 112a acquires delivery condition information, an address-notification requesting unit 131 requests the mail-for-disclosure processing server 132 to notify the sender terminal 111 of the address-for-disclosure. Specifically, it is necessary to include a recipient address and delivery condition information (a sender address and an expiration date) in this address notification request.

When an address notification request receiving unit 133a included in an address notification processing unit 133 of the mail-for-disclosure processing server 132 receives such an address notification request from the recipient terminal 130, an address-for-disclosure creating unit 133b creates an address-for-disclosure, and the address-for-disclosure notifying unit 133c notifies the sender terminal 111 of the address-for-disclosure. Note that a mail-reception processing unit 134a, a delivery-condition-information extracting unit 134b, and a mail-transfer processing unit 134c forming a filtering processing unit 134 have the same functions as the mail-reception processing unit 116a, the delivery-condition-information extracting unit 116b, and the mail-transfer processing unit 116c of the filtering server 116 shown in FIG. 3.

In this way, since creation of an address-for-disclosure is assigned to a server apparatus separate from the recipient terminal 130, it is possible to create an address-for-disclosure without causing an increase in a processing load of the recipient terminal 130. In particular, as shown in FIG. 11, since creation of an address-for-disclosure and filtering are assigned to the same server apparatus, it is possible to make processing for an address-for-disclosure unitary. This is advantageous in adopting a business form for providing the processing as a single business service.

According to the second embodiment, a recipient identifier is registered in an intermediary apparatus. However, in some cases, a recipient does not wish to reveal a recipient identifier to an operator of an intermediary apparatus either. In such a case, a preliminary identifier-for-disclosure To is created using a recipient identifier R of the recipient and specific information (preliminary communication condition information) Co in a communication terminal of the recipient or a relay system. This preliminary identifier-for-disclosure To is registered in an intermediary apparatus as a recipient identifier of the recipient. The intermediary apparatus requests another apparatus to rewrite the specific additional information Co to original communication condition information C, obtains an identifier-for-disclosure T from the preliminary identifier-for-disclosure To, and notifies a sender of this identifier-for-disclosure T.

Figure 12:
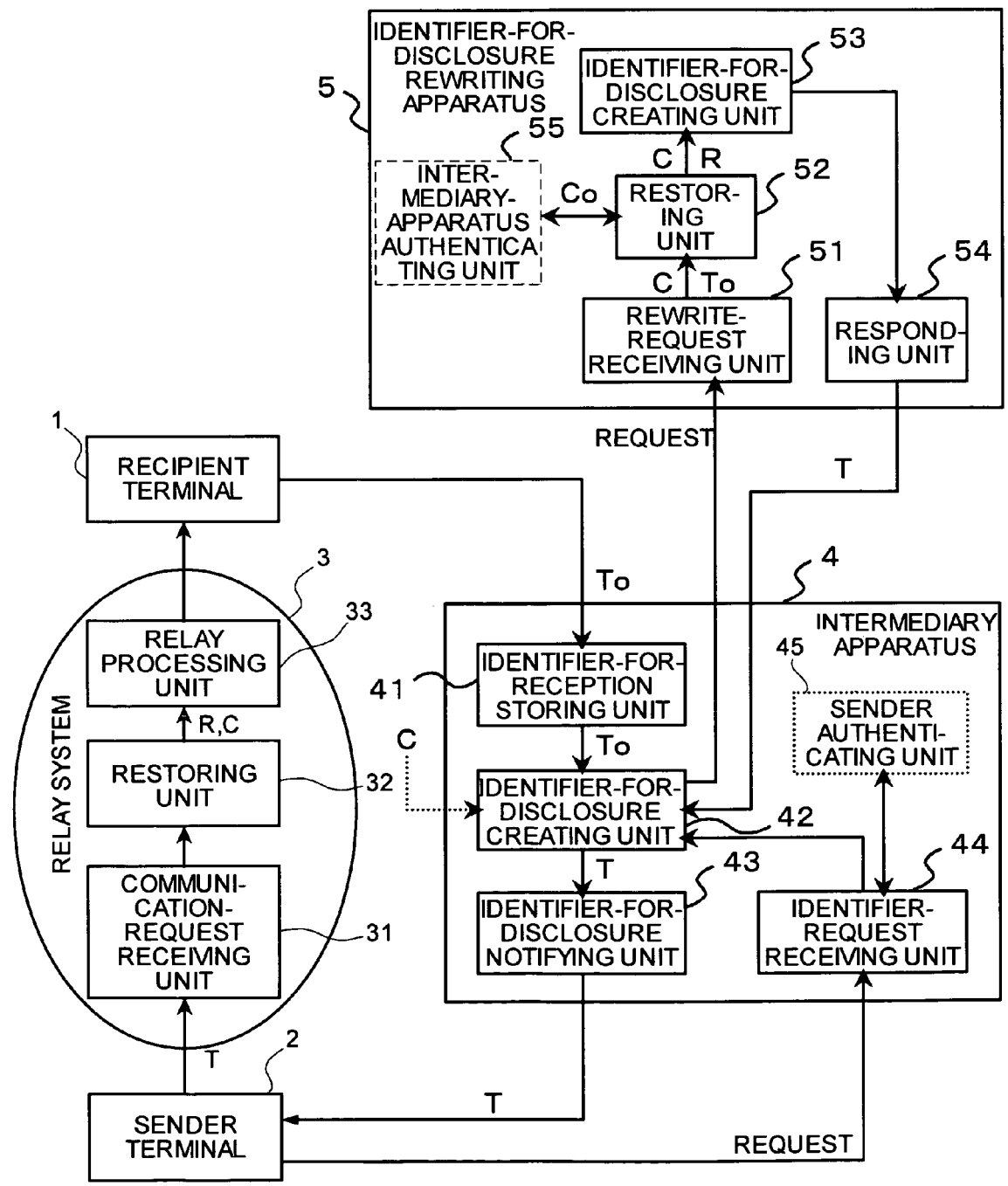
FIG. 12 is a schematic of a configuration of a communication system according to a third embodiment of the present invention.

FIG. 12 is a schematic of a basic configuration of a communication system of the present invention using an identifier-for-disclosure rewriting apparatus 5. As shown in the figure, the identifier-for-disclosure rewriting apparatus 5 has a rewrite-request receiving unit 51, a restoring unit 52, an identifier-for-disclosure creating unit 53, and a responding unit 54.

In such a configuration, the recipient terminal 1 creates the preliminary identifier-for-disclosure To using the recipient identifier R and specific information, in particular, the information (the preliminary communication condition information) Co for limiting a disclosure destination to the intermediary apparatus 4 in advance. The recipient terminal 1 sends the preliminary identifier-for-disclosure To to the intermediary apparatus 4 according to communication using an ordinary relay system and registers the preliminary identifier-for-disclosure To in a recipient-identifier storing unit 41.

The sender terminal 2 requests the intermediary apparatus 4 to disclose the identifier-for-disclosure of the recipient terminal 1 according to communication using the ordinary relay system (not shown). In the intermediary apparatus 4, when the identifier-request receiving unit 44 receives this request, the identifier-for-disclosure creating unit 42 designates the preliminary identifier-for-disclosure To stored in the recipient-identifier storing unit 41 and the predetermined communication condition information C, which is stored separately or inputted, and requests the identifier-for-disclosure rewriting apparatus 5 to rewrite communication condition information according to communication using the ordinary relay system.

In the identifier-for-disclosure rewriting apparatus 5, when the rewrite-request receiving unit 51 receives this request, the restoring unit 52 decrypts the preliminary identifier-for-disclosure To with a method executable by only an operator of the rewriting apparatus 5 and acquires the recipient identifier R and the specific preliminary communication condition information Co. The identifier-for-disclosure creating unit 53 of the identifier-for-disclosure rewriting apparatus 5 creates the identifier-for-disclosure T with a method executable by operators other than the operator of the relay system 3 from the acquired recipient identifier R and the designated communication condition information C. The responding unit 54 transmits the identifier-for-disclosure T to the intermediary apparatus 4 according to communication using the ordinary relay system.

In this case, if the identifier-for-disclosure rewriting apparatus 5 includes an authenticating unit 55 that judges whether the intermediary apparatus, which requests rewriting, has a qualification for requesting rewriting based on the preliminary communication condition information of the preliminary identifier-for-disclosure To, that is, the information Co for limiting a disclosure destination to the intermediary apparatus 4 and abandons the request when the intermediary apparatus does not have the qualification, it is possible to prevent the identifier-for-disclosure rewriting apparatus 5 from rewriting preliminary communication condition information in an intermediary apparatus that is unqualified for the recipient.

The intermediary apparatus 4 transmits the received identifier-for-disclosure T to the sender terminal 2 with the identifier-for-disclosure notifying unit 43 according to communication using the ordinary relay system. The sender terminal 2 designates the identifier-for-disclosure T to request the relay system 3 to perform communication. Operations after that are the same as those in the case of FIG. 1.

Figure 13:
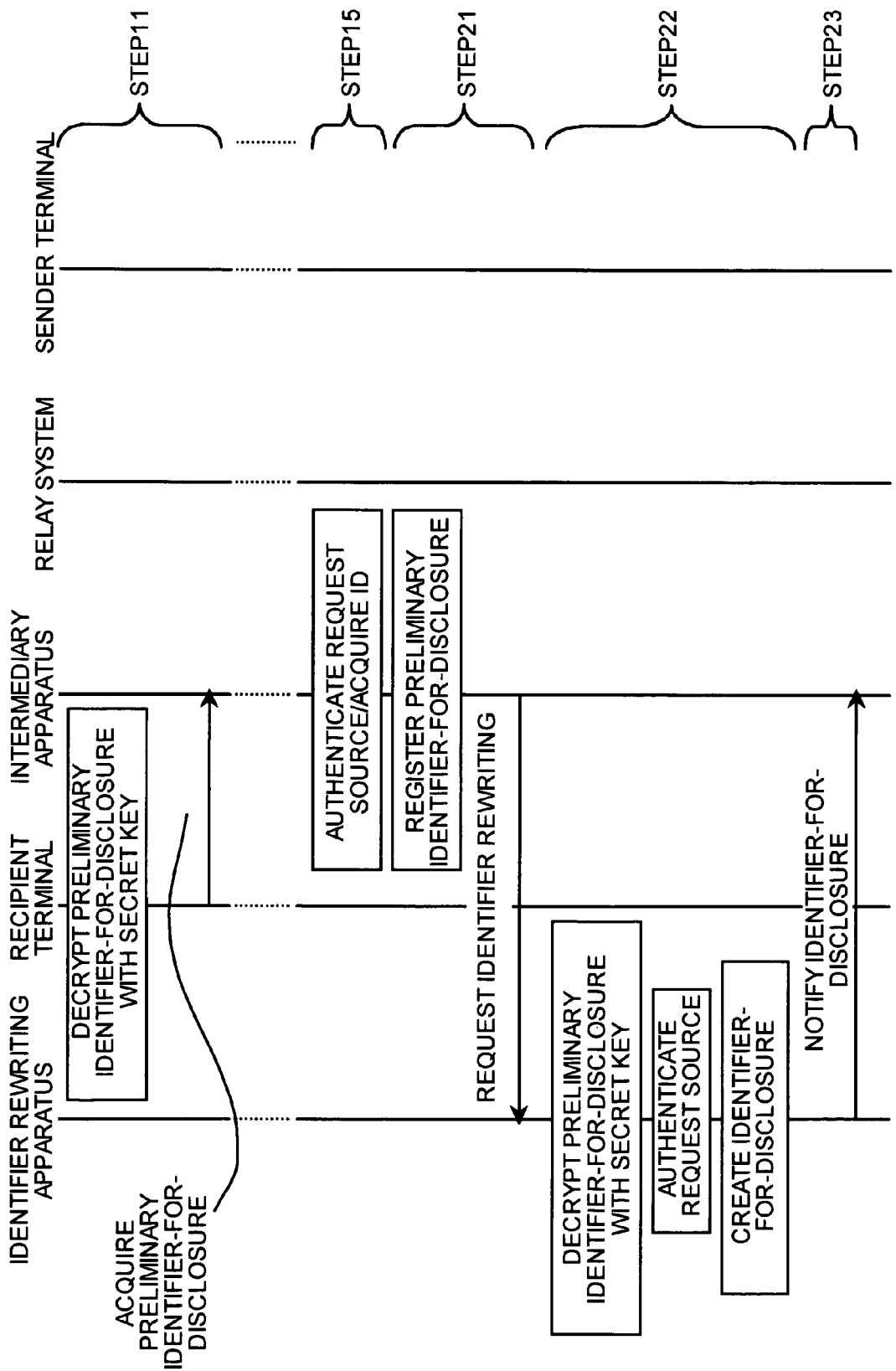
FIG. 13 is a sequence chart of a processing procedure according to the third embodiment shown in FIG. 12.

FIG. 13 is a sequence chart of a processing procedure in the third embodiment. Here, the ISP operates the identifier-for-disclosure rewriting apparatus 5. The ISP allocates an intermediary agent ID to the IDP. In creation of the preliminary identifier-for-disclosure To, a customer creates a disclosure specifying identifier having the intermediary agent ID as the communication condition information Co. Moreover, in step 11, the customer notifies the intermediary apparatus 4 of the disclosure destination specifying identifier instead of an electronic mail address of the customer himself/herself. Then, an operation at step 16 according to the second embodiment is as described below.

First, the intermediary apparatus 4 acquires an electronic mail address of a customer corresponding to the customer ID acquired at step 15 with reference to the address DB. Then, when this electronic mail address is in a form of a preliminary identifier-for-disclosure, the intermediary apparatus 4 transmits a rewriting request including the electronic mail address To and the predetermined preliminary communication condition information C to the identifier-for-disclosure rewriting apparatus 5 (step 21). Specifically, the intermediary apparatus 4 transmits an HTTP request message including the electronic mail address To and the preliminary communication condition information C. In this case, the intermediary apparatus 4 includes authentication information including the intermediary agent ID in the request message. Here, C indicates information for limiting a sender to the EC site. In other words, c1 is set as "S" and c2 is set as a hash value of an electronic mail address of the EC site.

Thereafter, the rewriting apparatus 5 receives the HTTP request message and, as at step 5 according to the first embodiment, acquires the recipient identifier R and the preliminary communication condition information Co from the address To. Then, the rewriting apparatus 5 checks whether the preliminary communication condition information Co and the intermediary agent ID indicted by the authentication information included in the request message coincide with each other. When the preliminary communication condition information Co and the intermediary agent ID coincide with each other, the rewriting apparatus 5 creates the identifier-for-disclosure T in the same manner as step 2 according to the first embodiment (step 22). Note that, when the preliminary communication condition information Co and the intermediary agent ID do not coincide with each other, the rewriting apparatus 5 abandons the rewriting request.

Thereafter, the rewriting apparatus 5 sends the identifier-for-disclosure T to the intermediary apparatus 4 as a response to the request message (step 23).

According to the third embodiment, a preliminary identifier-for-disclosure is created in the recipient terminal. It is assumed that the recipient terminal in this context includes a computer used by a recipient, a router, a PBX, and the like. Other than the communication terminal of the recipient, the relay system granting a recipient identifier may create an identifier-for-disclosure and a preliminary identifier-for-disclosure.

Incidentally, although the present invention is applied to the mail systems in the first to the third embodiments, it is also possible to apply the present invention to systems other than the mail systems. Thus, according to a fourth embodiment of the present invention, the present invention is applied to a telephone exchange system (a telephone number).

Figure 14:
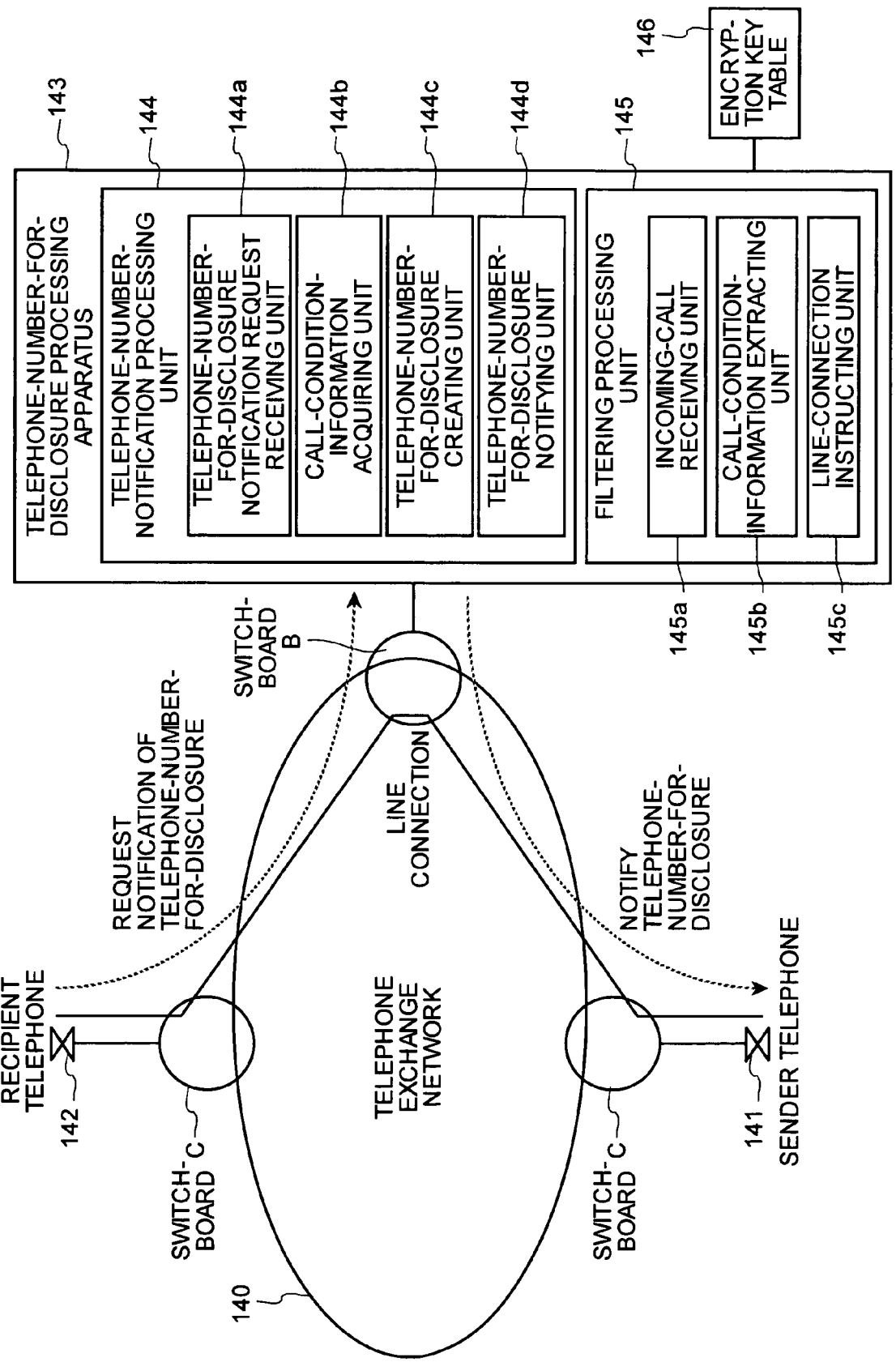
FIG. 14 is a block diagram of a system configuration of a telephone exchange system according to a fourth embodiment of the present invention.

First, characteristics of the telephone exchange system according to the fourth embodiment are explained. FIG. 14 is a block diagram of a system configuration of the telephone exchange system according to the fourth embodiment. According to the fourth embodiment, it is assumed that, when a person makes a call from a telephone set, a telephone number of a person at the other end of the line and a telephone number of the person making the call are notified to the person at the other end of the line.

In the telephone exchange system shown in the figure, when a user (a sender) of a sender telephone 141 makes a call to a user (a recipient) of a recipient telephone 142, the sender dials a telephone-number-for-disclosure embedded with call condition information rather than simply dialing a telephone number of the recipient telephone 142. Specifically, such a telephone number is a telephone number including a service special number, for example, 0132-111-111 such that a telephone is adapted for a telephone-number-for-disclosure processing apparatus 143.

Consequently, such a telephone is off-hooked in the telephone-number-for-disclosure processing apparatus 143. It is judged whether a line of contact between the sender telephone 141 and the recipient telephone 142 should be connected based on the call condition information included in the telephone-number-for-disclosure. When it is judged that the line of contact should be connected, the telephone-number-for-disclosure processing apparatus 143 dials the recipient telephone 142 and instructs a switchboard B to connect the line of contact between the sender telephone 141 and the recipient telephone 142.

In this way, in such a telephone exchange system, the sender telephone 141 dials the telephone-number-for-disclosure processing apparatus 143 using the telephone-number-for-disclosure embedded with the call condition information. The telephone-number-for-disclosure processing apparatus 143 connects only legitimate sender telephones based on the call condition information in the telephone-number-for-disclosure, whereby only call requests satisfying the call conditions are connected.

Next, a configuration of the telephone exchange system shown in FIG. 14 is explained. As shown in the figure, this telephone exchange system has a system configuration in which the sender telephone 141 is connected to a switchboard A forming a telephone exchange network 140, the telephone-number-for-disclosure processing apparatus 143 is connected to the switchboard B, and the recipient telephone 142 is connected to a switchboard C. When these switchboards A, B, and C receive the telephone number of the service special number "0132-111-111", the switchboards A, B, and C connect lines to the telephone-number-for-disclosure processing apparatus 143.

Here, the telephone-number-for-disclosure processing apparatus 143 is an apparatus that performs creation of a telephone-number-for-disclosure and filtering based on call condition information included in the telephone-number-for-disclosure. The telephone-number-for-disclosure processing apparatus 143 has a telephone-number-notification processing unit 144, a filtering processing unit 145, and an encryption-key table 146.

The telephone-number-notification processing unit 144 is a processing unit that, when a notification request for a telephone-number-for-disclosure is received from the recipient telephone 142, creates a telephone-number-for-disclosure based on an incoming-call telephone number and call condition information and notifies the sender telephone 141 of the telephone-number-for-disclosure. The telephone-number-notification processing unit 144 has a telephone-number-for-disclosure notification request receiving unit 144a, a call-condition-information acquiring unit 144b, a telephone-number-for-disclosure creating unit 144c, and a telephone-number-for-disclosure notifying unit 144d.

The telephone-number-for-disclosure notification request receiving unit 144a is a processing unit that receives a notification request for a telephone-number-for-disclosure to the sender telephone 141 from the recipient telephone 142. Specifically, the telephone-number-for-disclosure notification request receiving unit 144a confirms a notification request for a telephone-number-for-disclosure according to number input by an automatic voice response.

The call-condition-information acquiring unit 144b is a processing unit that acquires call condition information embedded in a telephone-number-for-disclosure. Specifically, the call-condition-information acquiring unit 144b acquires a sender telephone number and an expiration date forming call condition information according to automatic voice response and outputs the sender telephone number and the expiration date to the telephone-number-for-disclosure creating unit 144c.

The telephone-number-for-disclosure creating unit 144c is a processing unit that creates a telephone-number-for-disclosure based on an incoming-call telephone number and call condition information (an outgoing-call telephone number and an expiration date). Specifically, the telephone-number-for-disclosure creating unit 144c grants an identification ID for an encryption key to encrypted data, which is obtained by encrypting a character string including an incoming-call telephone number, an outgoing-call telephone number, and an expiration date with an encryption key of a common key encryption system, and adds a service special number "0132-111-111" to the encrypted data to obtain a telephone-number-for-disclosure.

The telephone-number-for-disclosure notifying unit 144d is a processing unit that notifies the sender telephone 141 of the telephone-number-for-disclosure created by the telephone-number-for-disclosure creating unit 144. Specifically, the telephone-number-for-disclosure notifying unit 144d notifies the telephone-number-for-disclosure using automatic dialing and voice message.

The filtering processing unit 145 is a processing unit that judges wither a line connection between the recipient telephone 142 and the sender telephone 141 should be performed based on call condition information (call condition) included in a telephone-number-for-disclosure and, only when the call condition is satisfied, performs the line connection. The filtering processing unit 145 has an incoming-call receiving unit 145a, a call-condition-information extracting unit 145b, and a line-connection instructing unit 145c.

The incoming-call receiving unit 145a is a processing unit that receives an incoming call using the telephone-number-for-disclosure from the sender telephone 141. The call-condition-information extracting unit 145b is a processing unit that decrypts call condition information from the telephone-number-for-disclosure with an encryption key and extracts an outgoing-call telephone number and an expiration date.

The line-connection instructing unit 145c is a processing unit that, when the outgoing-call telephone number extracted by the call-condition-information extracting unit 145b is proper and has not passed the expiration date, dials (calls) the recipient telephone 142 and instructs the switchboard B to connect the recipient telephone 142 and the sender telephone 141.

Figure 15:
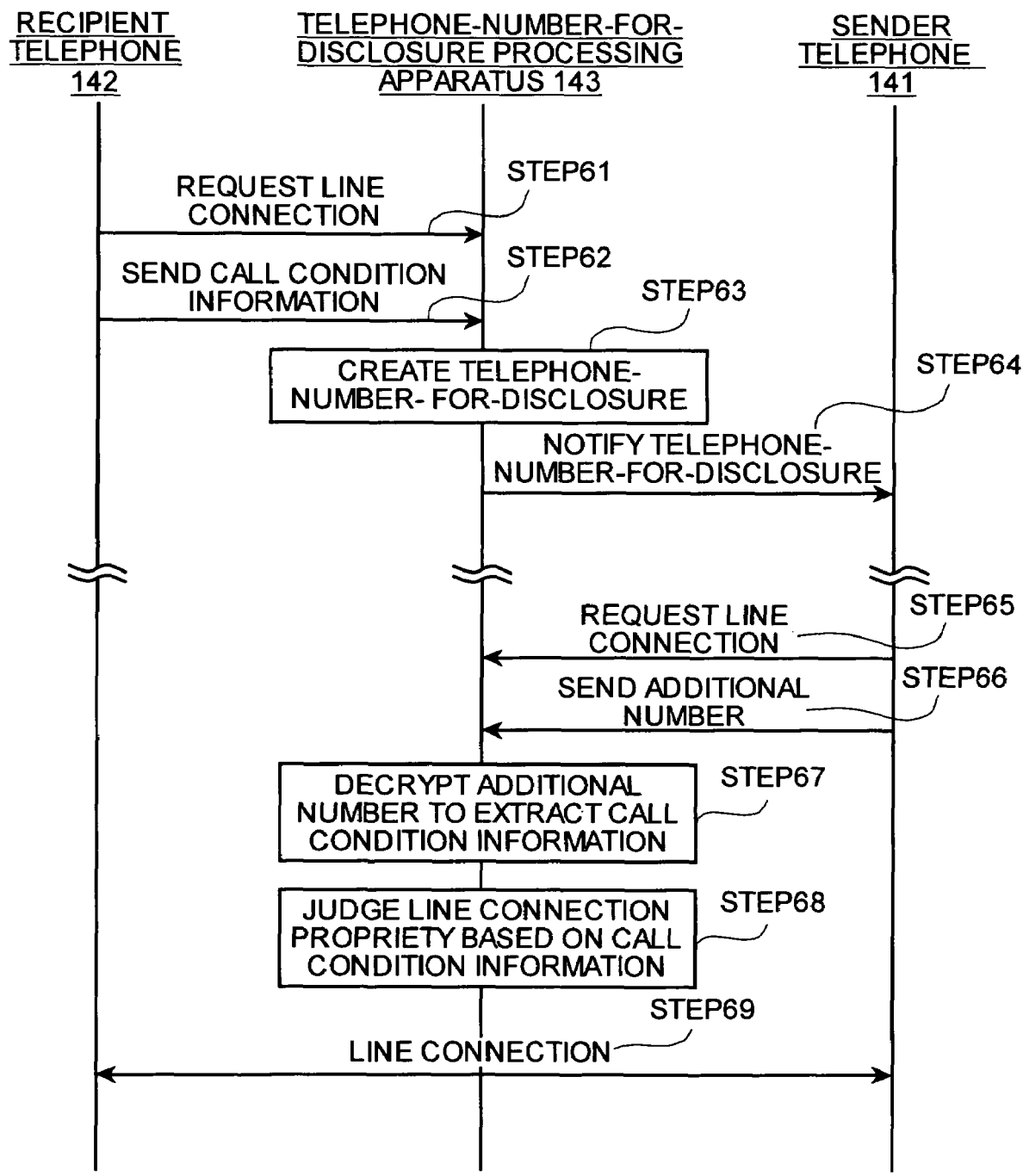
FIG. 15 is a sequence chart of a processing procedure for a telephone for a recipient, a telephone-number-for-disclosure processing apparatus, and a processing procedure for a sender telephone.

Next, a processing procedure for the recipient telephone 142, the telephone-number-for-disclosure processing apparatus 143, and the sender telephone 141 shown in FIG. 14 is explained. FIG. 15 is a sequence chart the processing procedure for the recipient telephone 142, the telephone-number-for-disclosure processing apparatus 143, and the sender telephone 141 shown in FIG. 14.

As shown in the figure, first, when a user (a recipient) using the recipient telephone 142 needs a telephone-number-for-disclosure to apply for mail order, the user dials the telephone number "0132-111-111," of the telephone-number-for-disclosure processing apparatus 143 to request line connection (step 61). The recipient telephone 142 sends call condition information according to a voice guidance (step 62). Specifically, the recipient telephone 142 sends an outgoing-call telephone number (a mail address of a mail order agent) and an expiration date as call condition information.

When the telephone-number-for-disclosure processing apparatus 143 acquires such call condition information, the telephone-number-for-disclosure processing apparatus 143 creates a telephone-number-for-disclosure embedded with this call condition information (step 63) and notifies a user of the sender telephone 141 of the created telephone-number-for-disclosure with a voice message (step 64).

Thereafter, the user of the sender telephone 141 dials a part of the telephone-number-for-disclosure "0132-111-111" to request line connection (step 65) and, then, the sender telephone 141 transmits an additional number forming the remaining part of the telephone-number-for-disclosure to the telephone-number-for-disclosure processing apparatus 143 (step 66). Then, the telephone-number-for-disclosure processing apparatus 143 decrypts the additional number to extract the call condition information (step 67) and judges whether line connection is possible based on the call condition information (step 68). When a call condition of the call condition information is satisfied, the telephone-number-for-disclosure processing apparatus 143 performs line connection between the recipient telephone 142 and the sender telephone 141 (step 69).

Figure 16:
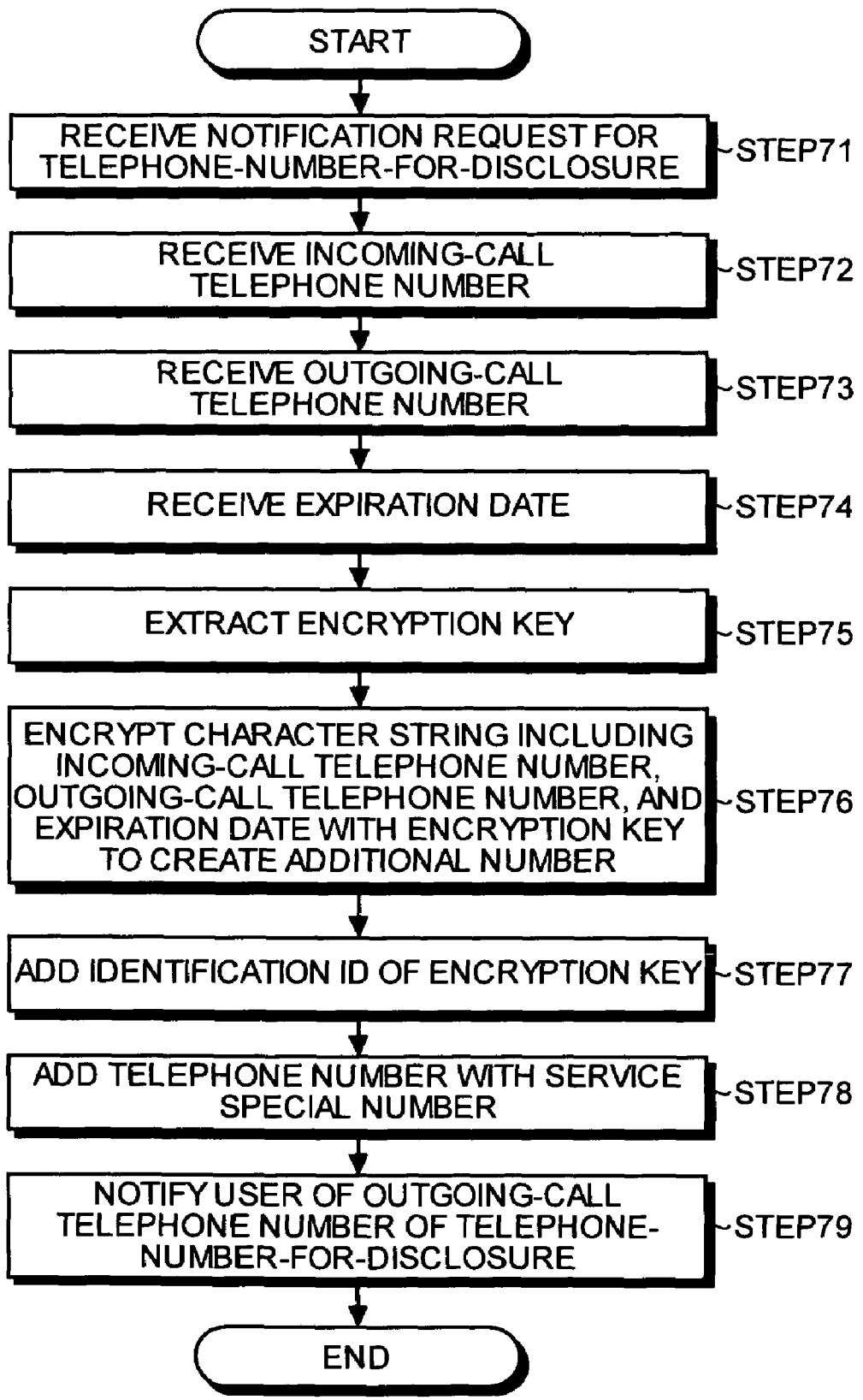
FIG. 16 is a flowchart of a processing procedure for a telephone-number-notification processing unit shown in FIG. 14.

Next, a processing procedure for the telephone-number-notification processing unit 144 shown in FIG. 14 is explained. FIG. 16 is a flowchart of the processing procedure for the telephone-number-notification processing unit 144 shown in FIG. 14. As shown in the figure, when the telephone-number-for-disclosure notification request receiving unit 144a receives a notification request for a telephone-number-for-disclosure from the recipient telephone 142 (step 71). The call-condition-information acquiring unit 144b performs voice guidance and receives an incoming-call telephone number, an outgoing-call telephone number, and an expiration date sequentially (steps 72 to 74).

Thereafter, the telephone-number-for-disclosure creating unit 144c extracts an encryption key from the encryption-key table 146 (step 75) and encrypts a character string including the incoming-call telephone number, the outgoing-call telephone number, and the expiration date with the encryption key to create an additional number (step 76). In addition, the telephone-number-for-disclosure creating unit 144 adds an identification ID of the encryption key to this additional number (step 77) and further adds a service special number "0132-111-111" to this additional number (step 78) to create a telephone-number-for-disclosure. Finally, the telephone-number-for-disclosure notifying unit 144d notifies the user of the sender telephone 141 of the telephone-number-for-disclosure (step 79) created.

Figure 17:
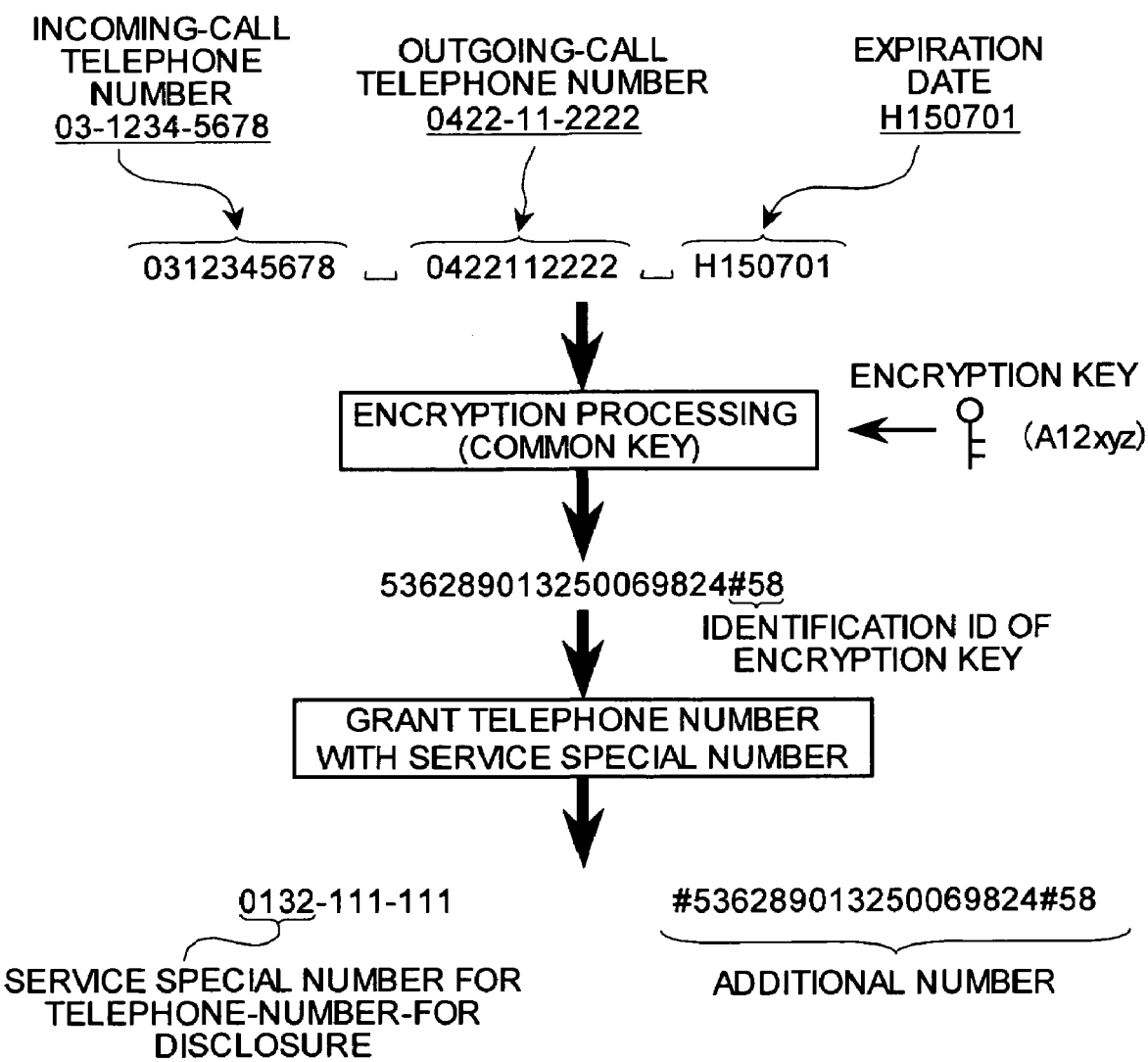
FIG. 17 is a schematic for explaining how to create a telephone-number-for-disclosure by a telephone-number-for-disclosure creating unit shown in FIG. 14.

Next, how to create a telephone-number-for-disclosure by the telephone-number-for-disclosure creating unit 144c shown in FIG. 14 is explained more specifically. FIG. 17 is a schematic for explaining how to create a telephone-number-for-disclosure by the telephone-number-for-disclosure creating unit 144c shown in FIG. 14.

As shown in the figure, in creating a telephone-number-for-disclosure, first, the telephone-number-for-disclosure creating unit 144c encrypts a character string, which is obtained by connecting an incoming-call telephone number "03-1234-5678", an outgoing-call telephone number "0422-11-2222", and an expiration date "H150701" with blanks, using an encryption key "A12xyz" to create encrypted data "536289013250069824".

Thereafter, the telephone-number-for-disclosure creating unit 144c adds an identification ID "#58" of the encryption key to this encrypted data to obtain an additional number "536289013250069824#58" and sets "0132-111-111 536289013250069824#58", which is obtained by adding the service special number "0132-111-111" to the additional number, as a telephone-number-for-disclosure.

Note that, it is also possible to use a character such as "+" as a connector. In addition, it is also possible to create an additional number using numbers after an area code (e.g., in the case of 03-1234-5678, "12345678") instead of creating an additional number using the entire telephone number.

Figure 18:
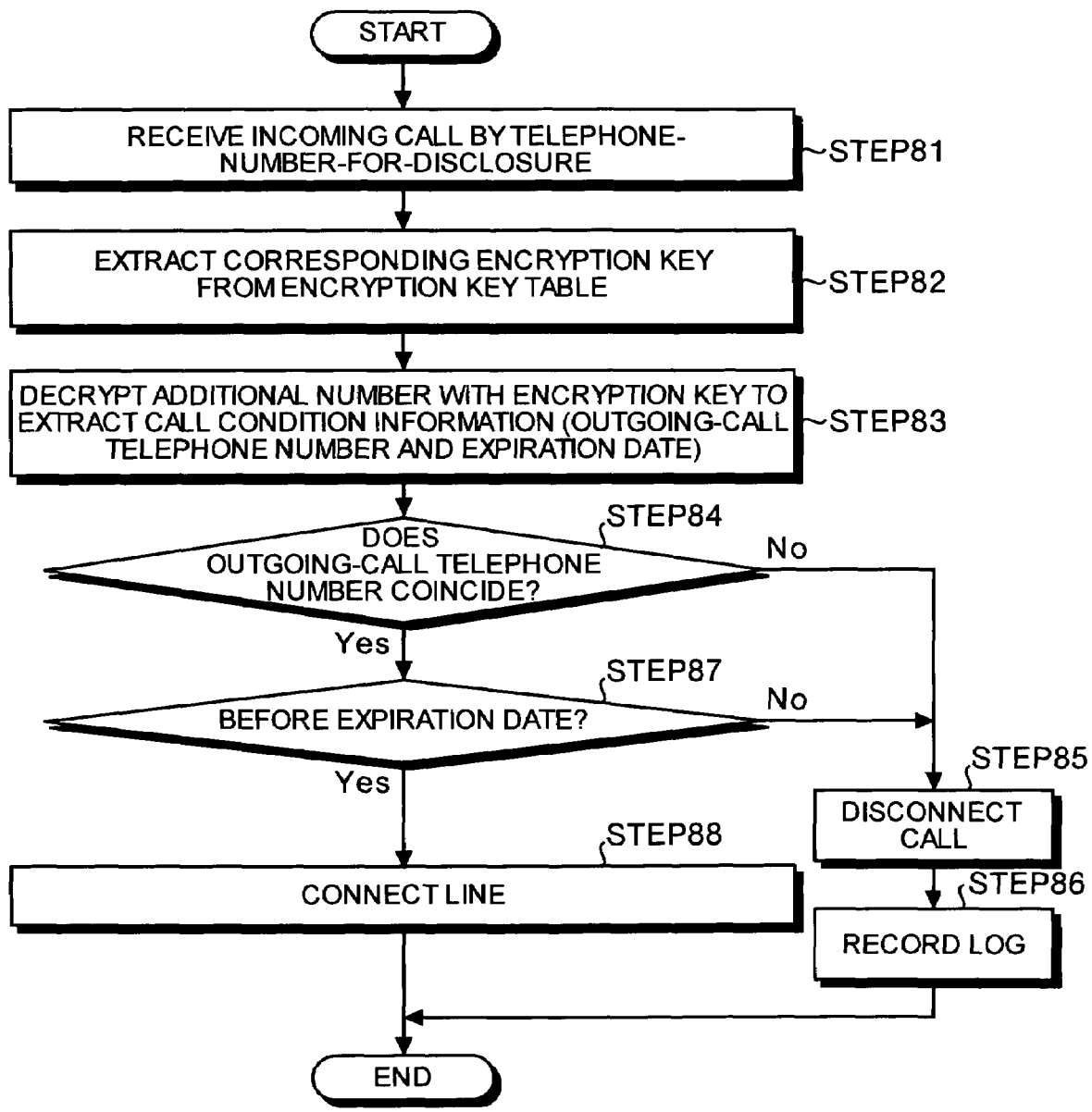
FIG. 18 is a flowchart of a processing procedure for a filtering processing unit shown in FIG. 14.

Next, a processing procedure for the filtering processing unit 145 shown in FIG. 14 is explained. FIG. 18 is a flowchart of the processing procedure for the filtering processing unit 145 shown in FIG. 14. As shown in the figure, in this filtering processing unit 145, when the incoming-call receiving unit 145a receives an incoming call of a telephone-number-for-disclosure (step 81), the call-condition-information extracting unit 145b extracts a corresponding encryption key from the encryption-key table 146 (step 82).

Thereafter, the call-condition-information extracting unit 145b decrypts an additional number with the extracted encryption key to extract call condition information (an outgoing-call telephone number and an expiration date) (step 83) and checks whether the outgoing-call telephone number included in the call condition information coincides with a notified telephone number of an outgoing call source (step 84). As a result, when the outgoing-call telephone number and the telephone number of the outgoing call source do not coincide with each other ("No" at step 84), the line-connection instructing unit 145c regards the incoming call is not a call from a permitted user, disconnects the call (step 85), and records a log of the processing (step 86).

On the other hand, when the outgoing-call telephone number included in the call condition information coincides with the notified telephone number of the outgoing call source ("Yes" at step 84), the line-connection instructing unit 145c checks whether an incoming call time is before expiration date included in the call condition information (step 87). As a result, when the incoming call time is not before expiration date ("No" at step 87), the line-connection instructing unit 145c disconnects the call for reasons of expiration of the term (step 85) and records a log of the processing (step 86). When the incoming call time is before expiration date ("Yes" at step 87), the line-connection instructing unit 145c regards that both the conditions are satisfied, makes contact with the recipient telephone 142 by phone, and instructs the switchboard B to perform line connection (step 88).

Figure 19:
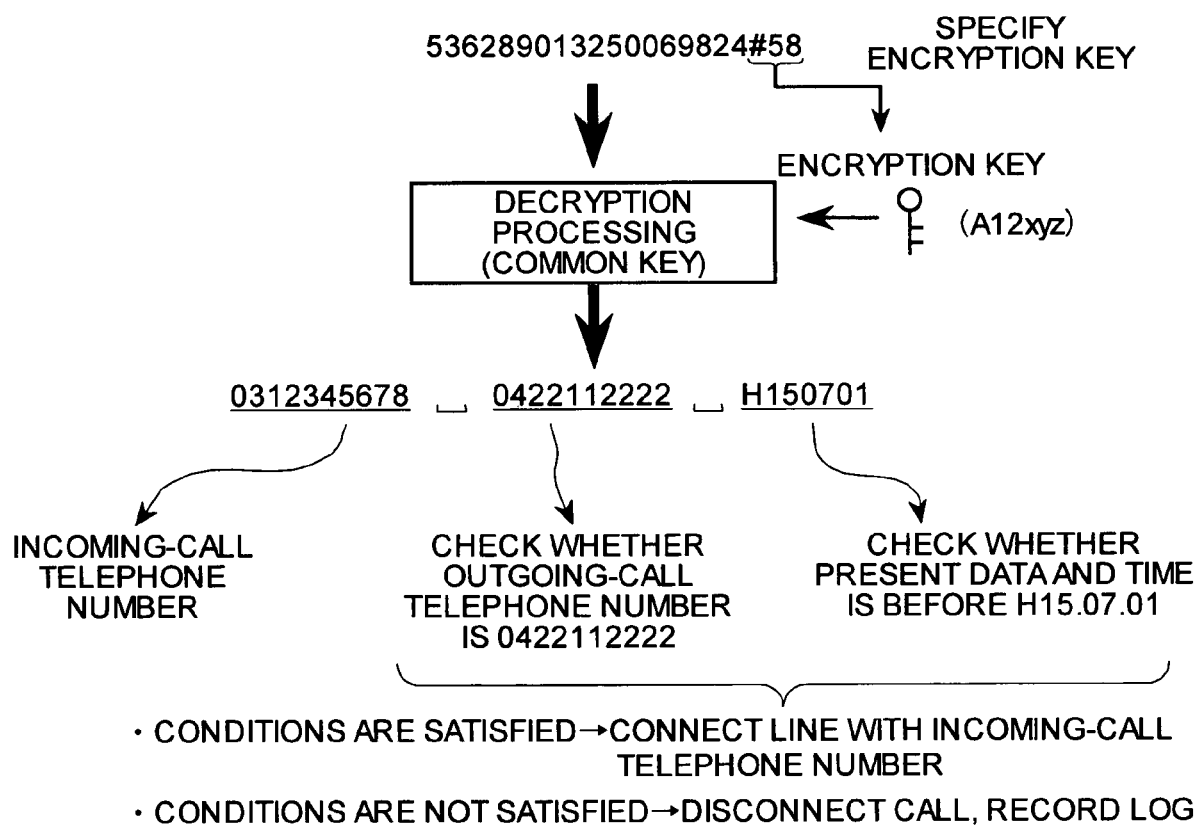
FIG. 19 is a schematic for explaining how to implement filtering by a call-condition-information extracting unit and a line-connection instructing unit shown in FIG. 14.

Next, how to implement filtering by the call-condition-information extracting unit 145b and the line-connection instructing unit 145c shown in FIG. 14 is explained more specifically. FIG. 19 is a schematic for explaining how to implement filtering by the call-condition-information extracting unit 145b and the line-connection instructing unit 145c shown in FIG. 14.

As shown in the figure, the call-condition-information extracting unit 145b specifies an encryption key from the identification ID "#58" located at the end of the additional number "536289013250069824#58" of the telephone-number-for-disclosure, extracts a corresponding encryption key from the encryption-key table 146, and decrypts the additional number "536289013250069824" with the encryption key.

Consequently, since a character string "0312345678 0422112222H150701" is obtained, the line-connection instructing unit 145c checks whether a telephone number of an outgoing call source of this call is "0422-11-2222" and checks whether an incoming call time is before "H15.07.01".

When both the conditions are satisfied, the line-connection instructing unit 145c connects the recipient telephone 142 having the incoming-call telephone number and the sender telephone 141. If at least one of the conditions is not satisfied, the line-connection instructing unit 145c disconnects the call and records a log.

Note that, for convenience of explanation, a call is disconnected when the conditions are not satisfied. However, it is also possible to connect a line with a telephone set of an administrator or the like when the conditions are not satisfied. Consequently, the administrator or the like can grasp a state of unsolicited calls and the like properly.

In this way, the telephone-number-for-disclosure creating unit 144c of the telephone-number-for-disclosure processing apparatus 143 encrypts an incoming-call telephone number and call condition information to create a telephone-number-for-disclosure and notifies the sender telephone 141 of the telephone-number-for-disclosure. When a communication connection request by the telephone-number-for-disclosure is received from the sender telephone 141, the call-condition-information extracting unit 145b extracts the call condition information from the additional number included in the telephone-number-for-disclosure. Only when conditions of the call condition information are satisfied, line connection with the recipient telephone 142 is performed. Consequently, it is possible to control use of the incoming-call telephone number for purposes other than expected purposes following leakage and diffusion of the incoming-call telephone number.

Note that, although the sender telephone number and the expiration date are used as the call condition information (call conditions), it is also possible to use one of the sender telephone number and the expiration date as the call condition information and it is also possible to use conditions other than these conditions as call condition information. In addition, it is also possible to apply the present invention when a public key encryption system is used instead of the common key encryption system.

Figure 20:
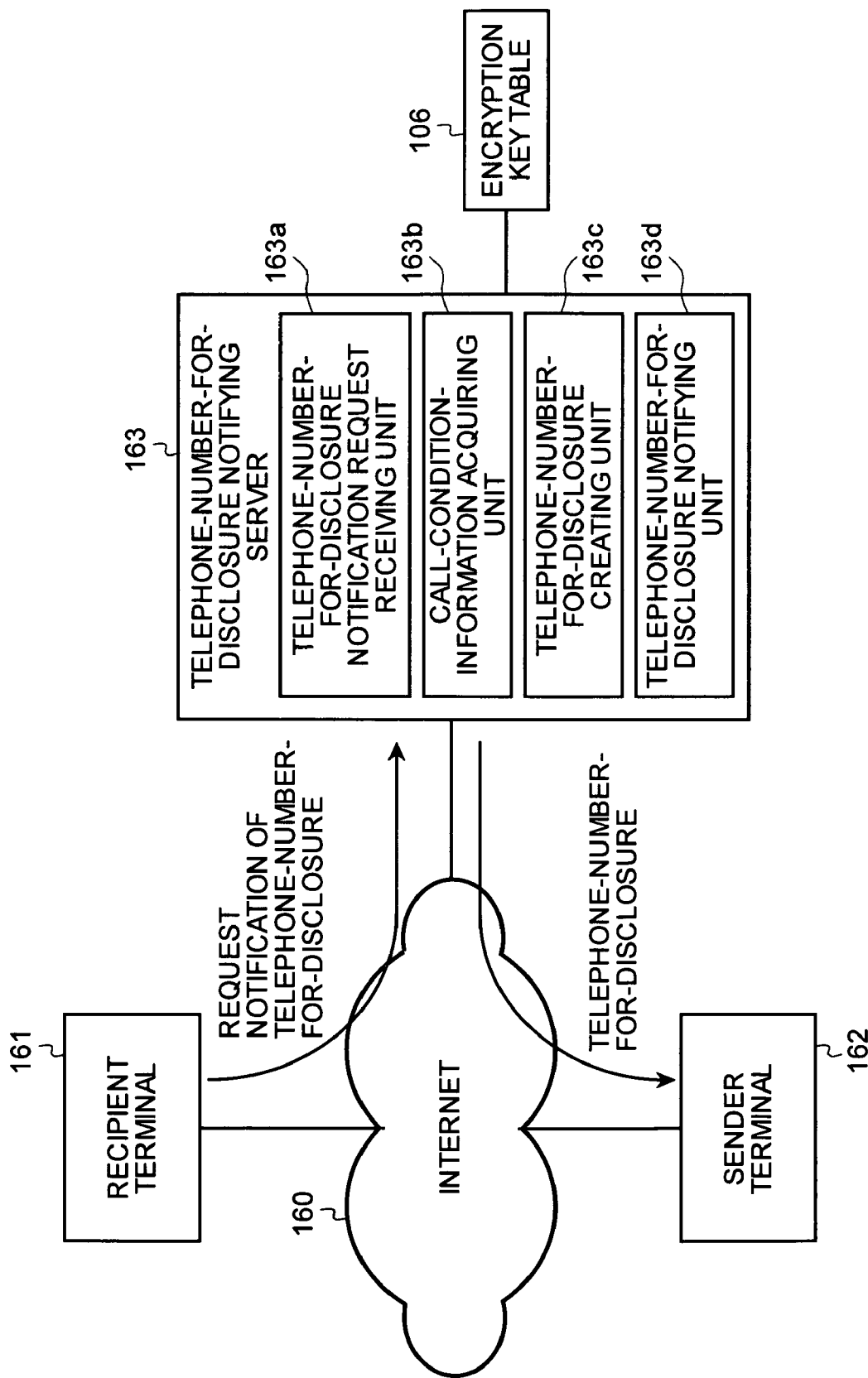
FIG. 20 is a schematic of a system configuration in which notification of a telephone-number-for-disclosure is requested using a WEB server on the Internet.

For convenience of explanation, notification of a telephone-number-for-disclosure is requested from the recipient telephone 142 using a voice guidance. However, it is also possible to request notification of a telephone-number-for-disclosure using a WEB server on the Internet. FIG. 20 is a schematic of a system configuration in which notification of a telephone-number-for-disclosure is requested using a WEB server on the Internet. As shown in the figure, when a recipient terminal 161 requests notification of a telephone-number-for-disclosure, a telephone-number-for-disclosure notifying server 163 creates a telephone-number-for-disclosure and notifies a sender terminal 162 of the telephone-number-for-disclosure. In this case, as shown in FIG. 21, the telephone-number-for-disclosure notifying server 163 provides the recipient terminal 161 with a telephone-number-for-disclosure creation page 170. A user inputs data in an incoming-call telephone number input frame 171, an outgoing-call telephone number input frame 172, and an expiration-date input frame 173 and checks an OK input frame 174. This makes it possible to display the telephone-number-for-disclosure in a telephone-number-for-disclosure display frame 175 and notify the sender terminal 162 of this telephone-number-for-disclosure.

Figure 22:
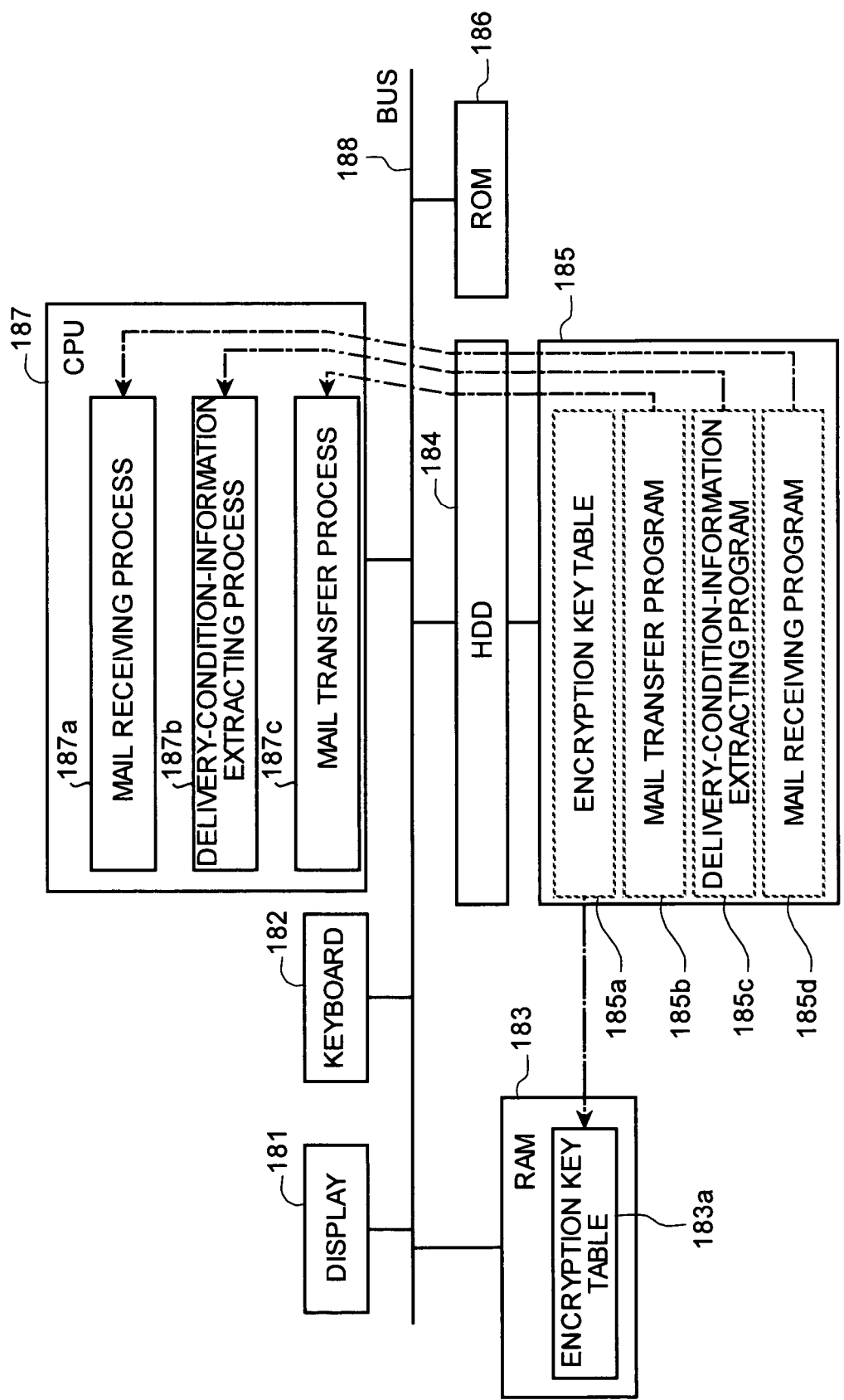
FIG. 22 is a block diagram of a hardware configuration of a filtering server shown in FIG. 3.

Although the system configuration is described in the block diagram according to the first to the fourth embodiments, it is possible to realize the respective apparatuses using a computer operating according to a program. FIG. 22 is a block diagram of a hardware configuration of the filtering server 16 shown in FIG. 3. As shown in the figure, the filtering server 116 has a configuration in which a display 181, a keyboard 182, a RAM 183, an HDD 184, an HD 185, a ROM 186, and a CPU 187 are connected by a bus 188. An encryption-key table 185a, a mail transfer program 185b, a communication-condition-information extracting program 185c, and a mail receiving program 185d are stored in the HD 185. This encryption-key table 185a is read on the RAM 183 and functions as the encryption-key table 16d in FIG. 3. The mail transfer program 185b, the communication-condition-information extracting program 185c, and the mail receiving program 185d are operated and executed on a CPU 187 as a mail transfer process 187c, a communication-condition-information extracting process 187b, and a mail receiving process 187a. The mail transfer process 187c corresponds to the mail-reception processing unit 16a in FIG. 3, the communication-condition-information extracting process 187b corresponds to the communication-condition-information extracting unit 16b in FIG. 3, and the mail receiving process 187a corresponds to the mail-transfer processing unit 16c in FIG. 3. Note that, for convenience of explanation, only the filtering server 116 in FIG. 3 is explained. However, the other apparatuses function on the premise that the same hardware configuration is provided.

The mail transfer program 185b, the communication-condition-information extracting program 185c, and the mail receiving program 185b may be loaded from a recording medium like a CD-R other than being loaded to the CPU 187 from the HD 185, for example, when loaded from the CD-R, the mail transfer program 185b, the communication-condition-information extracting program 185c, the mail receiving program 185b, and the like are stored in the CD-R in advance, and the CD-R is inserted in a not-shown CD-R reading device to load the respective programs.

Figure 23:
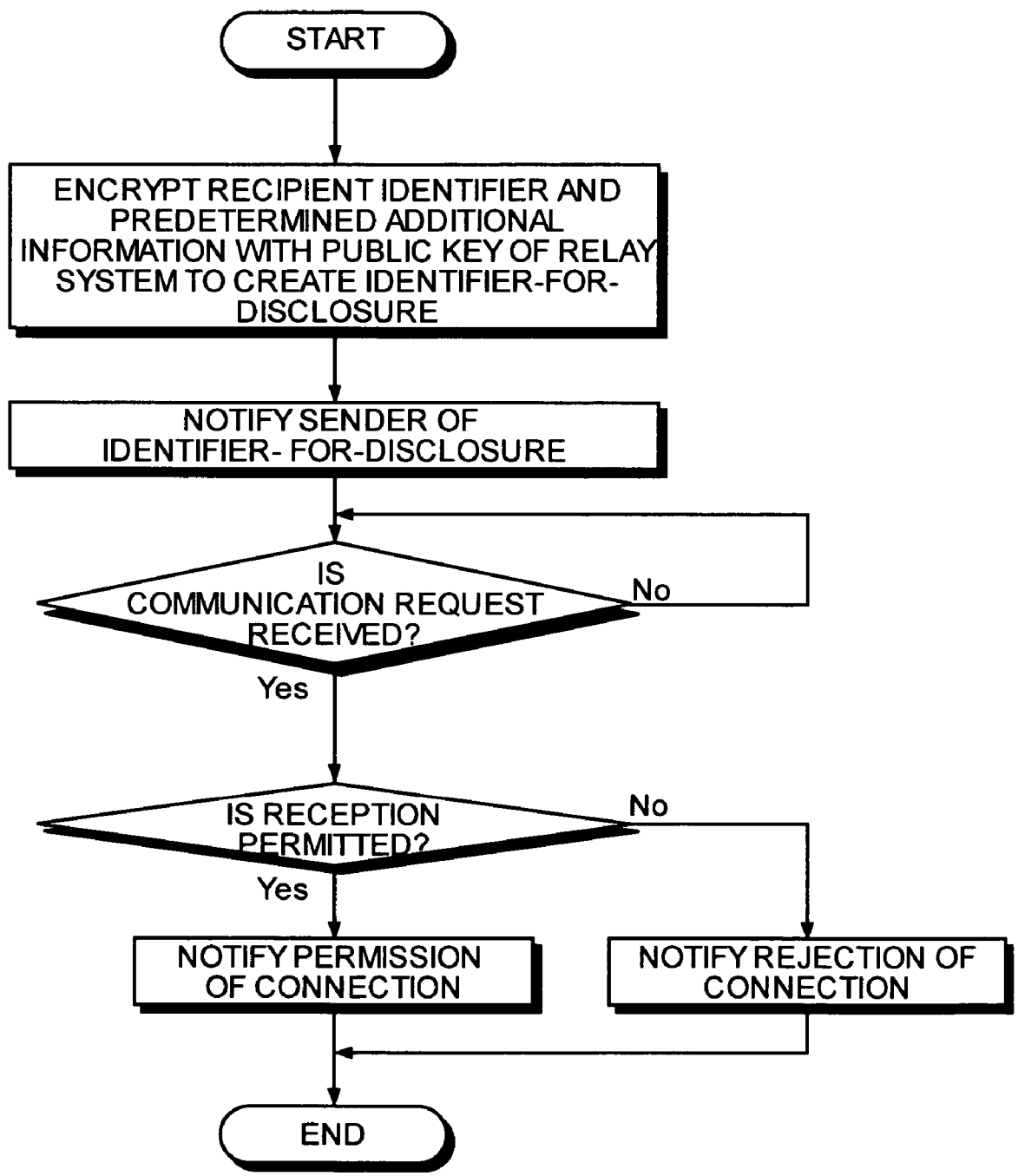
FIG. 23 is a flowchart of a processing procedure for realizing a recipient terminal according to the first embodiment.
Figure 24:
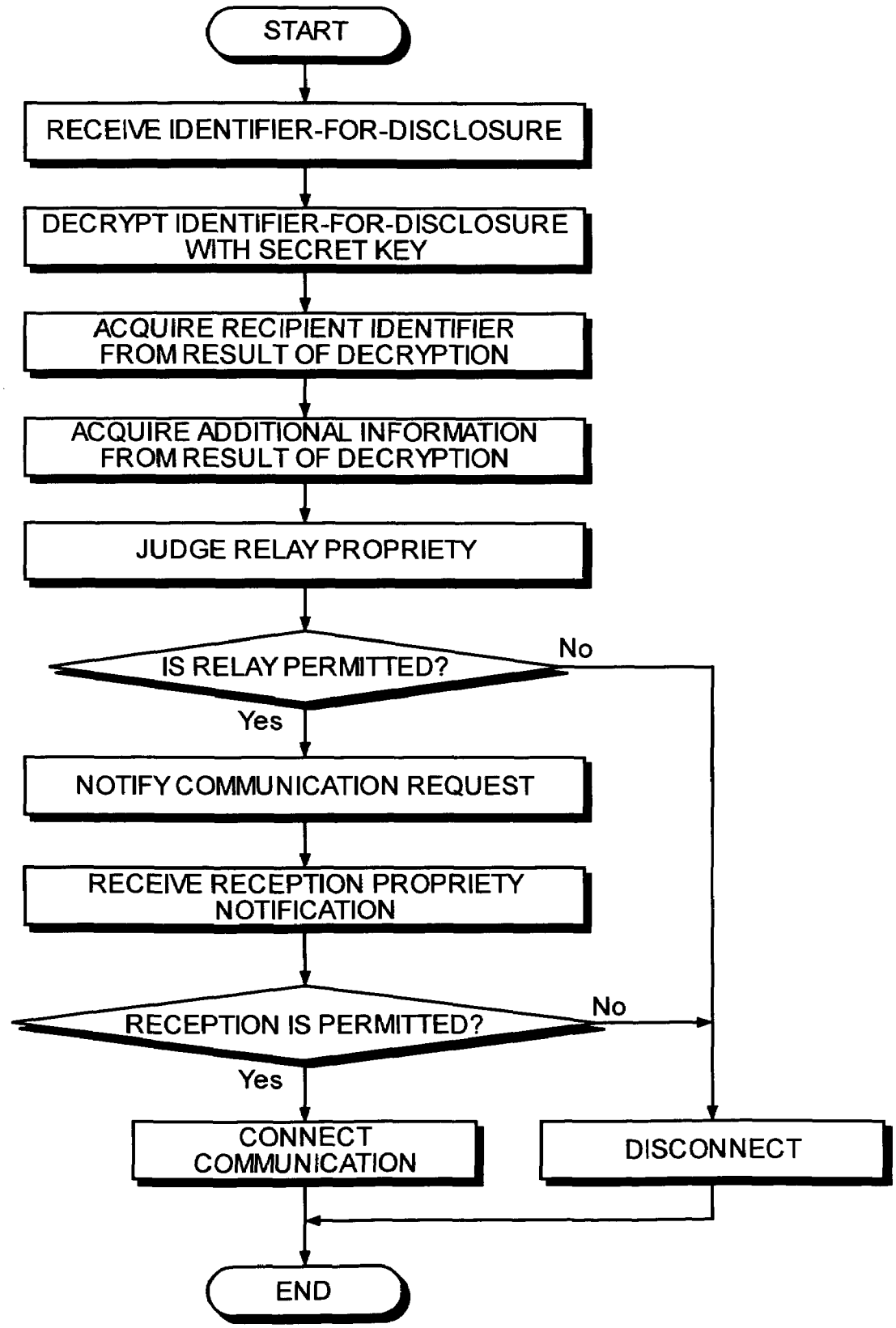
FIG. 24 is a flowchart of a processing procedure for realizing a relay system according to the first embodiment.
Figure 25:
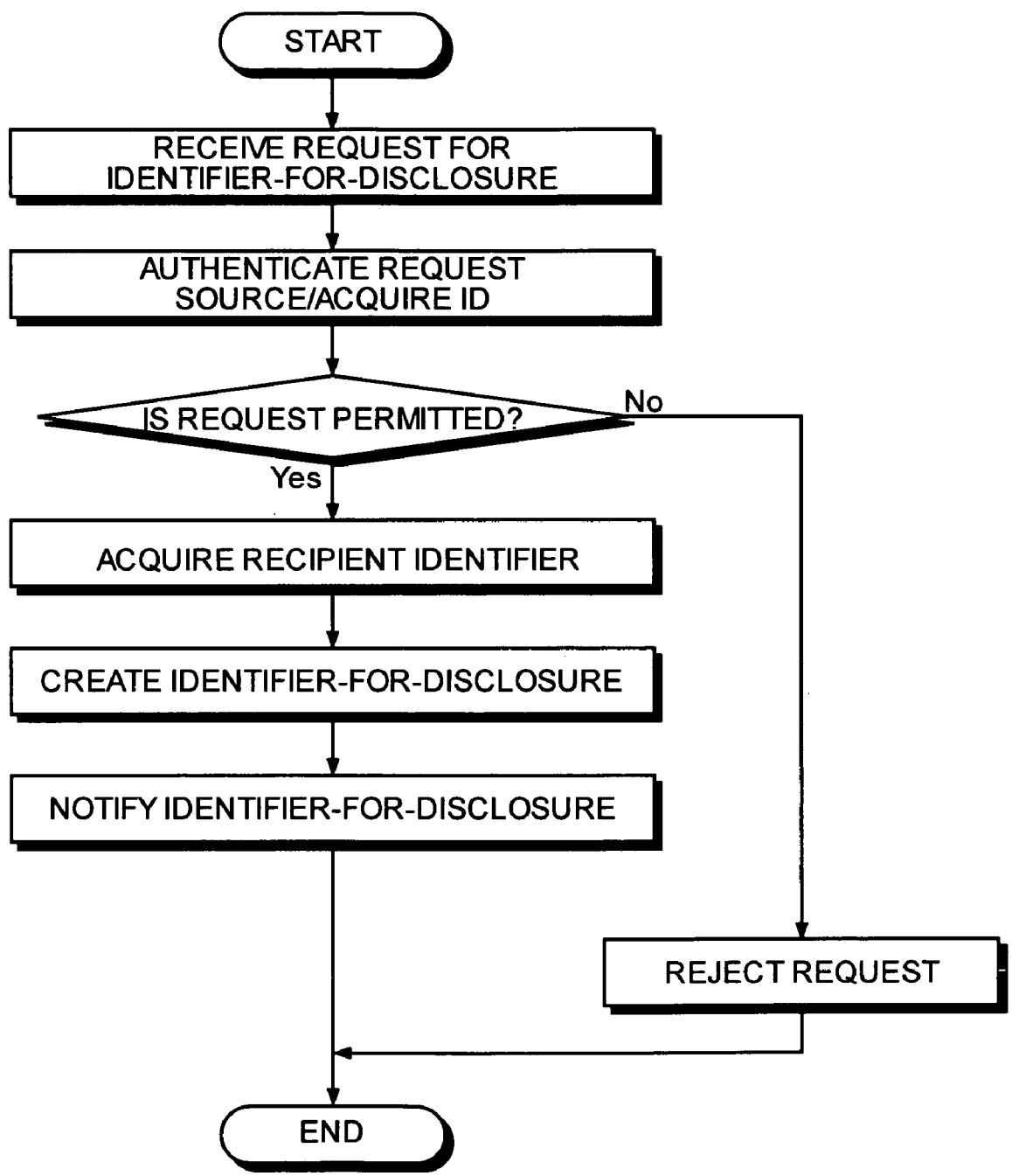
FIG. 25 is a flowchart of a processing procedure for realizing an intermediary apparatus according to the second embodiment.
Figure 26:
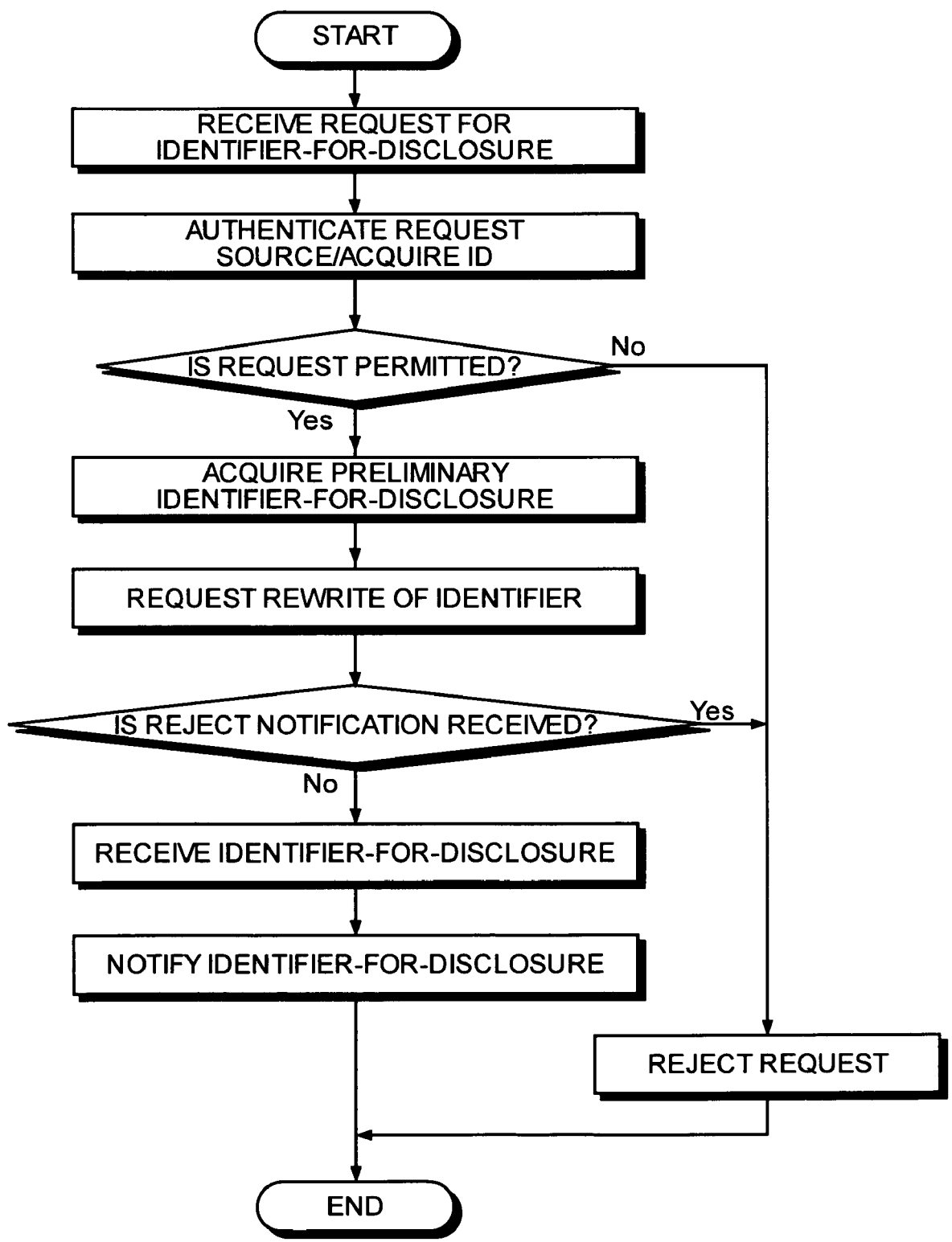
FIG. 26 is a flowchart of a processing procedure for realizing an intermediary apparatus according to the third embodiment.
Figure 27:
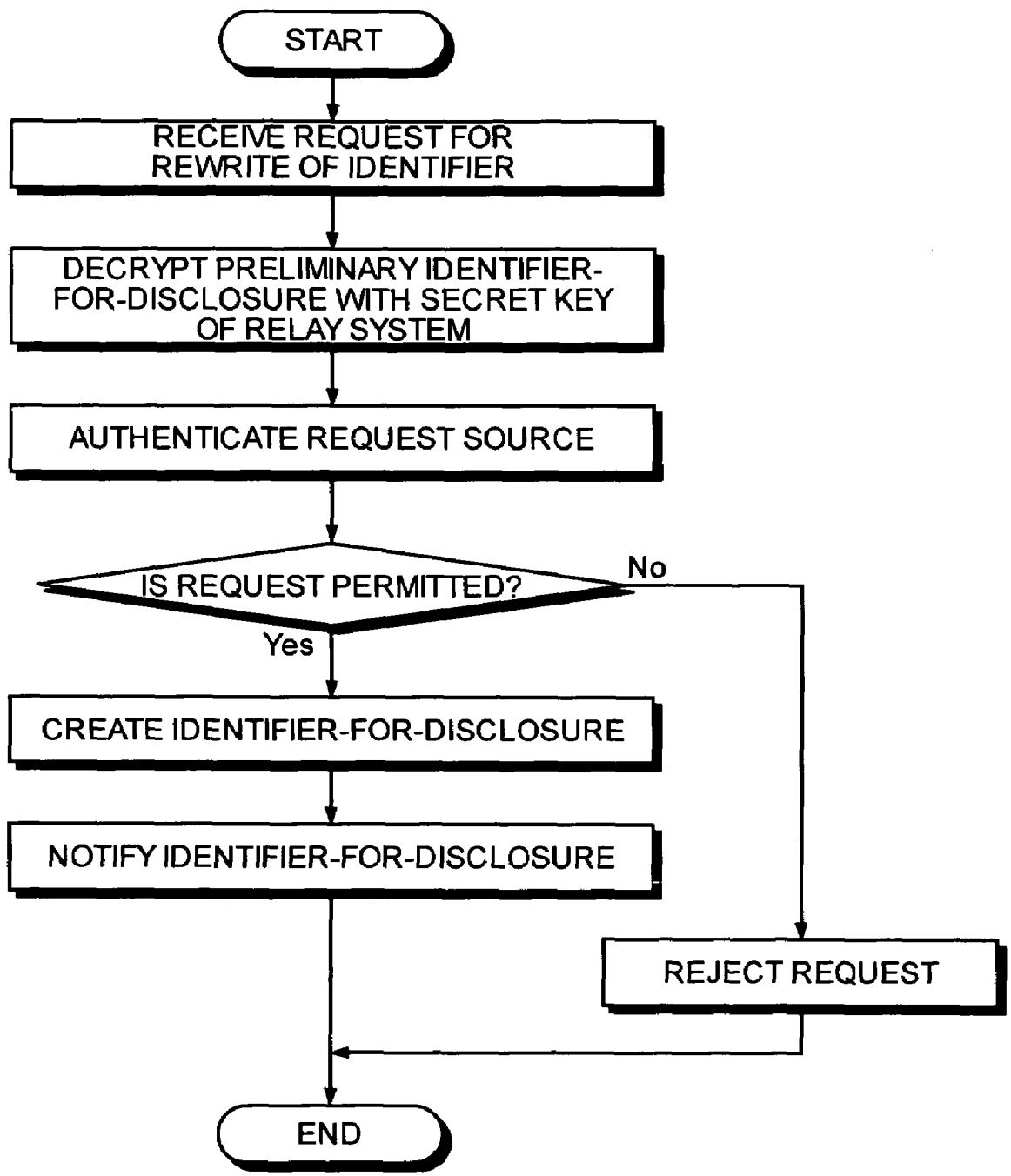
FIG. 27 is a flowchart of a processing procedure for realizing an identifier-for-disclosure rewriting apparatus according to the third embodiment.

FIG. 23 is a flowchart of an operation indicating a program that realizes the recipient terminal according to the first embodiment on a computer. FIG. 24 is a flowchart of an operation (only after a communication request designating an identifier-for-disclosure is received) indicating a program that realizes the relay system according to the first to the third embodiments on a computer. FIG. 25 is a flowchart of an operation indicating a program that realizes the intermediary apparatus according to the second embodiment on a computer. FIGS. 26 and 27 are flowcharts of operations indicating programs that realize the intermediary apparatus and the identifier-for-disclosure rewriting apparatus according to the third embodiment on a computer, respectively.

In the above explanation, the present invention is applied to the electronic mail communication service and the telephone exchange system. However, it is also possible to apply the present invention to an IP telephone service. For this purpose, creation and restoration processing for an identifier-for-disclosure, which is the same as the processing for an electronic mail address according to the first embodiment, is applied to SIP URI that is a recipient identifier in an IP telephone. Moreover, communication request processing, which is the same as the processing for an electronic mail according to the first embodiment, is applied to a SIP INVITE message that is a communication request message in an IP telephone.

Figure 28:
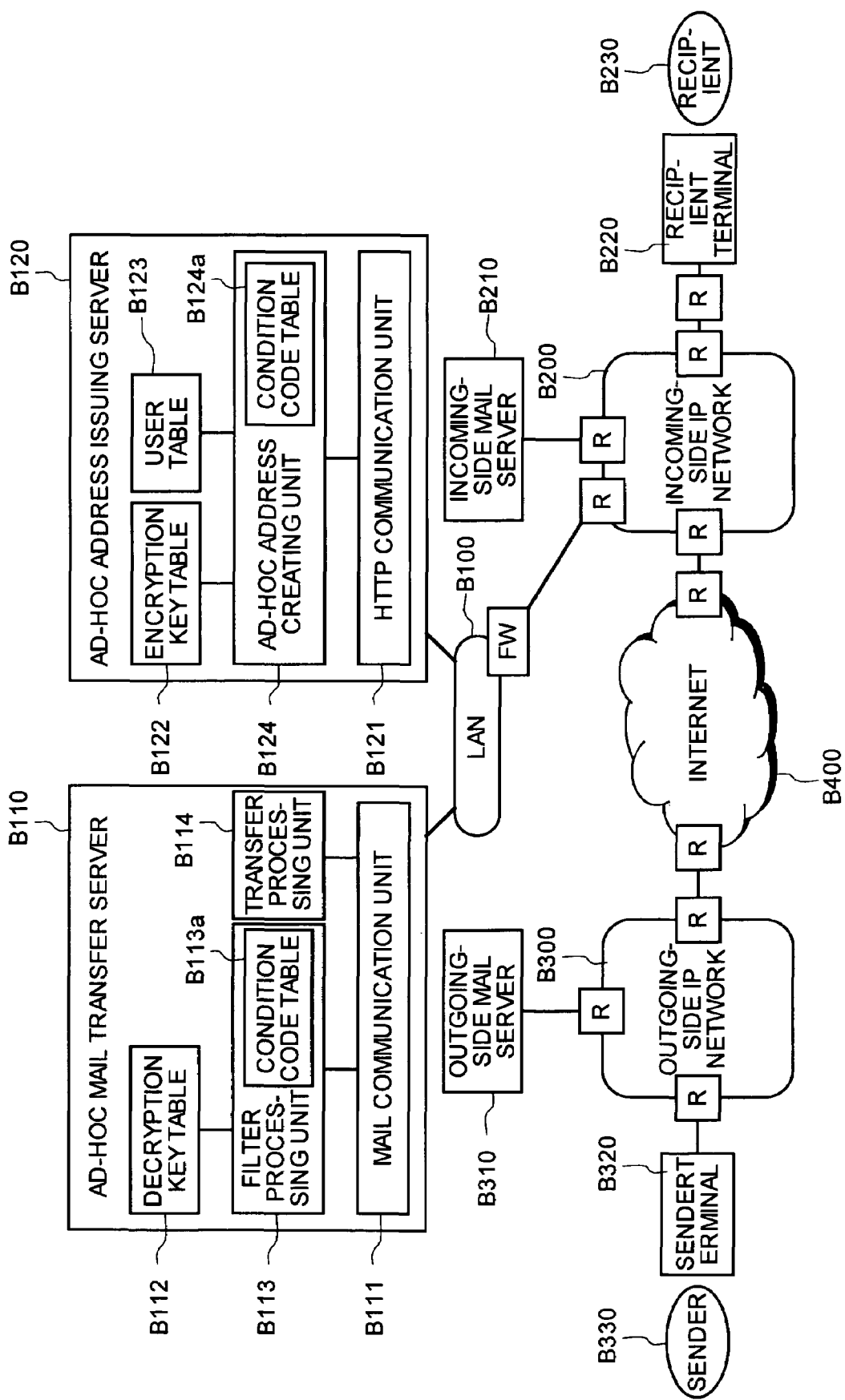
FIG. 28 is a schematic of a system configuration of a mail delivery system according to a fifth embodiment of the present invention.

FIG. 28 is a schematic of a system configuration of a mail delivery system according to a fifth embodiment of the present invention. The mail delivery system is a mail delivery system in which a recipient terminal B220 and a sender terminal B320 are connected via an incoming side IP network B200, an outgoing side Internet B400, and an outgoing side IP network B300 and a mail, which has a recipient address of a recipient B230 as a destination, originated from the sender terminal B320 is delivered to the recipient terminal B220.

The mail delivery system includes an ad-hoc-address issuing server B120 that issues an ad-hoc address-for-disclosure based on delivery condition information (context information), which indicates a delivery condition of a mail delivered to the recipient B230, and a recipient address. The mail delivery system also includes an ad-hoc-mail transfer server B110 that, when a mail having such an ad-hoc address as a destination is received, performs restoration of the recipient address and extraction of the context information from the ad-hoc address and, when the mail satisfies delivery conditions included in the extracted context information, a destination of the mail is changed from the ad-hoc address to the restored recipient address to transfer the mail. The "restoration of the recipient address" includes, other than the case in which the ad-hoc address is decrypted to restore the recipient address directly, the case in which the recipient address is restored via an address identifier using an address table referred to in a seventh embodiment described later. In addition the "extraction of the context information" includes, other than the case in which the context information is extracted from the ad-hoc address as a data string, the case in which the ad-hoc address is decrypted by an encryption technique to extract the context information.

In short, in this mail delivery system, rather than transferring a mail from the sender terminal B320 to the recipient terminal B220 with a recipient address itself held by the recipient B230 as a destination, the mail is transferred using an ad-hoc address-for-disclosure. A reason for using such an ad-hoc address is that the recipient B230 does not wish to disclose an original recipient address to the sender B330 in some cases. For example, when the sender B330 is a mail order agent or the like on the Internet, if an original recipient address is disclosed indiscriminately, it is likely that this recipient address is diffused to other agents through a mailing list or the like and the recipient has to receive unnecessary direct mails and the like.

Note that this ad-hoc address is embedded with context information, which indicates whether the mail should be delivered to the recipient B230, and the original recipient address, it is possible to deliver the mail using the original recipient address only when delivery conditions included in the context information are satisfied. In other words, even if the ad-hoc address is propagated to other agents and the like, when the delivery conditions included in the context information are not satisfied, it is possible to prevent such agents from delivering the mail to the recipient B230.

The sender terminal B320 shown in FIG. 28 is a terminal apparatus that is used by the sender B330 when the sender 330 exchanges mails via the Internet B400. The recipient terminal B220 is a terminal apparatus that is used by the recipient B230 when the recipient B230 exchanges mails via the Internet B400. The sender terminal B220 and the recipient terminal B220 are personal computers (PCs) that are generally used widely. WEB browser software and electronic mail software (mailer) are installed in the sender terminal B220 and the recipient terminal B220. The sender terminal B220 and the recipient terminal B220 are connected to the outgoing side IP network B300 and the incoming side IP network B200 via routers R, respectively. Note that the outgoing side IP network B300 and the incoming side IP network B200 are connected to the Internet B400 via routers, respectively.

The ad-hoc-address issuing server B120 is a server apparatus that issues an ad-hoc address in response to a request from the recipient B230. The ad-hoc-address issuing server B120 has an HTTP communication unit B121, an encryption-key table B122, a user table B123, and an ad-hoc-address creating unit B124. It is possible to realize such an ad-hoc-address issuing server B120 by installing program corresponding to these functional units in a commercially available PC or work station (WS). The ad-hoc-address issuing server B120 is connected to an LANB 100 that is connected to the incoming side IP network B200 via a firewall (FW). The ad-hoc-address issuing server B120 corresponds to an address-for-disclosure issuing unit in claim 28. The HTTP communication unit B121 corresponds to a receiving unit and an address-for-disclosure returning unit in claim 29. The ad-hoc-address creating unit B124 corresponds to an address-for-disclosure creating unit in claim 29. The encryption-key table B122 corresponds to an encryption-key table in claim 30.

The HTTP communication unit B121 is a processing unit that performs communication complying with the HTTP (Hyper Text Transfer Protocol). The encryption-key table B122 is a table in which plural encryption keys used in issuing ad-hoc mails are stored in association with key IDs, respectively. FIG. 29 is a schematic of an example of such an encryption-key table B122. As shown in the figure, in this encryption-key table B122, an encryption key "0x34d2a36b" is stored in association with a key ID 17, an encryption key "0xe48ab21f" is stored in association with a key ID 18, an encryption key "0xab46fc9a" is stored in association with a key ID 19, and an encryption key "0xe6a3b13b" is stored in association with a key ID 19.

The user table B123 is a table that is used in authenticating an access of the recipient B230 who is a user desiring issuance of an ad-hoc mail. User names and passwords are stored in association with one another in the user table B123. FIG. 30 is a schematic of an example of the user table B123 shown in FIG. 28. As shown in the figure, in this user table B123, a user name "suzuki" is stored in association with a password "ef34szq5s", a user name "tanaka" is stored in association with a password "ew4902sa", and a user name "yamada" is stored in association with a password "wf4wsfa3s".

The ad-hoc-address creating unit B124 is a processing unit that creates an ad-hoc address according to the present invention. As shown in the figure, the ad-hoc-address creating unit B124 has a condition code table B124a. Specifically, in the ad-hoc-address creating unit B124, an ad-hoc address-for-disclosure is created from a recipient address, a condition code indicating a type and a combination of a condition forming context information, and context information corresponding to this condition code. Note that a specific creation procedure for an ad-hoc address is described later. In the ad-hoc-address creating unit B124, a recipient address and context information are embedded in an ad-hoc mail by an encryption technique using an encryption key in the encryption-key table B122.

Figure 31:
FIG. 31 is a schematic of an example of a condition code table shown in FIG. 28.

A condition code table B124a present in the ad-hoc-address creating unit B124 is a table in which condition codes indicating types and combinations of delivery conditions forming the context information are stored. FIG. 31 is a schematic of an example of the condition code table B124a. As shown in the figure, combination patters and combination codes of delivery conditions are stored in association with one another in this condition code table B124a. A pattern "S" in the figure means that context information is included with a sender address as a delivery condition. A combination code of this pattern is "0000". A pattern "D" means that context information is included with a domain name (a sender domain) of a sender address as a delivery condition. A combination code of this pattern is "0001". A pattern "E" means that context information is included with an expiration date of an ad-hoc address as a delivery condition. A combination code of this pattern is "0010". A pattern "F" means that context information is included with an incoming call starting date of an ad-hoc address as a delivery condition. A combination code of this pattern is "0011". A pattern "SE" means that context information is included with the sender address of the pattern S and the expiration date of the pattern E as delivery conditions. A combination code of this pattern is "0100". A pattern "DE" means that context information is included with the sender domain of the pattern D and the expiration date of the pattern E as delivery conditions. A combination code of this pattern is '0101'. A pattern "DF" means that context information is included with the sender domain of the pattern D and the incoming call starting date of the pattern F as delivery conditions. A combination code of this pattern is "0110". A pattern "DEF" means that context information is included with the sender domain of the pattern D, the expiration date of the pattern E, and the incoming call starting date of the pattern F as delivery conditions. A combination code of this pattern is "0111".

It is possible to grasp what kind of context information is embedded in an ad-hoc address by embedding a combination code corresponding to any one of these combination patterns in the ad-hoc address. Note that, in this explanation, the sender address, the sender domain, the expiration date, and the incoming call starting data are set as delivery conditions forming context information. However, the present invention is not limited to this and it is also possible to set other deliver conditions as objects. In this case, combination codes corresponding to the delivery conditions only have to be registered in the condition code table B124a.

Next, a structure of the ad-hoc-mail transfer server B110 shown in FIG. 28 is explained. The ad-hoc-mail transfer server B110 shown in FIG. 28 is a server apparatus that, when an ad-hoc mail is received, restores a recipient address and extracts context information from this ad-hoc mail and, when deliver conditions included in the extracted context information are satisfied, delivers the ad-hoc mail to the restored recipient address.

It is possible to realize the ad-hoc-mail transfer server B110 by installing programs corresponding to these functional units in a commercially available PC or work station (WS) as in the ad-hoc-address issuing server B120 and storing a decryption-key table B112 in a hard disk device or the like. The ad-hoc address transfer server B110 is connected to the LANB 100 that is connected to the incoming side IP network B200 via a firewall (FW). The ad-hoc address transfer server B110 includes a mail communication unit B111, the decryption-key table B112, a filter processing unit B113, and a transfer processing unit B114. The ad-hoc-mail transfer server B110 corresponds to a mail transfer unit in claim 28. The filter processing unit B113 corresponds to a filter processing unit in claim 29. The transfer processing unit B114 corresponds to a transfer processing unit in claim 29. The decryption-key table B112 corresponds to a decryption-key table in claim 30.

The mail communication unit B111 is a processing unit that transmits and receives a mail to and from other mail servers based on the SMTP standard. In the case of the common key encryption system, the decryption-key table B112 is identical with the encryption-key table B122 shown in FIG. 29 provided in the ad-hoc-address issuing server B120. Note that, in the case of the public key encryption system, for example, a pair of a secret key and a public key of a well-known RSA encryption is created, the public key is registered in the encryption-key table B122 and the secret key is registered in the decryption-key table B112.

The filter processing unit B113 is a processing unit that receives a delivery request (a relay request) for an ad-hoc mail from other mail servers and judges whether the ad-hoc mail should be delivered to an original recipient address based on context information (delivery conditions) included in an ad-hoc address forming a destination of the received ad-hoc mail. In other words, the filter processing unit B113 performs a kind of filtering processing for setting only an ad-hoc mail satisfying the delivery conditions as an object of delivery and excludes the other ad-hoc mails from the object of delivery.

Specifically, the filter processing unit B113 subjects an ad-hoc address to decryption processing using the decryption key stored in the decryption-key table B112, acquires a recipient address and context information, and judges whether the ad-hoc mail should be set as an object of delivery using delivery conditions included in the acquired context information. Note that, when it is judged that the ad-hoc mail satisfies the delivery conditions and should be set as an object of delivery, the filtering processing unit B113 passes the recipient address extracted from the ad-hoc address and the ad-hoc mail to the transfer processing unit B114 and requests the transfer processing unit B114 to transfer the ad-hoc mail.

The transfer processing unit B114 is a processing unit that performs processing for transferring the ad-hoc mail, which is judged as an object of delivery by the filter processing unit B113, to the original recipient address. As this recipient address, the recipient address decrypted from the ad-hoc address by the filter processing unit B113 is used.

Figure 32:
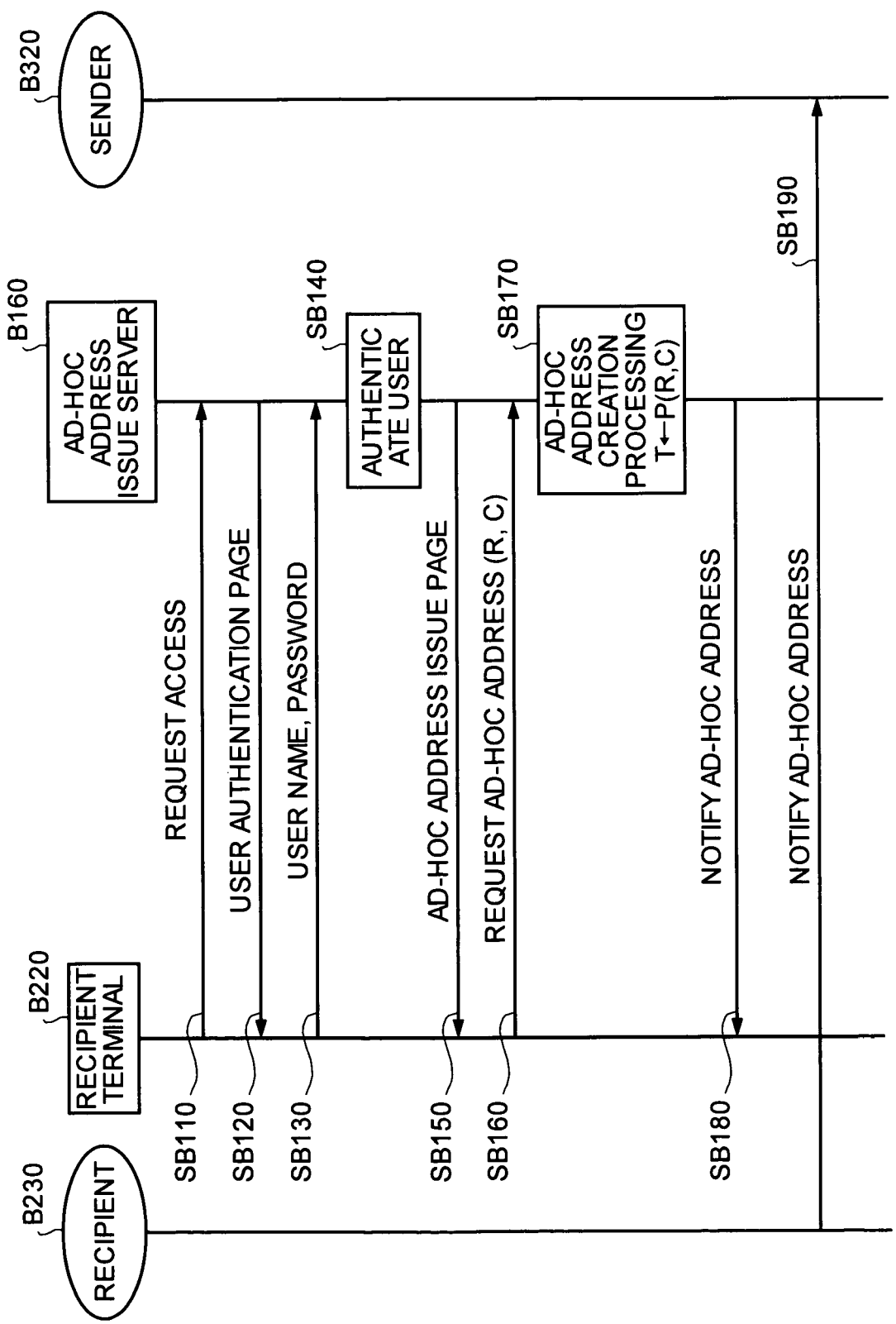
FIG. 32 is a sequence chart of an issuance procedure of an ad-hoc address by an ad-hoc-address issuing server shown in FIG. 28.

Next, an issuance procedure for an ad-hoc address by the ad-hoc-address issuing server B120 shown in FIG. 28 is explained. FIG. 32 is a sequence chart of the issuance procedure for an ad-hoc address by the ad-hoc-address issuing server B120 shown in FIG. 28. Note that, here, it is assumed that issuance of an ad-hoc address is realized by HTTP communication and a URL of the ad-hoc-address issuing server B120 is notified to the user B230 in advance.

As shown in the figure, the recipient B230 inputs the URL of the ad-hoc-address issuing server B120 to a WEB browser on the recipient terminal B220 and sends an access request to the ad-hoc-address issuing server B120 (step SB110). Then, the ad-hoc-address issuing server B120 returns a user authentication page to the recipient terminal B220 (step SB120). FIG. 33 is a schematic of an example of the user authentication page. As shown in the figure, input frames, in which a user name and a password are inputted, are provided in a user authentication page B500.

Here, the recipient B230 inputs a user name and a password on the user authentication page B500 and sends an authentication request to the ad-hoc-address issuing server B120 (step SB130). Then, the ad-hoc-address issuing server B120 performs user authentication (step SB140). Specifically, the ad-hoc-address issuing server B120 checks whether a combination corresponding to the received user name and password is registered in the user table B123 shown in FIG. 30.

When the user is authenticated, the ad-hoc-address issuing server B120 transmits an ad-hoc address issuance page to the recipient terminal B230 (step SB150). FIG. 34 is a schematic of an example of the ad-hoc address issuance page. As shown in the figure, an ad-hoc address issuance page B600 includes input frames in which a recipient address and delivery conditions are inputted. Specifically, the ad-hoc address issuance page B600 includes input frames for selecting presence or absence of sender designation, presence or absence of an expiration date, and presence or absence of an incoming call starting time designation and input frames for designating a designated address (a domain name), an expiration date, and an incoming call starting date when the sender designation, the expiration date, and the incoming call starting time designation are present.

Here, when the recipient B230 inputs a recipient address and delivery conditions on the ad-hoc address issuance page B600 and transmits the recipient address and the delivery conditions, an ad-hoc address request designating a recipient address R and deliver conditions (context information C is sent to the ad-hoc address issuance server B120 (step SB160).

When the ad-hoc-address issuing server B120 receives the ad-hoc address request, ad-hoc address creation processing using the recipient address R and the delivery conditions (context information) C is performed (step SB170). A created ad-hoc address T is notified to the recipient terminal B220 (step SB180). When the recipient B230 acquires such an ad-hoc address T, the recipient B230 notifies the sender B320 of the ad-hoc address T (step SB190). Note that any information transmitting means such as telephone, mail, and facsimile may be used for notification of the ad-hoc address T.

Figure 36:
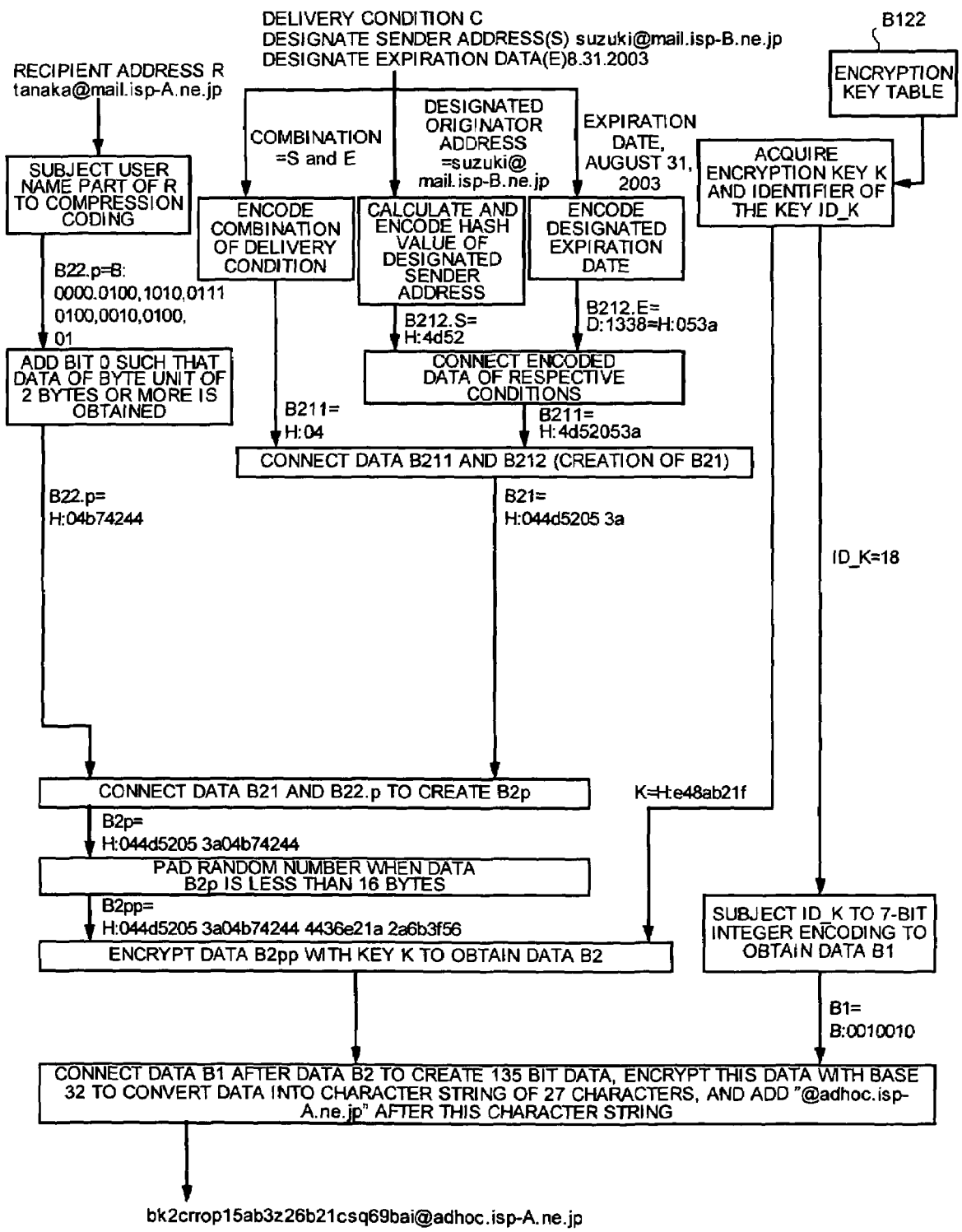
FIG. 36 is a schematic of a specific example of ad-hoc address creation.

Next, a processing procedure for the ad-hoc address creation shown in step SB170 in FIG. 32 is explained more specifically. FIG. 35 is a flowchart of the ad-hoc address creation processing procedure described at step SB170 in FIG. 32. FIG. 36 is a schematic of a specific example of ad-hoc address creation. Note that, for convenience of explanation, it is assumed that a recipient address R is "tanaka@mail.isp-A.ne.jp" and the delivery conditions C are a designated sender address "Suzuki@mail.isp-B.ne.jp" and a designated expiration date "Aug. 31, 2003". In addition, "B" in FIG. 36 indicates binary data and "H" in the figure indicates a hexadecimal data. The same notation is used in FIG. 41 described later.

As shown in FIG. 35, the ad-hoc-address creating unit B124 subjects a user name part of the recipient address to compression coding (step SB201). Specifically, as shown in FIG. 36, the ad-hoc-address creating unit B124 subjects a user name part of the recipient address R to compression coding according to the Huffman coding or the like to acquire binary data B22.p"0000 0100 1010 0111 0100 0010 0100 01". Then, the ad-hoc-address creating unit B124 adds a bit 0 such that data of a byte unit of 2 bytes or more is obtained and acquires hexadecimal data B22.p"04b74244".

Thereafter, the ad-hoc-address creating unit B124 refers to the encryption-key table B122 and acquires an encryption key and a key ID of the key (step SB202). Here, as shown in FIG. 9, it is assumed that a key ID_k=18 and K=e48ab21f.

Thereafter, the ad-hoc-address creating unit B124 encodes the context information (step SB203). Specifically, as shown in FIG. 36, the ad-hoc-address creating unit B124 encodes the designated sender address "Suzuki@mail.isp-B.ne.jp" using a hash value to acquire hexadecimal data B212.S="4d52". In addition, the ad-hoc-address creating unit B124 encodes the designated expiration date "Aug. 31, 2003" to acquire B212.E="053a". Then, the ad-hoc-address creating unit B124 connects the hexadecimal data B212.S="4d52" and B212.E="053a" to acquire B211="4d52053a". Then, the ad-hoc-address creating unit B124 acquires hexadecimal data (context encoded data) B211="04" obtained by encoding the data with a combination of delivery conditions. The ad-hoc-address creating unit B124 connects B211="4d52053a" and the hexadecimal data B211="04" to acquire hexadecimal data B21="044d520553a".

To explain the above more specifically, it is possible to, when a designated sender address is included in delivery conditions, set a low-order 16 bits of a hash value of the designated sender address as encoded information and, when a sender domain is included in the delivery conditions, subject the number of words of a designated sender domain to 4-bit integer encoding, and add a low-order 12 bits of a hash value of the designated sender domain to this to obtain encoded information. When an expiration date and an incoming call starting date are included in the delivery conditions, it is possible to subject the number of days to the designated day to 16-bit integer decoding. Note that "N-bit integer encoding" means that an integer value from 0 to "2 powered by N−1) is represented by a binary number of N bits. For example, when "7" is subjected to 3-bit integer encoding, "111" is obtained. When "7" is subjected to 5-bit integer encoding, "00111" is obtained.

Thereafter, ad-hoc-address creating unit B124 connects recipient address encoded data and context encoded data (step SB204). Specifically, as shown in FIG. 36, the ad-hoc-address creating unit B124 connects the recipient address encoded data B22.p and the context encoded data B21 to create hexadecimal data B2p="044d52053a04b74244". When the data B2p is less than sixteen bytes, the ad-hoc-address creating unit B124 pads a random number to acquire hexadecimal data B2pp="044d52053a04b742444436e21a2a6b3f56". Note that a reason for using a random number for the padding processing is to make it difficult to analyze a decryption key through the known plaintext attack.

Thereafter, the ad-hoc-address creating unit B124 encrypts the connected data using the encryption key (step SB205), connects the encryption key ID to this encrypted data (step SB206), and then adds a domain name (step SB207). Specifically, the ad-hoc-address creating unit B124 encrypts the hexadecimal data B2pp with an encryption key K to acquire encrypted data B2d, connects data B1, which is obtained by subjecting an identifier ID_k to 7-bit integer encoding, after this encrypted data B2 to create 135 bit data, encoding this data with BASE32 (changes the data into text) to convert this data into a character string of twenty-seven characters, and adds a domain name "@ad-hoc.isp-A.ne.jp" after this character string.

By performing the series of processing, it is possible to create an ad-hoc address "bk2crrop15ab3z26b21csq69bai@ad-hoc.isp-A.ne.jp" based on the delivery conditions (context information) including the recipient address "tanaka@mail.isp-A.ne.jp", the designated sender address "Suzuki@mail.isp-B.ne.jp", and the designated expiration date "Aug. 31, 2003".

Figure 37:
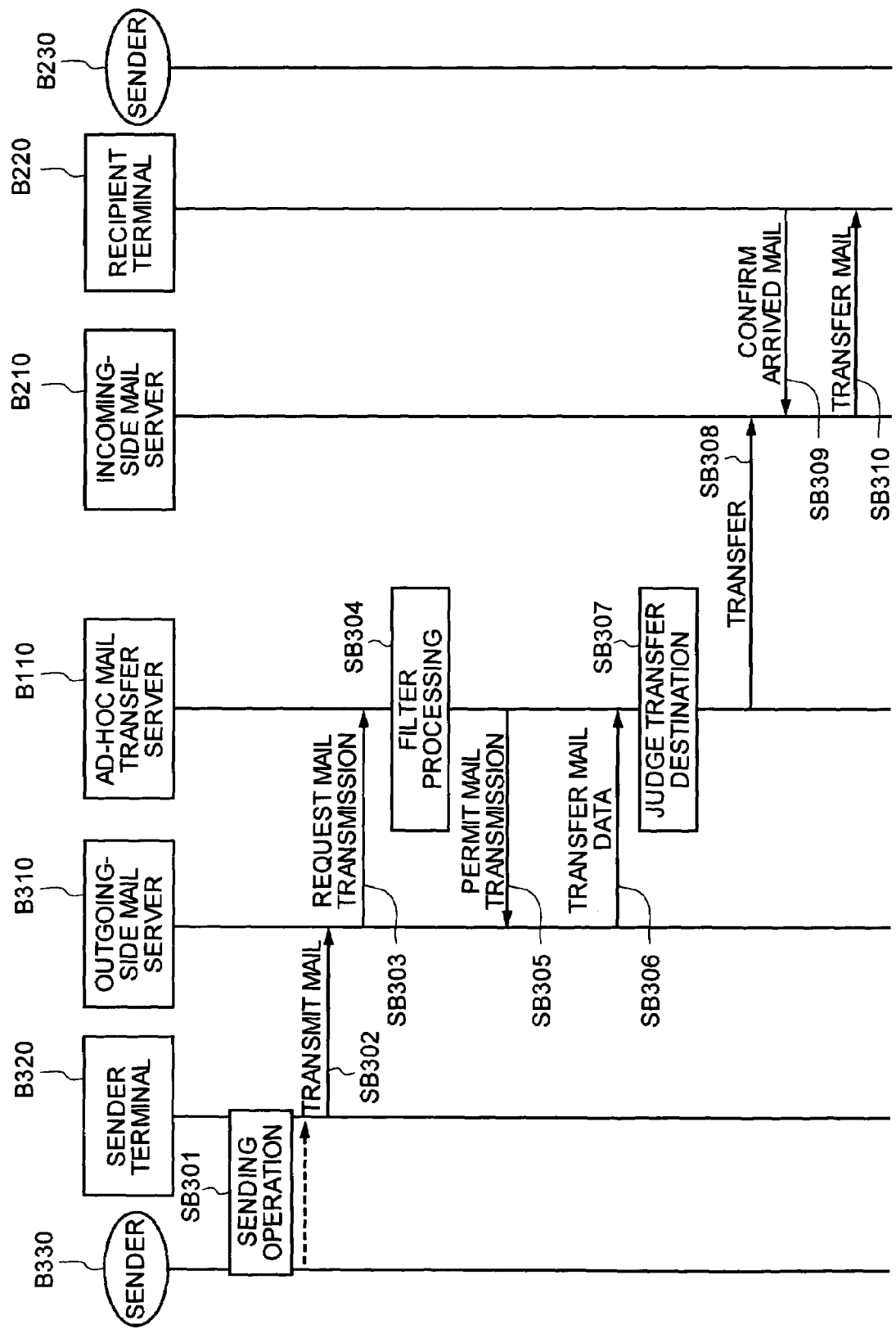
FIG. 37 is a sequence chart of a transfer procedure of an ad-hoc mail by an ad-hoc-mail transfer server shown in FIG. 28.

Next, a transfer procedure for an ad-hoc mail by the ad-hoc-mail transfer server B110 shown in FIG. 28 will be explained. FIG. 37 is a sequence chart of the transfer procedure for an ad-hoc mail by the ad-hoc-mail transfer server B110 shown in FIG. 28.

As shown in the figure, when the sender B330 performs originating operation for a mail having the ad-hoc address T as a destination using the sender terminal B320 (step SB301), this mail is transmitted to an outgoing side mail server B310 (step SB302). Then, the outgoing side mail server B310 sends a mail transmission request to a mail server corresponding to a domain name of a destination address according to a normal operation as a mail transfer server (step SB303). Here, since a domain name of this ad-hoc address is set as a host name of the ad-hoc-mail transfer server B110, this mail transmission request is received by the ad-hoc-mail transfer server B110.

Then, the ad-hoc-mail transfer server B110 performs filter processing described later based on the ad-hoc address T that is a destination of the mail transfer request (step SB304) and judges whether the mail transfer request should be accepted or rejected. When it is judged by this filter processing that the mail transfer request is accepted, the ad-hoc-mail transfer server B110 acquires the recipient address R based on the ad-hoc address T forming the destination and sends mail transmission permission to the outgoing side mail server B310 (step SB305).

The outgoing side mail server B310, which has received the mail transmission permission, transfers the ad-hoc mail to the ad-hoc-mail transfer server B110 (step sB306). The ad-hoc-mail transfer server B110 checks a domain name of the recipient address restored from the ad-hoc address forming the destination of the ad-hoc mail to determine a transfer destination (step SB307) and transfers the ad-hoc mail to an incoming side mail server B210 indicated by this domain name (step B308).

The recipient terminal B220 transmits a mail confirmation request to the incoming side mail server B220 with an arrived mail confirming operation of the recipient B230 as an opportunity (step SB309). In response to this mail confirmation request, the incoming side mail server B220 transmits the ad-hoc mail to the recipient terminal B220 (step SB310).

When it is judged by the filter processing at step SB304 that the mail transfer request is not accepted (is rejected), the ad-hoc-mail transfer server B110 transmits a mail reception rejection message to the outgoing side mail server B310 and does not perform mail transfer.

Figure 38:
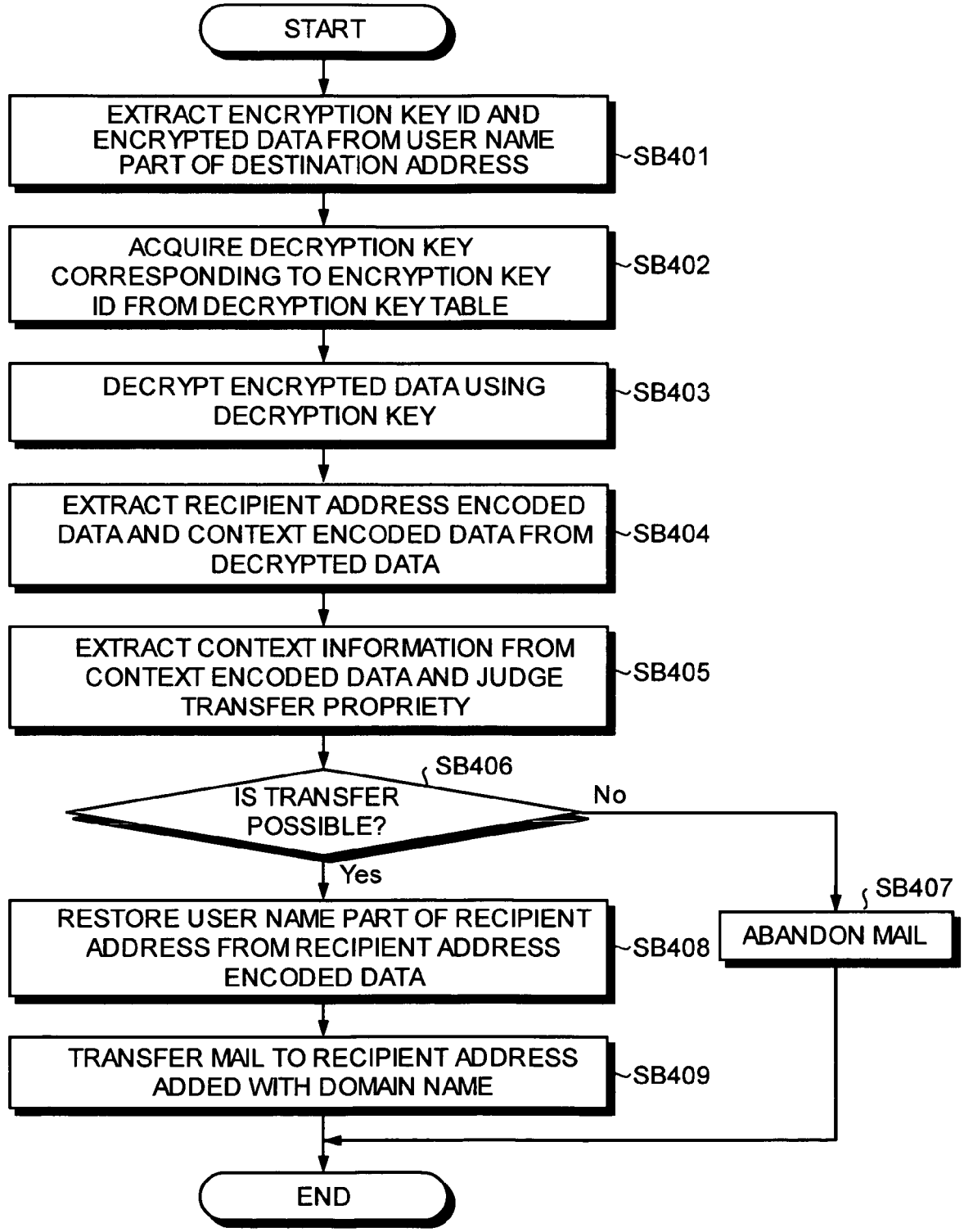
FIG. 38 is a flowchart of a filter processing procedure described at step S304 in FIG. 37.

Next, the filter processing described at step SB304 in FIG. 37 is explained specifically. FIG. 38 is a flowchart of the filter processing procedure described at step SB304 in FIG. 37. As shown in the figure, first, the filter processing unit B113 of the ad-hoc address transfer server B11 extracts an encryption key ID and encrypted data from a user name part of a destination address (step SB401). Specifically, decryption processing is performed generally in an order opposite to the creation procedure for the ad-hoc address shown in FIG. 36. A 7-bit encryption key ID "0010010" and encrypted data to be an object of decryption are extracted from the user name part "bk2crrop15ab3z26b21csq69bai" of the ad-hoc address.

Thereafter, the filter processing unit B113 acquires a decryption key corresponding to the encryption key ID from the decryption-key table 112 (step S402) and decrypts the encrypted data using the acquired decryption key (step S403). Specifically, in the case of the common key encryption system, as shown in FIG. 36, the filter processing unit B113 acquires a decryption key "e48ab21f" of hexadecimal data corresponding to the key ID=18 and decrypts the encrypted data using this decryption key to thereby acquire hexadecimal data B2pp="044d52053a04b742444436e21a2a6b3f56".

Thereafter, the filter processing unit B113 extracts recipient address encoded data and context encoded data from the decrypted data (step SB404) and extracts context information from the context encoded data to judge whether transfer is possible (step SB405). Specifically, the filter processing unit B113 extracts recipient address encoded data B22.p and context encoded data B21 from the hexadecimal data B2pp and also extracts a hash value B212.S and an expiration date B212.E of a designated sender address from the context encoded data B21 as delivery conditions to judge whether transfer is possible according to whether the delivery conditions are satisfied.

Specifically, the filter processing unit B113 calculates and encodes a hash value of the sender address of the ad-hoc mail. When this hash value coincides with the hash value B212.S extracted from the ad-hoc mail, the filter processing unit B113 judges that the ad-hoc mail is a mail from a legitimate sender. In addition, the filter processing unit B113 judges whether the ad-hoc mail is a legitimate mail according to whether a present date has exceeded the expiration date B212.E. In other words, when the ad-hoc mail is a mail from a legitimate sender and a mail before expiration date, the filter processing unit B113 judges that the ad-hoc mail is transferable.

When it is judged that the ad-hoc mail is untransferable ("No" at step SB406), the filter processing unit B113 abandons the mail (step SB407). When it is judged that the ad-hoc mail is transferable ("Yes" at step SB406), the filter processing unit B113 restores the user name part of the recipient address from the recipient address encoded data (step SB408) and transfers the mail to a recipient address obtained by adding a domain name to the user name part (step SB409).

As described above, according to the fifth embodiment, the mail delivery system includes the ad-hoc-address issuing server B120 that issues an ad-hoc address-for-disclosure based on delivery condition information (context information) indicating delivery conditions of a mail delivered to the recipient B230 and a recipient address. The mail delivery system further includes the ad-hoc-mail transfer server B130 that, when a mail having such an ad-hoc address as a destination is received, restores the recipient address and extracts the context information from the ad-hoc address, and when the mail satisfies the delivery conditions included in the extracted context information, changes the destination of the mail from the ad-hoc address to the restored recipient address to transfer the mail. Thus, it is possible to control use of the recipient address for purposes other than expected purposes following leakage and diffusion of the recipient address. In particular, even when not only an original recipient address but also an ad-hoc address is leaked, it is possible to deliver only an ad-hoc address used for an original use to a recipient.

According to the fifth embodiment, data obtained by simply subjecting the recipient address R to compression coding is encrypted. However, since the recipient address R is fixed, the recipient address R is vulnerable to encryption key analysis by differential attack of a third party. Thus, according to a sixth embodiment of the present invention, an embodiment resistant to the differential attack is described.

Figure 39:
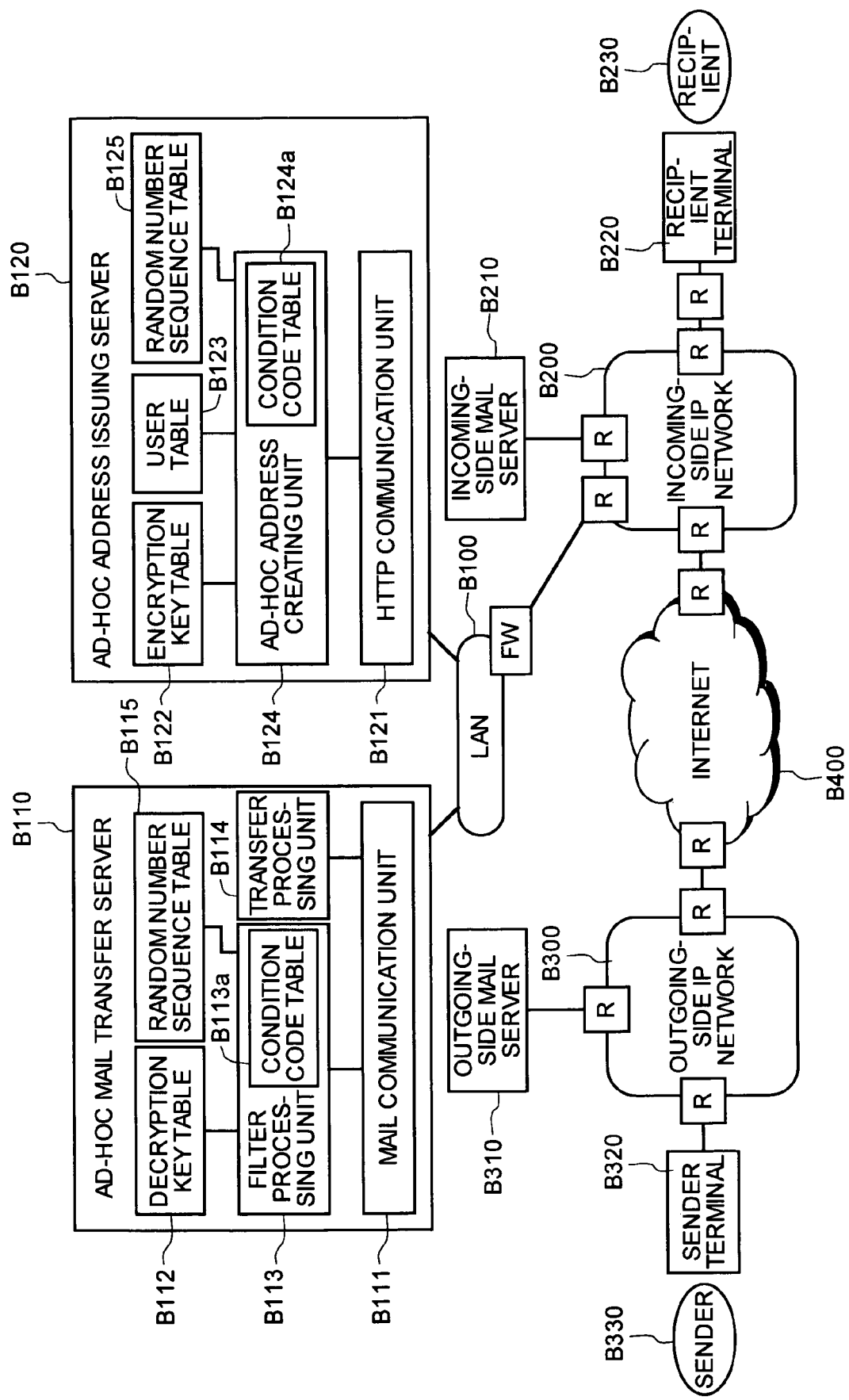
FIG. 39 is a schematic of a system configuration of a mail delivery system according to a sixth embodiment of the present invention.

FIG. 39 is a schematic of a system configuration of a mail delivery system according to the sixth embodiment. The mail delivery system shown in the figure is different from the system shown in FIG. 28 in that random-number sequence tables B125 and B115 are provided in the ad-hoc-address issuing server B120 and the ad-hoc-mail transfer server B110, respectively. The random-number sequence table B125 corresponds to a random-number sequence table in claim 11.

Figure 40:
FIG. 40 is a schematic of an example of a random-number sequence table shown in FIG. 39.

The random-number sequence table B125 is a table that is used by the ad-hoc-address issuing server B120 to scramble a recipient address R with a random number (reversible conversion processing) when the ad-hoc-address issuing server B120 creates an ad-hoc address. After extracting a random-number sequence from the random-number sequence table B125, the ad-hoc-address creating unit B124 implements exclusive OR (XOR) operation for the recipient address R and the random-number sequence to scramble the recipient address R every time the random-number sequence is extracted. Since the exclusive OR operation for the random-number sequence is implemented, in such processing random number substitution cipher called well-known Vernam cipher is performed. FIG. 40 is a schematic of an example of the random-number sequence table B125. As shown in the figure, the random-number sequence table B125 is a table in which indexes are assigned to respective plural random-number sequences including sixteen bits.

The random-number sequence table B115 is a table that is used by the ad-hoc-mail transfer server B110 when the ad-hoc-mail transfer server B110 acquires the recipient address R from an ad-hoc address according to reversible conversion. The random-number sequence table B115 is identical with the random-number sequence table B125. When the same random-number sequence is put in the XOR operation again with encrypted data of the recipient address R subjected to the Vernam cipher, the random-number sequence is canceled and the recipient address R can be restored.

Next, selection of a random-number sequence from the random-number sequence tables B125 and B115 is explained. In the random-number sequence tables B125 and B115, since indexes are assigned in association with random-number sequences as shown in FIG. 40, basically, it is possible to specify a random-number sequence to be used if the indexes are exchanged. However, it is not efficient to transfer indexes of random-number sequences separately other than an ad-hoc mail. Therefore, according to the sixth embodiment, a random number to be extracted from the random-number sequence tables B125 and B115 is determined based on a part of information used for creation of an ad-hoc address. Specifically, the number of random numbers in the random-number sequences B125 and B115 is set to N, index numbers 0 to N−1 is assigned to the respective random numbers, and a random number having a remainder value, which is obtained by dividing a hash value of the delivery condition data B21 by N, as an index number is selected from the random-number sequence tables B125 and B115.

Figure 41:
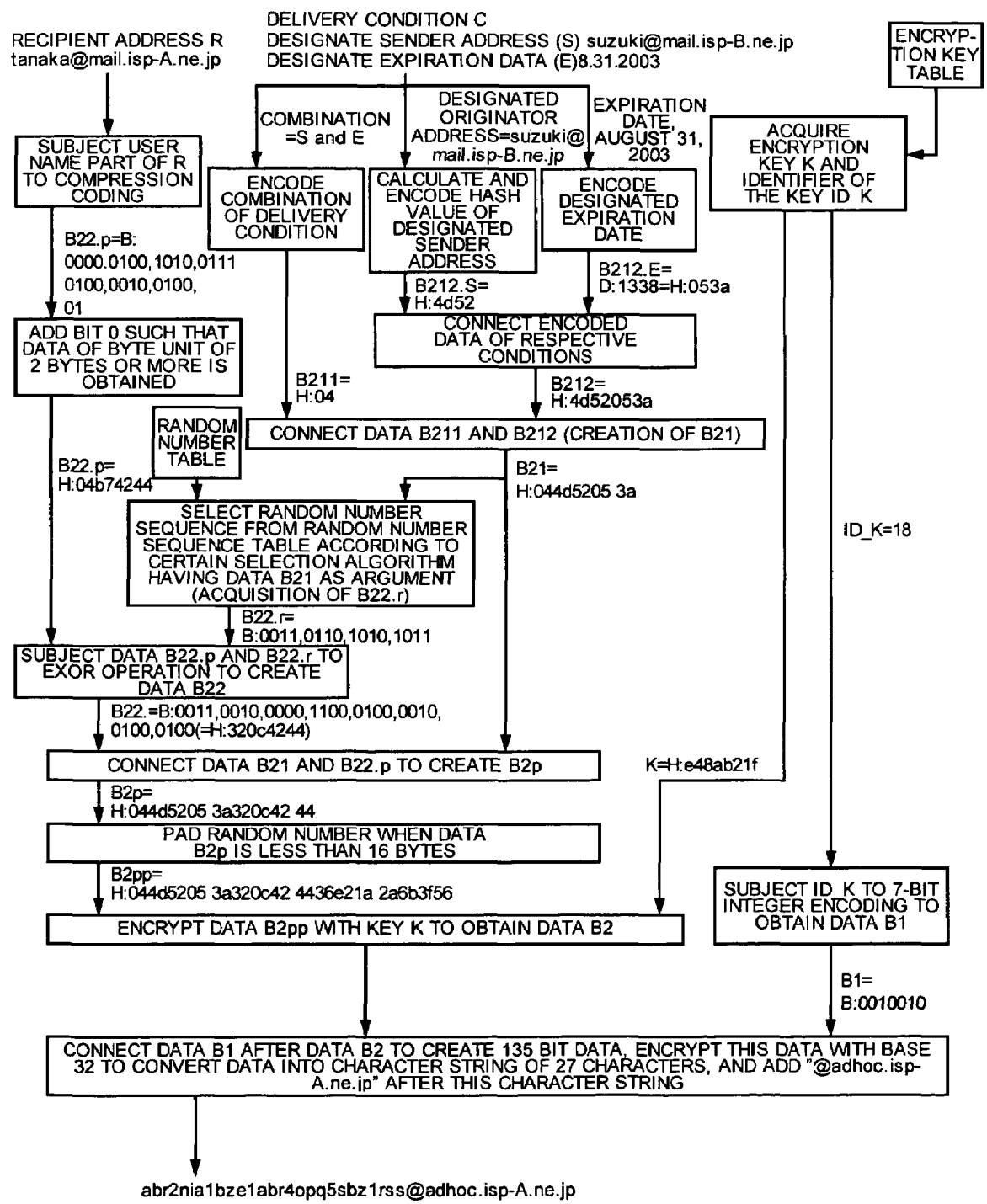
FIG. 41 is a schematic of a specific example of ad-hoc address creation by an ad-hoc-address creating unit shown in FIG. 39.

Next, a specific example of ad-hoc address creation by the ad-hoc-address creating unit B124 shown in FIG. 39 is explained. FIG. 41 is a schematic of a specific example of ad-hoc address creation by the ad-hoc-address creating unit B124 shown in FIG. 39. The specific example shown in the figure corresponds to the specific example in FIG. 36 explained according to the fifth embodiment. Note that the number of random numbers in the random-number sequence tables B125 and B115 is set to N and index numbers 0 to N−1 are assigned to the respective random numbers in advance.

As shown in FIG. 41, in the same manner as the specific example shown in FIG. 36, first, the ad-hoc-address creating unit B124 subjects the user name part of the recipient address R to compression coding to acquire the binary data B22.p"0000 0100 1010 0111, 0100, 0010, 0100, 01", then, adds a bit 0 such that data of a byte unit of 2 bytes or more is obtained, and acquires hexadecimal data B22.p"04b74244".

Thereafter, the ad-hoc-address creating unit B124 searches the random-number sequence table B125 with a remainder value, which is obtained by dividing a hash value of hexadecimal data B21="044d520053a" obtained from the delivery condition C by N, as a key to acquire binary data B22.r="0011011010101011" of a random-number sequence having this key as an index number, implements the exclusive OR operation of the acquired random-number sequence B22.r and the hexadecimal data B22.p "04b74244" to create data B22. Note that processing after this is the same as that shown in FIG. 36.

As described above, according to the sixth embodiment, the random-number sequence tables B125 and B115 are provided in the ad-hoc-address issuing server B120 and the ad-hoc-mail transfer server B110, respectively, and a random-number sequence is selected from the random-number sequence table B125 using data obtained from delivery conditions. Thus, it is possible to make encryption key analysis by differential attack of the third party difficult.

In the fifth and the sixth embodiments, a recipient address itself is subjected to compression coding and embedded in an ad-hoc address. However, the present invention is not limited to this and can also be applied when an address identifier is used instead of the recipient address. In other words, essentially, an ad-hoc mail is used to prevent the recipient address from being revealed to a sender. Thus, it is desirable that the recipient address is kept secret from the sender as long as possible. In addition, recipient addresses do not have a fixed length but have various data length. Thus, it is inefficient to use the recipient address itself because a data length of the ad-hoc address cannot be set to a fixed length deterministically. In particular, when various domain names are mixed in the recipient address, it is necessary to set the entire recipient address including the domain names as an embedding object by expanding the fifth and the sixth embodiments. However, when the entire recipient address is set as an embedding object, the data length of the ad-hoc address is further extended. Therefore, according to the seventh embodiment, an ad-hoc mail address identifier is used instead of the recipient address R.

Figure 42:
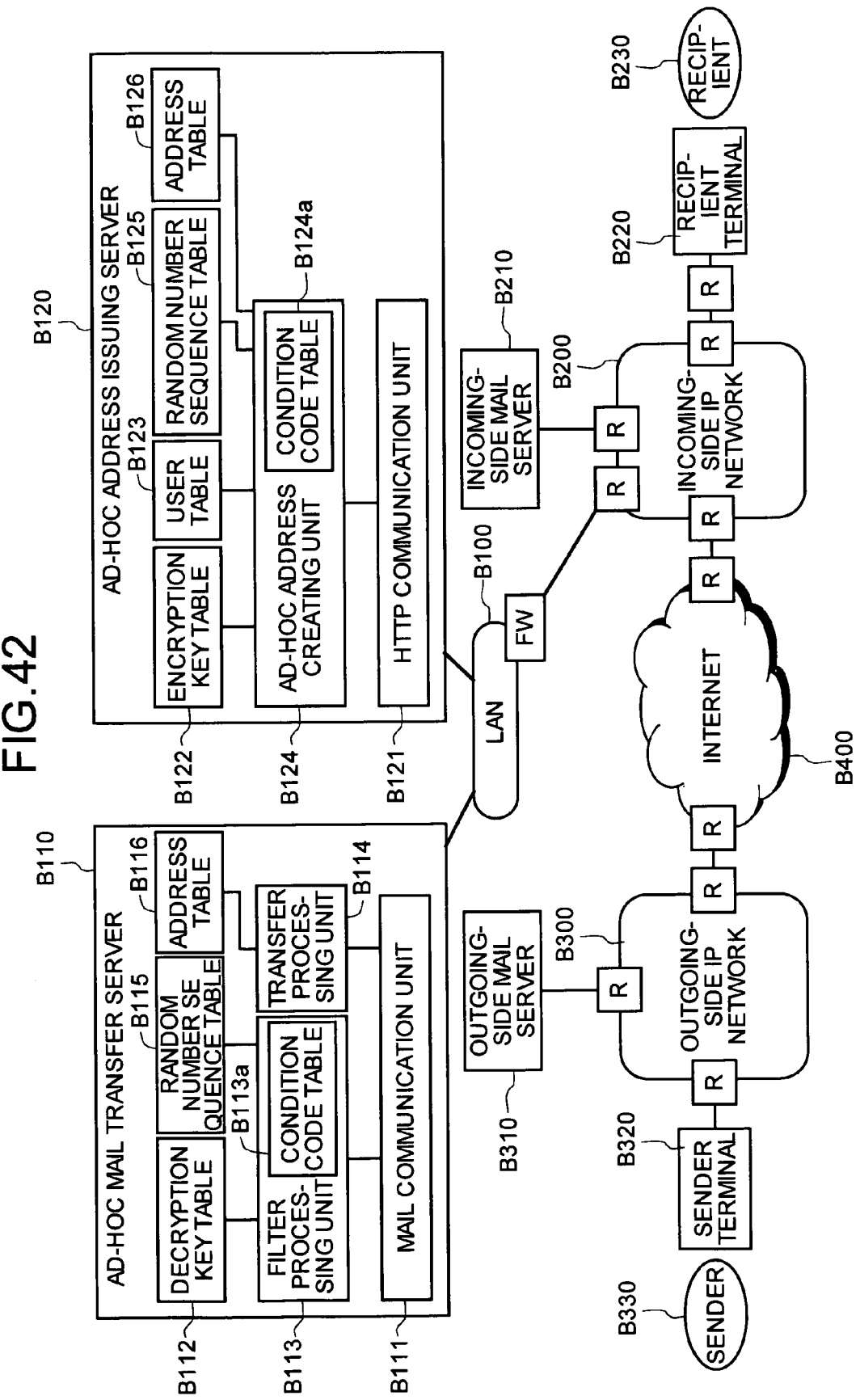
FIG. 42 is a schematic of a system configuration of a mail delivery system according to a seventh embodiment of the present invention.

FIG. 42 is a schematic of a system configuration of a mail delivery system according to the seventh embodiment. The mail delivery system shown in the figure is different from those shown in FIGS. 28 and 39 in that address tables B126 and B116 are provided in the ad-hoc-address issuing server B120 and the ad-hoc-mail transfer server B110, respectively. Note that the address tables B126 and B116 correspond to an address table in claim 14.

The address table B126 is a table that is used by the ad-hoc-address issuing server B120 in order to replace the recipient address R with an ad-hoc mail address identifier when the ad-hoc-address issuing server B120 creates an ad-hoc address. FIG. 43 is a schematic of an example of an address table B126 shown in FIG. 42. As shown in the figure, the address table B126 is a table in which ad-hoc mail address identifiers and recipient addresses are stored in association with one another. Here, a recipient address "tanap@oce.com" is associated with an ad-hoc mail address identifier "TN" and a recipient address "suzup@pla.com" is associated with an ad-hoc mail address identifier "SZ".

The address table B116 is a table that is used by the transfer processing unit B114 of the ad-hoc-mail transfer server B110 in specifying the recipient address R corresponding to an ad-hoc mail address identifier extracted from an ad-hoc address. The address table B116 is identical with the address table B126 described above.

The ad-hoc-address creating unit B124 of the ad-hoc-address issuing server B120 performs processing for replacing a recipient address with an ad-hoc mail address identifier using the address table B126 rather than performing compression coding for a recipient address as in the fifth and the sixth embodiments.

In the ad-hoc-mail transfer server B110, only for an ad-hoc mail that is judged to be transferred as a result of judgment on delivery conditions by the filter processing unit B113, a recipient address corresponding to an ad-hoc mail address identifier is extracted from the address table B116. Since conversion from an ad-hoc mail address identifier to a recipient address is performed only when it is judged that an ad-hoc mail should be transferred, a processing load involved in such address conversion is not large.

As described above, according to the seventh embodiment, the address tables B126 and B116 are provided in the ad-hoc-address issuing server B120 and the ad-hoc-mail transfer server B110, respectively, and an ad-hoc mail address identifier is used instead of a recipient address. Therefore, there is an effect that (1) it is possible to further prevent leakage of the recipient address and (2) it is possible to set a data length of the ad-hoc address to a fixed length deterministically. In particular, the mail delivery system is efficient when various mail addresses with different domain names are set as objects of delivery.

According to the fifth to the seventh embodiments, the encryption-key table B122, the user table B123, the random-number sequence table B125, the address table B126, and the like are provided in the ad-hoc-address issuing server B120. However, these various tables may be disposed outside the server. In addition, according to the fifth to the seventh embodiments, explanations about an encryption logic and the like in performing encryption and decryption are omitted. As a one-way function for calculating a hash value, it is possible to use well-known algorithms like MD5 and SHA-1. As an encryption algorithm, it is possible to use a common key encryption algorithm like DES, RC5, and FEAL and a public key encryption algorithm like RSA. Moreover, in the fifth to the seventh embodiments, an explanation about selection of an encryption key from the encryption-key table B122 is omitted. However, selection such as random selection and selection by round robin for an identical issue destination only has to be performed.

According to the fifth to the seventh embodiments, a sender address for permitting use of communication to an ad-hoc address as a delivery condition, a sender domain for permitting use of communication to the ad-hoc address, an expiration date of the ad-hoc address, or a valid starting date, or a combination of these conditions is used. The present invention is not limited to this. It is also possible to include a data size indicating an upper limit of an amount of data of a mail, a subject word indicated by a character string corresponding to a predetermined number of characters form a leading part of a subject field of the mail, and the like in deliver conditions. In this case, information concerning types and combinations of designation of these conditions only has to be registered in the condition code tables B124a and B113a.

Note that, according to the fifth to the seventh embodiments, the mail delivery system is explained with an aspect of the functions. However, actually, since the ad-hoc-address issuing server B120 and the ad-hoc-mail transfer server B110 can be realized by commercially available computers, programs only have to be installed in these computers, respectively. The programs may be loaded to a CPU not only from a secondary recording medium such as a hard disks device and a ROM but also from a recording medium such as a CD-R. For example, when the program is loaded from the CD-R, a program for the ad-hoc-address issuing server B120 and a program for the ad-hoc-mail transfer server B11, and the like are stored in a CD-R (or separate CD-Rs for the respective apparatuses) in advance and the CD-R is inserted in CD-R reading devices of the respective apparatuses to load the programs.

As described above, according to the present invention, an identifier-for-disclosure is created based on communication condition information, which informs a recipient of communication conditions in performing communication, and a recipient identifier. When a communication request from a sender terminal based on the created identifier-for-disclosure is received, the recipient identifier and the communication condition information are restored from the identifier-for-disclosure. When the communication conditions included in the restored communication condition information are satisfied, communication between the sender terminal and the recipient terminal is established according to the communication request. Thus, since the identifier-for-disclosure is disclosed instead of the recipient identifier, it is possible to prevent the recipient identifier from being used for unintended purposes following leakage of the recipient identifier.

In particular, even when such an identifier-for-disclosure is leaked to a third party, rather than establishing communication between a communication terminal of the third party and a recipient terminal unconditionally in response to a communication request from the communication terminal of the third party, communication between the communication terminal and the recipient terminal is established only when the communication conditions are satisfied. Therefore, it is also possible to control uses of the identifier-for-disclosure for unintended purposes.

Moreover, according to the present invention, an address-for-disclosure is created based on delivery condition information, which indicates delivery conditions for a mail delivered to a recipient terminal, and a recipient address uniformly specifying a recipient. When a mail having the created address-for-disclosure as a destination address is received, the recipient address and the delivery condition information are restored from the address-for-disclosure serving as the destination address of the mail. When the delivery conditions included in the restored delivery condition information are satisfied, the mail is delivered to the recipient terminal. Thus, since the address-for-disclosure is disclosed instead of the recipient address, it is possible to prevent the recipient address from being used for unintended purposes following leakage of the recipient address. In particular, even when such an address-for-disclosure is leaked to a third party, rather than delivering a mail of the third party unconditionally to the recipient terminal, the mail is delivered only when the delivery conditions are satisfied. Therefore, it is also possible to control uses of the address-for-disclosure for unintended purposes.

Furthermore, according to the present invention, a telephone-number-for-disclosure is created based on call condition information in connecting a call to a recipient telephone and a recipient telephone number. When a call connection request based on the created telephone-number-for-disclosure is received, the recipient telephone number and the call condition information are restored from the telephone-number-for-disclosure included in the call connection request. When call conditions included in the restored call condition information are satisfied, a sender telephone and the recipient telephone are connected for a call. Thus, since the telephone-number-for-disclosure is disclosed instead of the recipient telephone number, it is possible to prevent the recipient telephone number from being used for unintended purposes following leakage of the recipient telephone number. In particular, even when such a telephone-number-for-disclosure is leaked to a third party, rather than connecting a call to the recipient telephone unconditionally in response to a call request using the telephone-number-for-disclosure by the third party, a call is connected only when the call conditions are satisfied. Therefore, it is also possible to control uses of the telephone-number-for-disclosure for unintended purposes.

Moreover, according to the present invention, the identifier-for-disclosure is created in the recipient terminal based on the communication condition information and the recipient identifier. This makes it unnecessary to disclose the recipient identifier to other apparatuses and it is possible to efficiently prevent the recipient identifier from being spread.

Furthermore, according to the present invention, the identifier-for-disclosure is created in a predetermined intermediary apparatus, which is capable of communicating with the recipient terminal, based on the communication condition information and the recipient identifier. Thus, even if new apparatuses or programs are provided in respective recipient terminals, it is possible to use the identifier-for-disclosure.

Moreover, according to the present invention, a relay system provided between the recipient terminal and the sender terminal notifies the recipient terminal of any one of the restored recipient identifier and the restored communication condition information or both. Thus, the recipient terminal itself can judge whether a communication request should be accepted.

Furthermore, according to the present invention, a relay system provided between the recipient terminal and the sender terminal determines processing contents at the time when the communication conditions included in the restored communication condition information are not satisfied. Thus, the system as a whole can take consistent measures when the communication conditions are not satisfied.

Moreover, according to the present invention, the recipient terminal determines processing contents at the time when the communication conditions included in the restored communication condition information are not satisfied. Thus, respective recipients can determine processing contents by themselves freely.

Furthermore, according to the present invention, the communication condition information includes sender limiting information for limiting a sender to whom the identifier-for-disclosure is disclosed. When it is judged that at least a sender, who makes a communication request, coincides with limitation conditions included in the sender limiting information, communication between the sender terminal and the recipient terminal is established according to this communication request. Thus, for example, when a sender domain name or the like is designated as a legitimate disclosure destination, it is possible to receive only a communication request from a sender having this sender domain name.

Moreover, according to the present invention, disclosure-destination specifying information for specifying a disclosure destination, to which the identifier-for-disclosure is disclosed, is included in the communication condition information. Thus, when the identifier-for-disclosure is used for unintended purposes, it is possible to check to whom this identifier-for-disclosure is originally disclosed.

Furthermore, according to the present invention, when the communication conditions included in the restored communication condition information are not satisfied, the communication request is rejected. Thus, it is possible to make a communication request, which does not satisfy the communication conditions, transparent for the recipient.

Moreover, according to the present invention, when the communication conditions included in the restored communication condition information are not satisfied, communication between a predetermined communication terminal, which is different from the recipient terminal, and a sender terminal is established regardless of the communication request. Thus, it is possible to grasp, using the predetermined communication terminal, a state in which the identifier-for-disclosure is used for unintended purposes.

Furthermore, according to the present invention, a recipient identifier of each recipient and communication condition information indicating communication conditions in communicating with a recipient terminal of the recipient are registered in the intermediary apparatus. When a disclosure request for an identifier-for-disclosure is received from a sender terminal, the identifier-for-disclosure is created based on the recipient identifier and the communication condition information registered in the intermediary apparatus. This makes it unnecessary to pass the recipient identifier every time the identifier-for-disclosure is created and, therefore, it is possible to protect the recipient identifier more.

Moreover, according to the present invention, it is judged whether a sender who makes a disclosure request for the identifier-for-disclosure has a qualification for making a disclosure request. When it is judged that the sender does not have the qualification, the communication request is rejected. Thus, it is possible to reject a disclosure request from an unqualified sender and prevent leakage of the identifier-for-disclosure.

Furthermore, according to the present invention, a preliminary identifier-for-disclosure is created based on preliminary communication condition information, which indicates preliminary communication conditions in communicating with the recipient terminal, and the recipient identifier. The created preliminary identifier-for-disclosure is registered in the intermediary apparatus. When a disclosure request for an identifier-for-disclosure is received from a sender terminal, the preliminary identifier-for-disclosure and the communication condition information registered in the intermediary apparatus are transmitted to an identifier-for-disclosure rewriting apparatus to request rewriting of the identifier-for-disclosure. The identifier-for-disclosure is created from the preliminary identifier-for-disclosure and the communication condition information in response to the request. Thus, even if the recipient identifier is not disclosed to the intermediary apparatus, it is possible to establish communication using the identifier-for-disclosure.

Moreover, according to the present invention, it is judged based on the preliminary identifier-for-disclosure whether the intermediary apparatus has a qualification for making a rewriting request. When it is judged that the intermediary apparatus does not have the qualification, the rewriting request is rejected. Thus, it is possible to reject a request from an intermediary apparatus that is not qualified to perform rewriting.

Furthermore, according to the present invention, the recipient identifier and the communication condition information are encrypted by a predetermined public key to create the identifier-for-disclosure. When communication based on the created identifier-for-disclosure is received, the identifier-for-disclosure is decrypted by a secret key corresponding to the public key to restore the recipient identifier and the communication condition information. Thus, it is possible to embed the communication condition information in the identifier-for-disclosure using a well-known public key encryption system.

Moreover, according to the present invention, the recipient identifier and the communication condition information are encrypted using a predetermined common key to create the identifier-for-disclosure. When communication based on the created identifier-for-disclosure is received, the identifier-for-disclosure is decrypted by the common key to restore the recipient identifier and the communication condition information. Thus, it is possible to embed the communication condition information in the identifier-for-disclosure using any encryption method that uses the common key.

Furthermore, according to the present invention, the recipient identifier and the communication condition information are encrypted by a predetermined common key to create the identifier-for-disclosure. When communication based on the created identifier-for-disclosure is received, the identifier-for-disclosure is decrypted by the common key to restore the recipient identifier and the communication condition information. Thus, it is possible to embed the communication condition information in the identifier-for-disclosure using a well-known common key encryption system.

Moreover, according to the present invention, when an identifier-for-disclosure is created based on the communication condition information and the recipient identifier, the communication condition information is included in the identifier-for-disclosure in a form in which the communication condition information cannot be manipulated by a third party. Thus, it is possible to prevent an illegal act such as rewriting of the communication condition information.

Furthermore, according to the present invention, the communication condition information includes types or combinations of the communication conditions. In restoring the recipient identifier and the communication condition information, a type or a combination of communication conditions are extracted from the identifier-for-disclosure. The recipient identifier and the communication condition information are restored from the identifier-for-disclosure according to the extracted type and combination of the communication conditions. Thus, it is possible to use various communication conditions properly in the same system.

Moreover, according to the present invention, an identifier-for-disclosure granting unit creates an identifier-for-disclosure based on communication condition information, which indicates communication conditions in communicating with a recipient terminal, and a recipient identifier and notifies a sender terminal of the created identifier-for-disclosure. When a communication request from the sender terminal based on the identifier-for-disclosure granted by the identifier-for-disclosure granting unit is received, a relay system restores the recipient identifier and the communication condition information. When the communication conditions included in the restored communication condition information are satisfied, the relay system establishes communication between the sender terminal and the recipient terminal according to the communication request. Thus, since the identifier-for-disclosure is disclosed instead of the recipient identifier, it is possible to prevent the recipient identifier from being used for unintended purposes following leakage of the recipient identifier. In particular, even when such an identifier-for-disclosure is leaked to a third party, rather than establishing communication between a communication terminal of the third party and a recipient terminal unconditionally in response to a communication request from the communication terminal of the third party, communication between the communication terminal and the recipient terminal is established only when the communication conditions are satisfied. Therefore, it is also possible to control uses of the identifier-for-disclosure for unintended purposes.

Furthermore, according to the present invention, the identifier-for-disclosure granting unit forms a part of the recipient terminal. This makes it unnecessary to disclose the recipient identifier to other apparatuses and it is possible to efficiently prevent the recipient identifier from being spread.

Moreover, according to the present invention, the identifier-for-disclosure granting unit is an intermediary apparatus different from both the recipient terminal and the relay system. Thus, even if new apparatuses or programs are provided in respective recipient terminals, it is possible to use the identifier-for-disclosure.

Furthermore, according to the present invention, when a communication request from a sender terminal based on communication condition information, which indicates communication conditions in communicating with a recipient terminal, and a recipient identifier are received, the relay system restores the recipient identifier and the communication condition information from the identifier-for-disclosure. When the communication conditions included in the restored communication condition information are satisfied, the relay system establishes communication between the sender terminal and the recipient terminal according to the communication request. Thus, since the identifier-for-disclosure is disclosed instead of the recipient identifier, it is possible to prevent the recipient identifier from being used for unintended purposes following leakage of the recipient identifier. In particular, even when such an identifier-for-disclosure is leaked to a third party, rather than establishing communication between a communication terminal of the third party and a recipient terminal unconditionally in response to a communication request from the communication terminal of the third party, communication between the communication terminal and the recipient terminal is established only when the communication conditions are satisfied. Therefore, it is also possible to control uses of the identifier-for-disclosure for unintended purposes.

Moreover, according to the present invention, an identifier-for-disclosure is created based on communication condition information, which informs a recipient of communication conditions in performing communication, and a recipient identifier. When a communication request from a sender terminal based on the created identifier-for-disclosure is received, the recipient identifier and the communication condition information are restored from the identifier-for-disclosure. When the communication conditions included in the restored communication condition information are satisfied, communication between the sender terminal and the recipient terminal is established according to the communication request. Thus, since the identifier-for-disclosure is disclosed instead of the recipient identifier, it is possible to prevent the recipient identifier from being used for unintended purposes following leakage of the recipient identifier. In particular, even when such an identifier-for-disclosure is leaked to a third party, rather than establishing communication between a communication terminal of the third party and a recipient terminal unconditionally in response to a communication request from the communication terminal of the third party, communication between the communication terminal and the recipient terminal is established only when the communication conditions are satisfied. Therefore, it is also possible to control uses of the identifier-for-disclosure for unintended purposes.

Furthermore, according to the present invention, when a communication request from a sender terminal based on communication condition information, which indicates communication conditions in communicating with a recipient terminal, and an identifier-for-disclosure, which is created based on a recipient identifier, is received, the recipient identifier and the communication condition information are restored from the identifier-for-disclosure. When the communication conditions included in the restored communication condition information are satisfied, communication between the sender terminal and the recipient terminal is established according to the communication request. Thus, since the identifier-for-disclosure is disclosed instead of the recipient identifier, it is possible to prevent the recipient identifier from being used for unintended purposes following leakage of the recipient identifier. In particular, even when such an identifier-for-disclosure is leaked to a third party, rather than establishing communication between a communication terminal of the third party and a recipient terminal unconditionally in response to a communication request from the communication terminal of the third party, communication between the communication terminal and the recipient terminal is established only when the communication conditions are satisfied. Therefore, it is also possible to control uses of the identifier-for-disclosure for unintended purposes.

Moreover, according to the present invention, an address-for-disclosure issuing unit issues an address-for-disclosure based on delivery condition information, which indicates delivery conditions for a mail delivered to a recipient, and a recipient address. When a mail having the address-for-disclosure as a destination is received, a mail transfer unit decrypts the recipient address and extracts the delivery condition information from the address-for-disclosure. When the mail satisfies the delivery conditions included in the extracted delivery condition information, a destination of the mail is changed from the address-for-disclosure to the restored recipient address and the mail is transferred. Thus, it is possible to control uses of a mail address for unintended purposes following leakage and spread of the mail address. In particular, since it is made unnecessary to disclose an original recipient address to a third party, it is possible to prevent leakage and spread of an original mail address itself. In addition, even when the address-for-disclosure is leaked, since addresses-for-disclosure other than those used for original correct purposes are not delivered to the recipient, it is possible to realize invalidation of illegal addresses-for-disclosure.

Furthermore, according to the present invention, the address-for-disclosure issuing unit receives delivery condition information, which indicates delivery conditions for a mail delivered to the recipient, and the recipient address and encrypts the received delivery condition information and the received recipient address to create an address-for-disclosure, and returns the created address-for-disclosure to the recipient terminal. When a mail having the address-for-disclosure as a destination is received, the mail transfer unit decrypts the address-for-disclosure to restore the recipient address and extract the delivery condition information, extracts a mail satisfying the delivery conditions included in the extracted delivery condition information, changes a destination of the extracted mail from the address-for-disclosure to the restored recipient address to transfer the mail. Thus, since it is possible to create the address-for-disclosure and restore the recipient address and extract the delivery condition information from the address-for-disclosure using the encryption technique, it is possible to, for example, embed the communication condition information in the address-for-disclosure using the well-known cryptography and prevent manipulation of the communication condition information by a third party.

Moreover, according to the present invention, the delivery condition information and the recipient address are encrypted using a predetermined encryption key registered in an encryption-key table to create an address-for-disclosure, a decryption key is extracted from a decryption-key table in which decryption keys corresponding to respective encryption keys registered in the encryption-key table, the address-for-disclosure is decrypted using the extracted decryption key to restore the recipient address and extract the delivery condition information. Thus, it is possible to improve encryption intensity while using various encryption keys properly depending on a case.

Furthermore, according to the present invention, when a data length of encryption object data, which is encrypted using a predetermined encryption key registered in the encryption-key table, is less than a predetermined length, a random number is added to satisfy the predetermined length. Thus, it is possible to make it difficult to analyze the encryption key through known plaintext attack by a third party.

Moreover, according to the present invention, key identifiers are registered in the encryption-key table in association with plural encryption keys, respectively. A key identifier of an encryption key used in encrypting the delivery condition information and the recipient address is included in the address-for-disclosure. A decryption key having a key identifier extracted from the address-for-disclosure is extracted from the decryption-key table. The address-for-disclosure is decrypted using the extracted decryption key to restore the recipient address and extract the delivery condition information. Thus, it is possible to pass the key identifier with the address-for-disclosure as a medium to thereby perform efficient key delivery.

Furthermore, according to the present invention, the encryption-key table and the decryption-key table are identical tables in which key identifiers are registered in association with plural common keys, respectively. Thus, it is possible to perform encryption processing and decryption processing efficiently using the well-known common key encryption system if only synchronization of the tables is secured.

Moreover, according to the present invention, plural public keys are registered in the encryption-key table in association with key identifiers, respectively. Secret keys corresponding to the respective public keys registered in the encryption-key table are registered in the decryption-key table in association with same key identifiers, respectively. Thus, it is possible to perform encryption processing and decryption processing efficiently using the well-known public key encryption system.

Furthermore, according to the present invention, a sender address for using communication to the address-for-disclosure, a sender domain for using communication to the address-for-disclosure, an expiration date of the address-for-disclosure or a starting date of validity of the address-for-disclosure, or a combination of the conditions is set as the delivery condition information. Thus, it is possible to specify a user, a user group, and a usable period of the address-for-disclosure and exclude mails not conforming to such a user, a user group, or a period from objects of delivery to thereby avoid a situation in which a recipient has to receive a large quantity of direct mails and the like.

Moreover, according to the present invention, types and combinations of designated delivery conditions are included in the address-for-disclosure. Thus, it is possible to select an optimum combination of a delivery condition and a type for each disclosure destination of an address and set conditions that are more appropriate. In addition, it is made unnecessary to provide spaces corresponding to all delivery conditions in the address-for-disclosure and it is possible to reduce a data length of the address-for-disclosure.

Furthermore, according to the present invention, when the sender address or the sender domain is set as the delivery condition information, all or a part of hash values of the sender address or the sender domain are included in the address-for-disclosure. Thus, it is possible to fix a data length of the delivery condition information to thereby limit a data length of the address-for-disclosure.

Moreover, according to the present invention, a part of information to be an object of encryption is subjected to reversible conversion processing using a random-number sequence extracted from a random-number sequence table that stores plural random-number sequences. Thus, it is possible to make it difficult to analyze an encryption key through differential attack by a third party.

Furthermore, according to the present invention, a random number to be extracted from the random-number sequence table is determined based on a part of information used for creation of the address-for-disclosure. Thus, it is possible to make selection of a random-number sequence dependent on a part of the information used for creation of the address-for-disclosure to thereby make the selection of a random-number sequence easy and efficient.

Moreover, according to the present invention, a random-number sequence is selected from the random-number sequence table based on the delivery condition information. The recipient address is subjected to the reversible conversion processing using the selected random-number sequence. Thus, other than making it difficult to analyze an encryption key through differential attach, it is possible to scramble the recipient address, which should originally be prevented from being leaked most, to thereby prevent leakage of the recipient address to a third party.

Furthermore, according to the present invention, address tables, which store respective recipient addresses in association with predetermined address identifiers, respectively, are provided in the address-for-disclosure issuing unit and the mail transfer unit. An address identifier stored in the address table corresponding to the recipient address and the delivery condition information are encrypted to create an address-for-disclosure. When a mail having the address-for-disclosure as a destination is received, the address-for-disclosure is decrypted to restore the address identifier and extract the delivery condition information. A mail satisfying the delivery conditions included in the extracted delivery condition information is extracted. A destination of the mail is replaced with the recipient address stored in the address table corresponding to the address identifier restored from the address-for-disclosure to transfer the mail. Thus, it is possible to fix a data length of the address-for-disclosure and make it difficult to analyze an encryption key through known plaintext attach by a third party by keeping the address identifier on the address table secret.

Moreover, according to the present invention, an address-for-disclosure is issued based on deliver condition information, which indicates delivery conditions for a mail delivered to a recipient, and a recipient address. When a mail having the address-for-disclosure as a destination is received, the recipient address is restored and the delivery condition information is extracted from the address-for-disclosure. When the mail satisfies the delivery conditions included in the extracted delivery condition information, the destination of the mail is changed from the address-for-disclosure to the restored recipient address to transfer the mail. Thus, it is possible to control uses of a mail address for unintended purposes following leakage and spread of the mail address. In particular, since it is made unnecessary to disclose an original recipient address to a third party, it is possible to prevent leakage and spread of an original mail address itself. In addition, even when the address-for-disclosure is leaked, since addresses-for-disclosure other than those used for original correct purposes are not delivered to the recipient, it is possible to realize invalidation of illegal addresses-for-disclosure.

Furthermore, according to the present invention, the delivery condition information, which indicates delivery conditions for a mail delivered to a recipient, and the recipient address are received. The received delivery condition information and recipient address are encrypted to create an address-for-disclosure. The created address-for-disclosure is returned to a recipient terminal. When a mail having the address-for-disclosure as a destination is received, the address-for-disclosure is decrypted to restore the recipient address and extract the delivery condition information. A mail satisfying the delivery conditions included in the extracted delivery condition information is extracted. The address of the extracted mail is changed from the address-for-disclosure to the restored recipient address to transfer the mail. Thus, since it is possible to create the address-for-disclosure and restore the recipient address and extract the delivery condition information from the address-for-disclosure using the encryption technique, it is possible to, for example, embed the communication condition information in the address-for-disclosure using the well-known cryptography and prevent manipulation of the communication condition information by a third party.

Moreover, according to the present invention, the received delivery condition information and recipient address are encrypted using an encryption key having a predetermined key identifier registered in an encryption-key table to create an address-for-disclosure. A decryption key having a predetermined key identifier is extracted from a decryption-key table. The address-for-disclosure is decrypted using the extracted decryption key to restore the recipient address and extract the delivery condition information. Thus, it is possible to improve encryption intensity while using various encryption keys properly depending on a case.

Furthermore, according to the present invention, a sender address for using the address-for-disclosure, a sender domain for using the address-for-disclosure, an expiration date of the address-for-disclosure or a starting date of validity of the address-for-disclosure, or a combination of the conditions is set as the delivery condition information. Thus, it is possible to specify a user, a user group, and a usable period of the address-for-disclosure and exclude mails not conforming to such a user, a user group, or a period from objects of delivery to thereby avoid a situation in which a recipient has to receive a large quantity of direct mails and the like.

Moreover, according to the present invention, types and combinations of designated delivery conditions are included in the address-for-disclosure. Thus, it is possible to select an optimum combination of a delivery condition and a type for each disclosure destination of an address and set conditions that are more appropriate. In addition, it is made unnecessary to provide spaces corresponding to all delivery conditions in the address-for-disclosure and it is possible to reduce a data length of the address-for-disclosure.

Furthermore, according to the present invention, respective recipient addresses are stored in an address table in association with predetermined address identifiers. An address identifier stored in the address table corresponding to the recipient address and the delivery condition information are encrypted to create an address-for-disclosure. When a mail having the address-for-disclosure as a destination is received, the address-for-disclosure is decrypted to restore the address identifier and extract the delivery condition information. A mail satisfying the delivery conditions included in the extracted delivery condition information is extracted. The destination of the mail is changed from the address-for-disclosure to the recipient address stored in the address table corresponding to the restored address identifier to transfer the mail. Thus, it is possible to fix a data length of the address-for-disclosure and make it difficult to analyze an encryption key through known plaintext attach by a third party by keeping the address identifier on the address table secret.

Moreover, according to the present invention, an address-for-disclosure is issued based on delivery condition information, which indicates delivery conditions for a mail delivered to a recipient, and a recipient address. When a mail having the address-for-disclosure as a destination is received, the recipient address is restored and the delivery condition information is extracted from the address-for-disclosure. When the mail satisfies the delivery conditions included in the extracted delivery condition information, the destination of the mail is changed from the address-for-disclosure to the restored recipient address to transfer the mail. Thus, it is possible to control uses of a mail address for unintended purposes following leakage and spread of the mail address. In particular, since it is made unnecessary to disclose an original recipient address to a third party, it is possible to prevent leakage and spread of an original mail address itself. In addition, even when the address-for-disclosure is leaked, since addresses-for-disclosure other than those used for original correct purposes are not delivered to the recipient, it is possible to realize invalidation of illegal addresses-for-disclosure.

Furthermore, according to the present invention, the delivery condition information, which indicates delivery conditions for a mail delivered to a recipient, and the recipient address are received. The received delivery condition information and recipient address are encrypted to create an address-for-disclosure. The created address-for-disclosure is returned to the recipient terminal. When a mail having the address-for-disclosure as a destination is received, the address-for-disclosure is decrypted to restore the recipient address and extract the delivery condition information. A mail satisfying the delivery conditions included in the extracted delivery condition information is extracted. The destination of the extracted mail is changed from the address-for-disclosure to the restored recipient address to transfer the mail. Thus, since it is possible to create the address-for-disclosure and restore the recipient address and extract the delivery condition information from the address-for-disclosure using the encryption technique, it is possible to, for example, embed the communication condition information in the address-for-disclosure using the well-known cryptography and prevent manipulation of the communication condition information by a third party.

Moreover, according to the present invention, the delivery condition information and the recipient address are encrypted using an encryption key having a predetermined key identifier registered in an encryption-key table to create an address-for-disclosure. A decryption key having the predetermined key identifier is extracted from a decryption-key table. The address-for-disclosure is decrypted using the extracted decryption key to restore the recipient address and extract the delivery condition information. Thus, it is possible to improve encryption intensity while using various encryption keys properly depending on a case.

Furthermore, according to the present invention, a sender address for using the address-for-disclosure, a sender domain for using the address-for-disclosure, an expiration date of the address-for-disclosure or a starting date of validity of the address-for-disclosure, or a combination of the conditions is set as the delivery condition information. Thus, it is possible to specify a user, a user group, and a usable period of the address-for-disclosure and exclude mails not conforming to such a user, a user group, or a period from objects of delivery to thereby avoid a situation in which a recipient has to receive a large quantity of direct mails and the like.

Moreover, according to the present invention, types and combinations of designated delivery conditions are included in the address-for-disclosure. Thus, it is possible to select an optimum combination of a delivery condition and a type for each disclosure destination of an address and set conditions that are more appropriate. In addition, it is made unnecessary to provide spaces corresponding to all delivery conditions in the address-for-disclosure and it is possible to reduce a data length of the address-for-disclosure.

Furthermore, according to the present invention, respective recipient addresses are stored in an address table in association with predetermined address identifiers. An address identifier stored in the address table corresponding to the recipient address and the delivery condition information are encrypted to create an address-for-disclosure. When a mail having the address-for-disclosure as a destination is received, the address-for-disclosure is decrypted to restore the address identifier and extract the delivery condition information. A mail satisfying the delivery conditions included in the extracted delivery condition information is extracted. The destination of the mail is changed from the address-for-disclosure to the recipient address stored in the address table corresponding to the restored address identifier to transfer the mail. Thus, it is possible to fix a data length of the address-for-disclosure and make it difficult to analyze an encryption key through known plaintext attach by a third party by keeping the address identifier on the address table secret.

INDUSTRIAL APPLICABILITY

As described above, the communication method, the communication system, the relay system, the communication program, and the program for the relay system are useful for a communication method, a communication system, a relay system, a communication program, a program for the relay system, a mail delivery system, a mail delivery method, and a mail delivery program that, in response to a communication request from a sender terminal using a recipient identifier for uniquely specifying a recipient, perform communication between the sender terminal and a recipient terminal. In particular, the communication method, the communication system, the relay system, the communication program, and the program for the relay system are suitable for a communication method, a communication system, a relay system, a communication program, a program for the relay system, a mail delivery system, a mail delivery method, and a mail delivery program that can prevent a recipient identifier from being used for purposes unintended by the recipient.

The invention claimed is:

1. A method of performing a communication between a sender terminal and a recipient terminal in response to a communication request from the sender terminal using a recipient identifier for uniquely specifying a recipient, the method comprising:
    creating an identifier-for-disclosure based on communication condition information for informing communication conditions to a recipient at a time of performing the communication and the recipient identifier;
    restoring, when a communication request from the sender terminal based on the identifier-for-disclosure created is received, the recipient identifier and the communication condition information from the identifier-for-disclosure; and
    establishing, when the communication conditions included in the communication condition information restored are satisfied, the communication between the sender terminal and the recipient terminal according to the communication request.

2. The communication method according to claim 1, wherein
    the creating includes creating an address-for-disclosure based on delivery condition information indicating delivery conditions for a mail delivered to the recipient terminal and a recipient address uniformly specifying a recipient,
    the restoring includes restoring, when a mail having the address-for-disclosure created as a destination address is received, restoring the recipient address and the delivery condition information from the address-for-disclosure serving as the destination address of the mail, and
    the establishing includes, when the delivery conditions included in the delivery condition information restored are satisfied, sending the mail to the recipient terminal.

3. The communication method according to claim 1, wherein
    the creating includes creating a telephone-number-for-disclosure based on call condition information for connecting a call to a recipient telephone and a recipient telephone number,
    the restoring includes, when a call connection request based on the telephone-number-for-disclosure created is received, restoring the recipient telephone number and the call condition information from the telephone-number-for-disclosure included in the call connection request, and
    the establishing includes, when call conditions included in the call condition information restored are satisfied, connecting the sender telephone and the recipient telephone for a call.

4. The communication method according to claim 1, wherein the creating includes creating the identifier-for-disclosure in the recipient terminal based on the communication condition information and the recipient identifier.

5. The communication method according to claim 1, wherein the creating includes creating the identifier-for-disclosure in a predetermined intermediary apparatus that is capable of communicating with the recipient terminal, based on the communication condition information and the recipient identifier.

6. The communication method according to claim 5, further comprising registering the recipient identifier of each of the recipients and the communication condition information indicating communication conditions at a time of performing the communication with the recipient terminal in the intermediary apparatus, wherein
    the creating includes, when a disclosure request for the identifier-for-disclosure is received from the sender terminal, creating the identifier-for-disclosure based on the recipient identifier and the communication condition information registered in the intermediary apparatus.

7. The communication method according to claim 6, further comprising:
    determining whether a sender who makes the disclosure request for the identifier-for-disclosure has a qualification for making the disclosure request; and
    rejecting, when it is determined that the sender does not have the qualification, the communication request.

8. The communication method according to claim 5, further comprising:
    generating a preliminary identifier-for-disclosure based on preliminary communication condition information indicating preliminary communication conditions at a time of performing the communication with the recipient terminal, and the recipient identifier; and
    registering the preliminary identifier-for-disclosure generated in the intermediary apparatus, wherein
    the creating includes:
        transmitting, when the disclosure request for the identifier-for-disclosure is received from the sender terminal, the preliminary identifier-for-disclosure and the communication condition information registered in the intermediary apparatus to an identifier-for-disclosure rewriting apparatus to make a request to rewrite the identifier-for-disclosure; and
        creating the identifier-for-disclosure from the preliminary identifier-for-disclosure and the communication condition information in response to the request at the transmitting.

9. The communication method according to claim 8, further comprising:

determining whether the intermediary apparatus has a qualification for making the request based on the preliminary identifier-for-disclosure; and rejecting, when it is determined that the intermediary apparatus does not have the qualification, the request.

10. The communication method according to claim 1, further comprising notifying including a relay system provided between the recipient terminal and the sender terminal notifying the recipient terminal of at least one of the recipient identifier and the restored communication condition information restored.

11. The communication method according to claim 1, further comprising determining including a relay system provided between the recipient terminal and the sender terminal determining processing contents at a time when the communication conditions included in the communication condition information restored are not satisfied.

12. The communication method according to claim 1, further comprising determining includes the recipient terminal determining processing contents at a time when the communication conditions included in the communication condition information restored are not satisfied.

13. The communication method according to claim 1, wherein the communication condition information includes sender limiting information for limiting a sender to whom the identifier-for-disclosure created is disclosed, and the establishing includes, when it is determined that at least a sender who makes the communication request coincides with limitation conditions included in the sender limiting information, establishing the communication between the sender terminal and the recipient terminal according to the communication request.

14. The communication method according to claim 1, wherein the communication condition information includes disclosure-destination specifying information for specifying a disclosure destination to which the identifier-for-disclosure created is disclosed.

15. The communication method according to claim 1, wherein the establishing includes, when the communication conditions included in the communication condition information restored are not satisfied, rejecting the communication request.

16. The communication method according to claim 1, wherein the establishing includes, when the communication conditions included in the communication condition information restored are not satisfied, establishing a communication between a predetermined communication terminal that is different from the recipient terminal and the sender terminal regardless of the communication request.

17. The communication method according to claim 1, wherein the creating includes creating the identifier-for-disclosure by encrypting the recipient identifier and the communication condition information using a predetermined public key, and the restoring includes, when the communication based on the identifier-for-disclosure created is received, restoring the recipient identifier and the communication condition information by decrypting the identifier-for-disclosure using a secret key corresponding to the public key.

18. The communication method according to claim 1, wherein the creating includes creating the identifier-for-disclosure by encrypting the recipient identifier and the communication condition information using a predetermined common key, and the restoring includes, when the communication based on the identifier-for-disclosure created is received, restoring the recipient identifier and the communication condition information by decrypting the identifier-for-disclosure using the common key.

19. The communication method according to claim 1, wherein the creating includes, when the identifier-for-disclosure is created based on the communication condition information and the recipient identifier, including the communication condition information in the identifier-for-disclosure in such a manner that a third party cannot manipulate the communication condition information.

20. The communication method according to claim 1, wherein the communication condition information includes a type or a combination of the communication conditions, and the restoring includes:

extracting the type or the combination of the communication conditions from the identifier-for-disclosure created; and restoring the recipient identifier and the communication condition information from the identifier-for-disclosure according to the type and the combination of the communication conditions extracted.

21. A communication system that connects a recipient terminal used by a recipient and a sender terminal that sends a communication request to the recipient terminal via a relay system, and performs a communication between the sender terminal and the recipient terminal in response to a communication request from the sender terminal using a recipient identifier for uniquely specifying the recipient, the communication system comprising an identifier-for-disclosure granting unit including:

an identifier-for-disclosure creating unit that creates an identifier-for-disclosure based on communication condition information indicating communication conditions at a time of performing the communication with the recipient terminal and the recipient identifier; and a notifying unit that notifies the identifier-for-disclosure created to the sender terminal, wherein the relay system includes:

a restoring unit that, when a communication request from the sender terminal based on the identifier-for-disclosure granted by the identifier-for-disclosure granting unit is received, restores the recipient identifier and the communication condition information from the identifier-for-disclosure; and a communication establishing unit that, when the communication conditions included in the communication condition information restored are satisfied, establishes the communication between the sender terminal and the recipient terminal according to the communication request.

22. The communication system according to claim 21, wherein the identifier-for-disclosure granting unit is a part of the recipient terminal.

23. The communication system according to claim 21, wherein the identifier-for-disclosure granting unit is an intermediary apparatus different from both the recipient terminal and the relay system.

24. A relay system that is provided between a recipient terminal used by a recipient and a sender terminal that sends a communication request to the recipient terminal, and relays a communication between the sender terminal and the recipient terminal in response to a communication request from the sender terminal using a recipient identifier for uniquely specifying the recipient, the relay system comprising:
   a restoring unit that, when a communication request from the sender terminal based on communication condition information indicating communication conditions at a time of performing the communication with the recipient terminal and a recipient identifier is received, restores the recipient identifier and the communication condition information from the identifier-for-disclosure; and
   a communication establishing unit that, when the communication conditions included in the communication condition information restored are satisfied, establishes the communication between the sender terminal and the recipient terminal according to the communication request.

25. A computer-readable recording medium that stores a communication program for performing a communication between a sender terminal and a recipient terminal in response to a communication request from the sender terminal using a recipient identifier for uniquely specifying a recipient, wherein the communication program causes a computer to execute:
   creating an identifier-for-disclosure based on communication condition information for informing communication conditions to a recipient at a time of performing the communication and the recipient identifier;
   restoring, when a communication request from the sender terminal based on the identifier-for-disclosure created is received, the recipient identifier and the communication condition information from the identifier-for-disclosure; and
   establishing, when the communication conditions included in the communication condition information restored are satisfied, the communication between the sender terminal and the recipient terminal according to the communication request.

26. A computer-readable recording medium that stores a program for a relay system that is provided between a recipient terminal used by a recipient and a sender terminal that sends a communication request to the recipient terminal, and relays a communication between the sender terminal and the recipient terminal in response to a communication request from the sender terminal using a recipient identifier for uniquely specifying the recipient, wherein the program causes a computer to execute:
   restoring, when a communication request from the sender terminal based on communication condition information indicating communication conditions at a time of performing the communication with the recipient terminal and a recipient identifier is received, the recipient identifier and the communication condition information from the identifier-for-disclosure; and
   establishing, when the communication conditions included in the communication condition information restored are satisfied, the communication between the sender terminal and the recipient terminal according to the communication request.

27. A mail delivery system that connects a recipient terminal used by a recipient having a recipient address with a sender terminal that sends a mail having the recipient address as a destination via a network, and delivers the mail to the recipient terminal, the mail delivery system comprising:
   an address-for-disclosure issuing unit that issues an address-for-disclosure based on delivery condition information indicating delivery conditions for the mail to be delivered to the recipient and the recipient address; and
   a mail transfer unit that, when the mail is received, decrypts the recipient address, extracts the delivery condition information from the address-for-disclosure, and when the mail satisfies the delivery conditions included in the delivery condition information extracted, changes the destination of the mail from the address-for-disclosure to the recipient address restored to transfer the mail.

28. The mail delivery system according to claim 27, wherein the address-for-disclosure issuing unit includes:
   a receiving unit that receives the delivery condition information and the recipient address;
   an address-for-disclosure creating unit that encrypts the delivery condition information and the recipient address received to create an address-for-disclosure; and
   an address-for-disclosure returning unit that returns the address-for-disclosure created to the recipient terminal, and
   the mail transfer unit includes
   a filter processing unit that, when the mail is received, decrypts the address for-disclosure to restore the recipient address, extract the delivery condition information, and extracts the mail satisfying the delivery conditions included in the delivery condition information extracted; and
   a transfer processing unit that changes the destination of the mail extracted from the address-for-disclosure to the recipient address restored to transfer the mail.

29. The mail delivery system according to claim 28, wherein
   the address-for-disclosure issuing unit further includes an encryption-key table in which a plurality of encryption keys are registered,
   the address-for-disclosure creating unit encrypts the delivery condition information and the recipient address received using a predetermined encryption key registered in the encryption-key table to create an address-for-disclosure,
   the mail transfer unit further includes a decryption-key table in which a plurality of decryption keys corresponding to each of the encryption keys registered in the encryption-key table are registered, and
   the filter processing unit extracts a decryption key corresponding to the predetermined encryption key from the decryption-key table, decrypts the address-for-disclosure using the decryption key extracted to restore the recipient address and to extract the delivery condition information.

30. The mail delivery system according to claim 29, wherein the address-for-disclosure creating unit adds, when a length of data to be encrypted using the predetermined encryption key registered in the encryption-key table is less than a predetermined length, a random number to satisfy the predetermined length.

31. The mail delivery system according to claim 29, wherein
   the encryption keys are registered in the encryption-key table in association with a plurality of key identifiers, respectively,
   the address-for-disclosure creating unit includes a key identifier of an encryption key that is used in encrypting the delivery condition information and the recipient address in the address-for-disclosure, and the filter processing unit extracts a decryption key having the key identifier that is extracted from the address-for-disclosure from the decryption-key table, and decrypts the address-for-disclosure using the decryption key extracted to restore the recipient address and to extract the delivery condition information.

32. The mail delivery system according to claim 29, wherein the encryption-key table and the decryption-key table are identical tables in which the key identifiers are registered in association with a plurality of common keys, respectively.

33. The mail delivery system according to claim 29, wherein a plurality of public keys is registered in the encryption-key table in association with the key identifiers, respectively, and a plurality of secret keys corresponding to the public keys registered in the encryption-key table is registered in the decryption-key table in association with same key identifiers, respectively.

34. The mail delivery system according to claim 28, wherein the address-for-disclosure creating unit sets a sender address for using a communication to the address-for-disclosure, a sender domain for using a communication to the address-for-disclosure, an expiration date of the address-for-disclosure or a starting date of a validity of the address-for-disclosure, or a combination of the conditions as the delivery condition information.

35. The mail delivery system according to claim 28, wherein the address-for-disclosure issuing unit further includes a random-number sequence table that stores a plurality of random-number sequences, and the address-for-disclosure creating unit performs a reversible conversion processing of a part of information to be encrypted, using a random-number sequence extracted from the random-number sequence table.

36. The mail delivery system according to claim 35, wherein the address-for-disclosure creating unit determines a random number to be extracted from the random-number sequence table, based on a part of information used for creating the address-for-disclosure.

37. The mail delivery system according to claim 35, wherein the address-for-disclosure creating unit selects a random-number sequence from the random-number sequence table based on the delivery condition information, and performs a reversible conversion processing of the recipient address using the random-number sequence selected.

38. The mail delivery system according to claim 35, wherein each of the address-for-disclosure issuing unit and the mail transfer unit further includes an address table that stores a recipient address in association with a predetermined address identifier, the address-for-disclosure creating unit encrypts the address identifier stored in the address table corresponding to the recipient address and the delivery condition information to create the address-for-disclosure, the filter processing unit decrypts, when the mail having the address-for-disclosure as a destination is received, the address-for-disclosure to restore the address identifier, extracts the delivery condition information, and extracts a mail satisfying the delivery conditions included in the delivery condition information extracted, and the transfer processing unit changes the destination of the mail to the recipient address stored in the address table corresponding to the address identifier restored from the address-for-disclosure to transfer the mail.

39. The mail delivery system according to claim 27, wherein the address-for-disclosure creating unit includes a type and a combination of designated delivery conditions in the address-for-disclosure.

40. The mail delivery system according to claim 39, wherein the address-for-disclosure creating unit includes, when the sender address or the sender domain is set as the delivery condition information, all or a part of hash values of the sender address or the sender domain in the address-for-disclosure.

41. The mail delivery system according to claim 39, wherein the address-for-disclosure issuing unit further includes a random-number sequence table that stores a plurality of random-number sequences, and the address-for-disclosure creating unit performs a reversible conversion processing of a part of information to be encrypted, using a random-number sequence extracted from the random-number sequence table.

42. The mail delivery system according to claim 41, wherein the address-for-disclosure creating unit determines a random number to be extracted from the random-number sequence table, based on a part of information used for creating the address-for-disclosure.

43. The mail delivery system according to claim 41, wherein the address-for-disclosure creating unit selects a random-number sequence from the random-number sequence table based on the delivery condition information, and performs a reversible conversion processing of the recipient address using the random-number sequence selected.

44. The mail delivery system according to claim 41, wherein each of the address-for-disclosure issuing unit and the mail transfer unit further includes an address table that stores a recipient address in association with a predetermined address identifier, the address-for-disclosure creating unit encrypts the address identifier stored in the address table corresponding to the recipient address and the delivery condition information to create the address-for-disclosure, the filter processing unit decrypts, when the mail having the address-for-disclosure as a destination is received, the address-for-disclosure to restore the address identifier, extracts the delivery condition information, and extracts a mail satisfying the delivery conditions included in the delivery condition information extracted, and the transfer processing unit changes the destination of the mail to the recipient address stored in the address table corresponding to the address identifier restored from the address-for-disclosure to transfer the mail.

45. A method of delivering a mail having a predetermined recipient address as a destination from a sender terminal that sends the mail to a recipient terminal used by a recipient having the recipient address, the method comprising:

issuing an address-for-disclosure based on deliver condition information indicating delivery conditions for the mail to be delivered to the recipient and the recipient address;

restoring including, when the mail is received,
   restoring the recipient address; and
   extracting the delivery condition information from the address-for-disclosure; and changing, when the mail satisfies the delivery conditions included in the delivery condition information extracted, the destination of the mail from the address-for-disclosure to the recipient address restored to transfer the mail.

46. The mail delivery method according to claim 45, wherein the issuing includes:

receiving the delivery condition information indicating delivery conditions for the mail to be delivered to the recipient and the recipient address;

creating the address-for-disclosure by encrypting the delivery condition information and the recipient address received; and returning the address-for-disclosure created to the recipient terminal, and the changing includes:

decrypting, when the mail is received, the address-for-disclosure to restore the recipient address, extract the delivery condition information, and extract the mail satisfying the delivery conditions included in the delivery condition information extracted; and changing the address of the mail extracted from the address-for-disclosure to the recipient address restored to transfer the mail.

47. The mail delivery method according to claim 46, wherein the creating includes encrypting the delivery condition information and the recipient address received using an encryption key having a predetermined key identifier registered in an encryption-key table to create the address-for-disclosure, and the decrypting includes extracting a decryption key having the predetermined key identifier from a decryption-key table and decrypting the address-for-disclosure using the decryption key extracted to restore the recipient address and extract the delivery condition information.

48. The mail delivery method according to claim 46, wherein, the creating includes setting a sender address for using the address-for-disclosure, a sender domain for using the address-for-disclosure, an expiration date of the address-for-disclosure or a starting date of a validity of the address-for-disclosure, or a combination of the conditions as the delivery condition information.

49. The mail delivery method according to claim 48, wherein, the creating includes including a type and a combination of designated delivery conditions in the address-for-disclosure.

50. The mail delivery method according to claim 45, further comprising storing each of the recipient addresses in an address table in association with a predetermined address identifier, wherein the creating includes encrypting an address identifier stored in the address table corresponding to the recipient address and the delivery condition information to create the address-for-disclosure, the decrypting includes, when the mail is received, decrypting the address-for-disclosure to restore the address identifier, extracting the delivery condition information, and extracting a mail satisfying the delivery conditions included in the delivery condition information extracted, and the changing includes changing the destination of the mail from the address-for-disclosure to the recipient address stored in the address table corresponding to the address identifier restored to transfer the mail.

51. A computer-readable recording medium that stores a mail delivery program for delivering a mail having a predetermined recipient address as a destination from a sender terminal that sends the mail to a recipient terminal used by a recipient having the recipient address, wherein the mail delivery program causes a computer to execute:

issuing an address-for-disclosure based on deliver condition information indicating delivery conditions for the mail to be delivered to the recipient and the recipient address;

restoring including, when the mail is received,
   restoring the recipient address; and
   extracting the delivery condition information from the address-for-disclosure; and changing, when the mail satisfies the delivery conditions included in the delivery condition information extracted, the destination of the mail from the address-for-disclosure to the recipient address restored to transfer the mail.

52. The computer-readable recording medium according to claim 51, wherein the issuing includes receiving the delivery condition information indicating delivery conditions for the mail to be delivered to the recipient and the recipient address;

creating the address-for-disclosure by encrypting the delivery condition information and the recipient address received; and returning the address-for-disclosure created to the recipient terminal, and the changing includes decrypting, when the mail is received, the address-for-disclosure to restore the recipient address, extract the delivery condition information, and extract the mail satisfying the delivery conditions included in the delivery condition information extracted; and changing the address of the mail extracted from the address-for-disclosure to the recipient address restored to transfer the mail.

53. The computer-readable recording medium according to claim 52, wherein the creating includes encrypting the delivery condition information and the recipient address received using an encryption key having a predetermined key identifier registered in an encryption-key table to create the address-for-disclosure, and the decrypting includes extracting a decryption key having the predetermined key identifier from a decryption-key table and decrypting the address-for-disclosure using the decryption key extracted to restore the recipient address and extract the delivery condition information.

54. The computer-readable recording medium according to claim 52, wherein, the creating includes setting a sender address for using the address-for-disclosure, a sender domain for using the address-for-disclosure, an expiration date of the address-for-disclosure or a starting date of a validity of the address-for-disclosure, or a combination of the conditions as the delivery condition information.

55. The computer-readable recording medium according to claim 54, wherein, the creating includes including a type and a combination of designated delivery conditions in the address-for-disclosure.

56. The computer-readable recording medium according to claim 52, further causing the computer to execute storing each of the recipient addresses in an address table in association with a predetermined address identifier, wherein the creating includes encrypting an address identifier stored in the address table corresponding to the recipient address and the delivery condition information to create the address-for-disclosure, the decrypting includes, when the mail is received, decrypting the address-for-disclosure to restore the address identifier, extracting the delivery condition information, and extracting a mail satisfying the delivery conditions included in the delivery condition information extracted, and the changing includes changing the destination of the mail from the address-for-disclosure to the recipient address stored in the address table corresponding to the address identifier restored to transfer the mail.

* * * * *